United States Patent
Kmoch et al.

(10) Patent No.: US 11,826,936 B2
(45) Date of Patent: Nov. 28, 2023

(54) MOLDING SYSTEM HAVING A MOLD STACK WITH A CLEANING CONFIGURATION AND A SHUT HEIGHT ADJUSTMENT MECHANISM

(71) Applicant: Husky Injection Molding Systems Ltd., Bolton (CA)

(72) Inventors: Sven Kmoch, Platten (DE); Ralf Walter Fisch, Saarburg (DE); Derek Robertson McCready, Mississauga (CA); Renato Papa, Scarborough (CA); Maxfield Paul Bradshaw, Etobicoke (CA)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 35 days.

(21) Appl. No.: 17/812,285

(22) Filed: Jul. 13, 2022

(65) Prior Publication Data
US 2022/0347902 A1   Nov. 3, 2022

Related U.S. Application Data

(62) Division of application No. 16/886,122, filed on May 28, 2020, now Pat. No. 11,420,369, which is a division of application No. 15/552,606, filed as application No. PCT/CA2016/050184 on Feb. 24, 2016, now Pat. No. 10,703,034.

(Continued)

(51) Int. Cl.
*B29C 45/17* (2006.01)
*B29C 45/34* (2006.01)
*B29C 45/80* (2006.01)
*B29C 33/72* (2006.01)
*B29C 45/33* (2006.01)
*B29C 45/26* (2006.01)

(52) U.S. Cl.
CPC .......... *B29C 45/1753* (2013.01); *B29C 33/72* (2013.01); *B29C 45/34* (2013.01); *B29C 45/80* (2013.01); *B29C 45/33* (2013.01); *B29C 2045/2683* (2013.01)

(58) Field of Classification Search
CPC ......... B29C 33/72; B29C 45/33; B29C 45/34; B29C 45/72; B29C 45/80; B29C 45/1753; B29C 2045/2683
See application file for complete search history.

(56) References Cited

U.S. PATENT DOCUMENTS

| 3,327,353 A | 6/1967 | Eggenberger |
| 4,133,260 A | 1/1979 | Gundal |

(Continued)

FOREIGN PATENT DOCUMENTS

| CA | 2839355 A1 | 2/2013 |
| CN | 103874570 | 6/2014 |

(Continued)

*Primary Examiner* — Ryan M Ochylski

(57) ABSTRACT

In an aspect, a mold stack may comprise two adjacent components, one at least partially defining a vent adjustable between a molding configuration and a cleaning configuration. A junction of the components may be adjustable between a molding configuration, wherein mating faces contact one another to define a parting line, and a cleaning configuration, wherein mating faces are separated to create a molding cavity extension therebetween and an auxiliary melt barrier prevents uncontrolled flashing from the extension.

8 Claims, 45 Drawing Sheets

Related U.S. Application Data

(60) Provisional application No. 62/135,967, filed on Mar. 20, 2015.

(56) References Cited

U.S. PATENT DOCUMENTS

| | | | |
|---|---|---|---|
| 4,790,173 A | 12/1988 | Boutcher, Jr. |
| 4,971,803 A | 11/1990 | Li et al. |
| 5,002,479 A | 3/1991 | Brown et al. |
| 5,135,385 A | 8/1992 | Fuzukawa et al. |
| 5,397,230 A | 3/1995 | Brew |
| 5,437,836 A | 8/1995 | Yamada |
| 5,536,166 A | 7/1996 | Schad |
| 5,853,773 A | 12/1998 | Choi |
| 5,884,520 A | 3/1999 | Bakermans |
| 5,964,134 A | 10/1999 | Arends |
| 6,055,904 A | 5/2000 | Chun et al. |
| 6,200,122 B1 | 3/2001 | Chun et al. |
| 6,408,673 B1 | 6/2002 | Korner et al. |
| 7,128,865 B2 | 10/2006 | Martin |
| 7,452,199 B2 | 11/2008 | Eigler et al. |
| 7,481,642 B2 | 1/2009 | Niewels |
| 7,939,009 B2 | 5/2011 | Balboni et al. |
| 8,061,409 B2 | 11/2011 | Iwasaki et al. |
| D699,769 S | 2/2014 | Witz et al. |
| D699,770 S | 2/2014 | Kmoch et al. |
| 8,709,326 B2 | 4/2014 | Sakamoto |
| D714,368 S | 9/2014 | Kmoch et al. |
| 2003/0070693 A1 | 4/2003 | Stratford et al. |
| 2007/0212443 A1 | 9/2007 | Li et al. |
| 2009/0098232 A1 | 4/2009 | Niewels |
| 2013/0142902 A1 | 6/2013 | Papa et al. |

FOREIGN PATENT DOCUMENTS

| | | |
|---|---|---|
| EP | 0704292 A1 | 4/1996 |
| EP | 2343176 A1 | 7/2011 |
| JP | 03199023 A1 | 8/1991 |
| JP | 1997300437 A1 | 11/1997 |
| JP | 2006239721 A1 | 9/2006 |
| JP | 1995285135 A1 | 10/2015 |
| WO | 2012019304 A1 | 2/2012 |
| WO | 2013016816 A1 | 2/2013 |
| WO | 2014117246 A1 | 8/2014 |

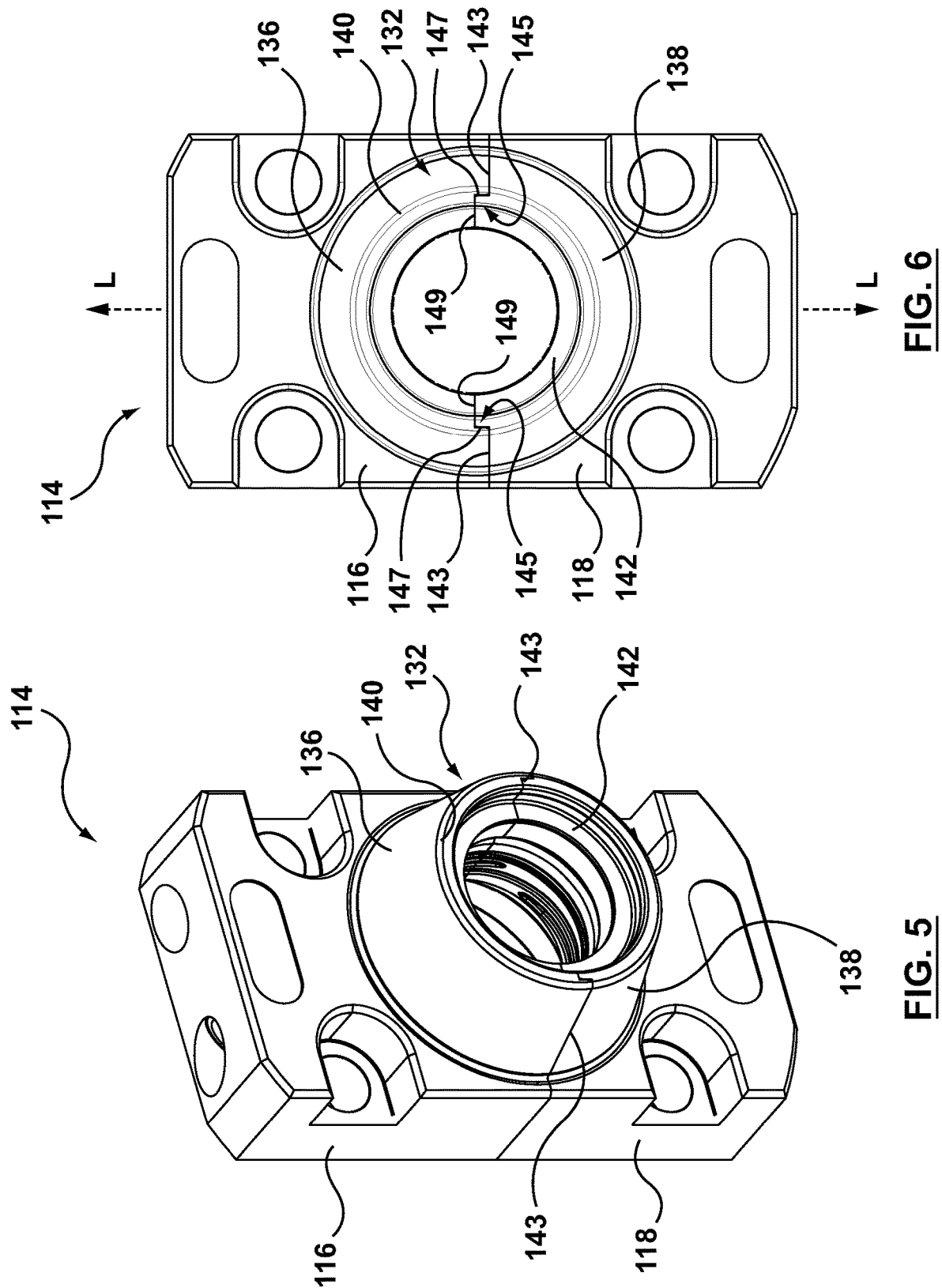

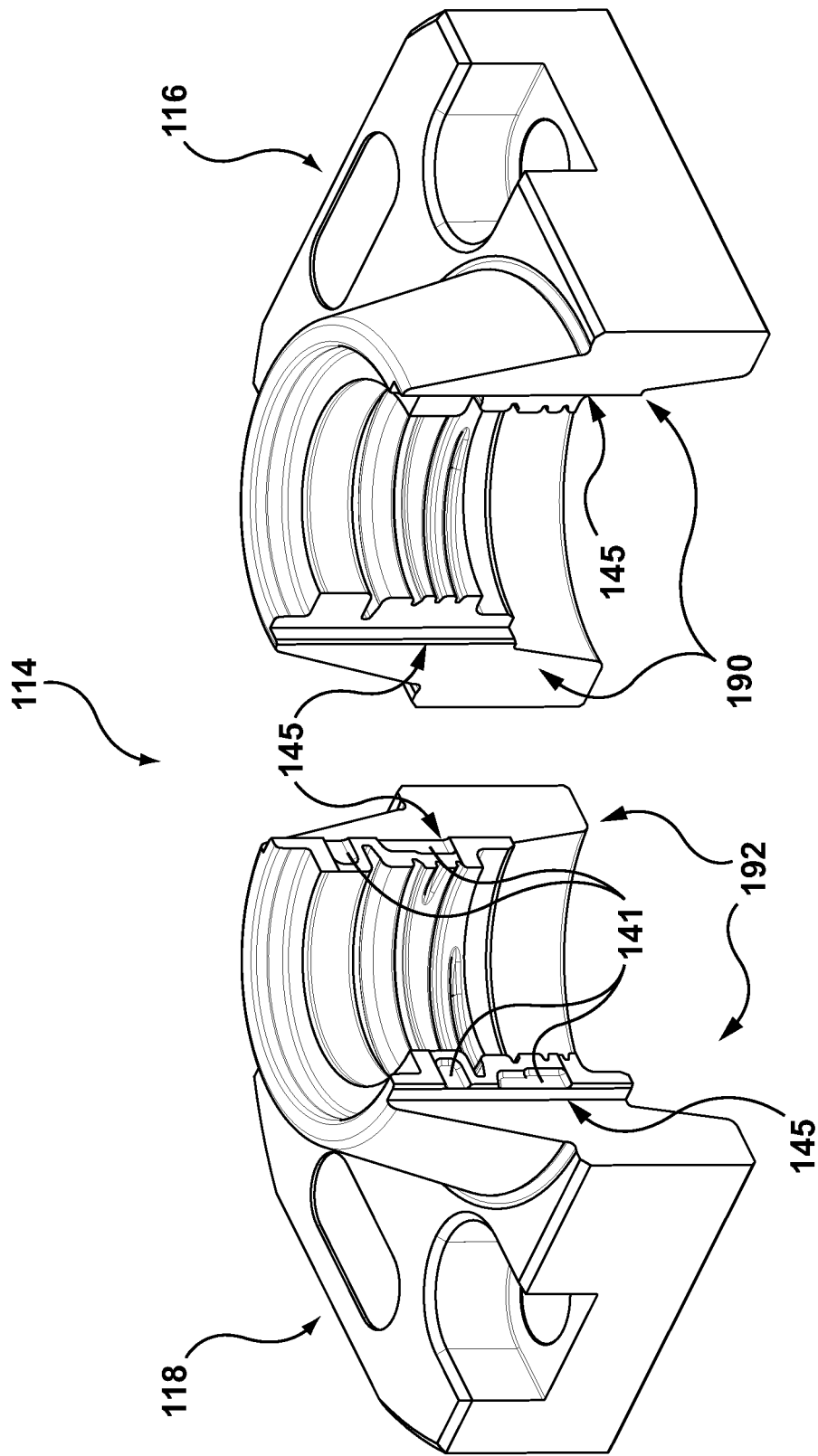

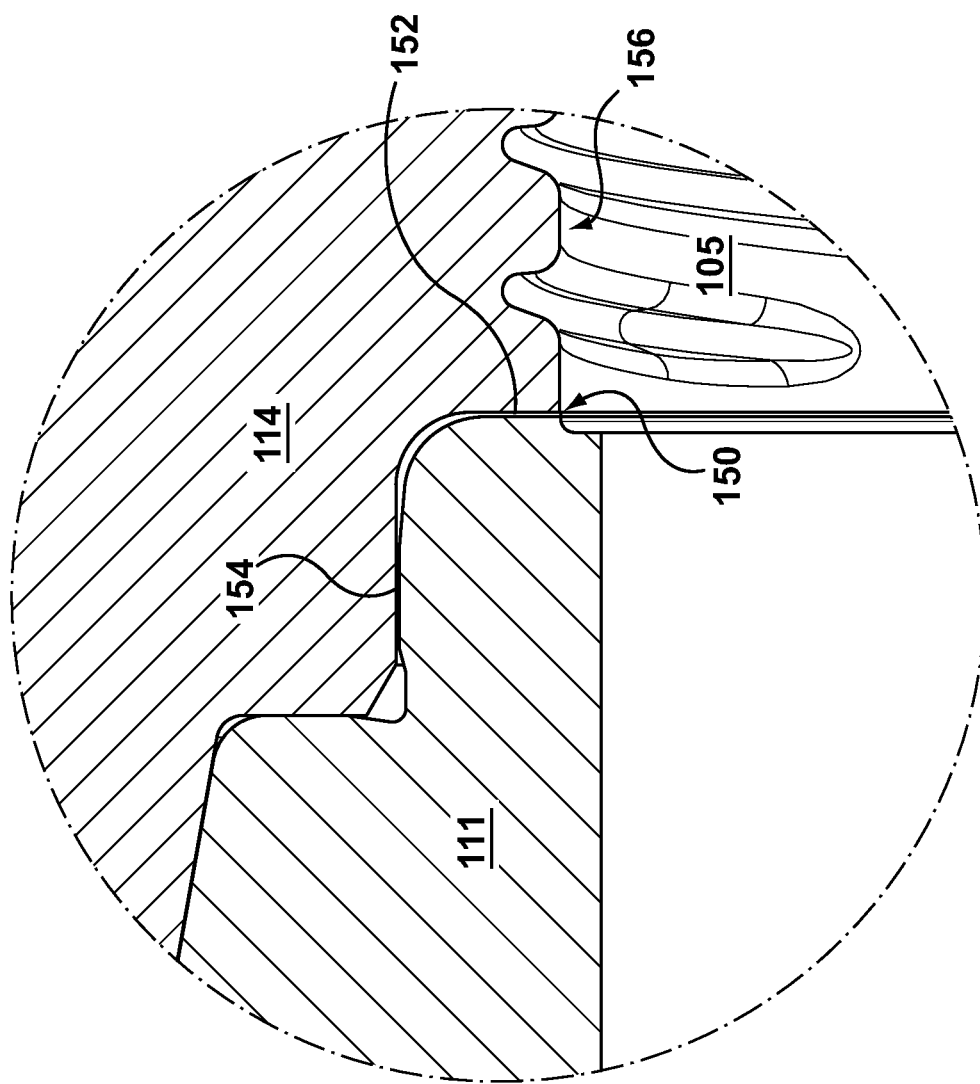

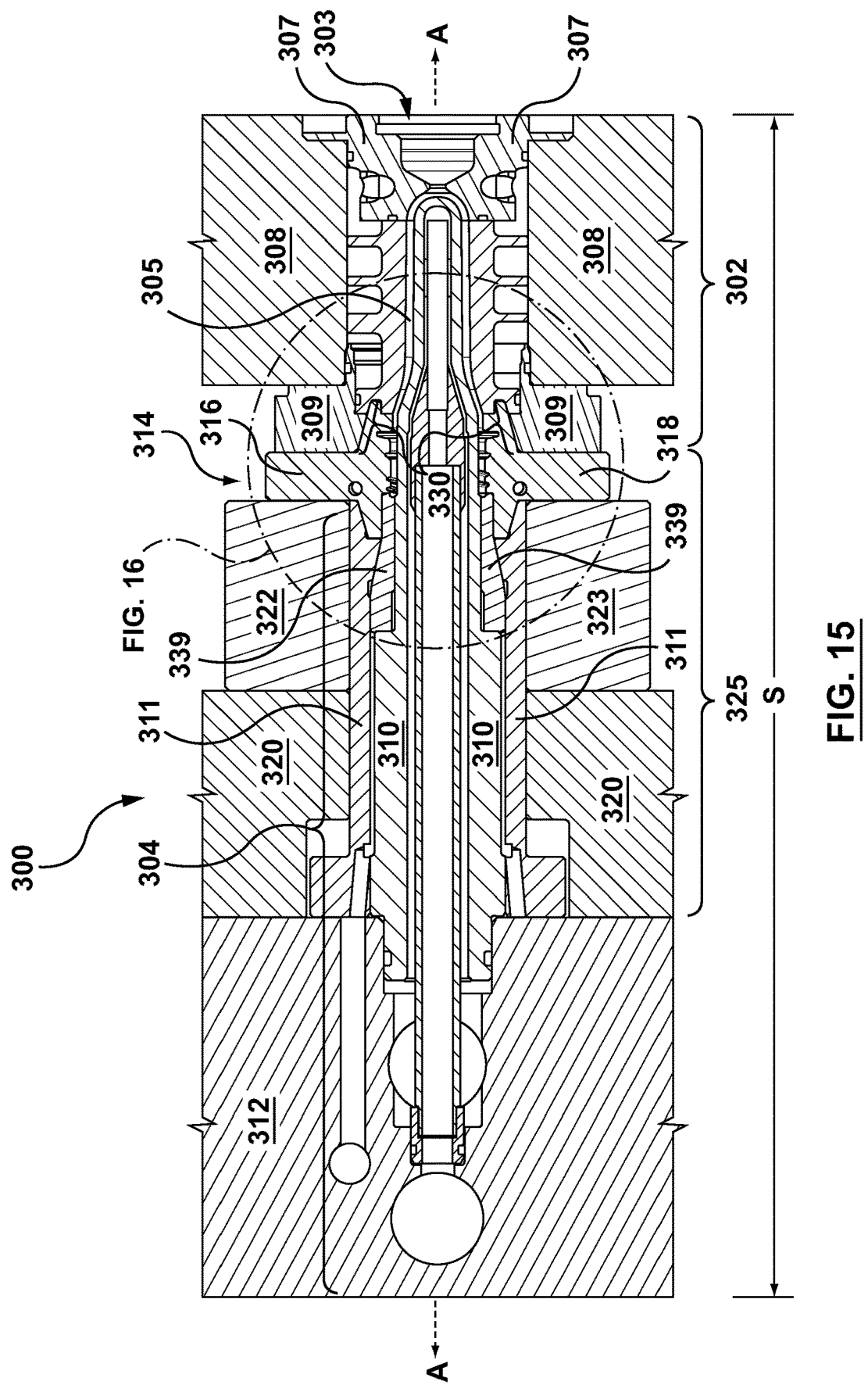

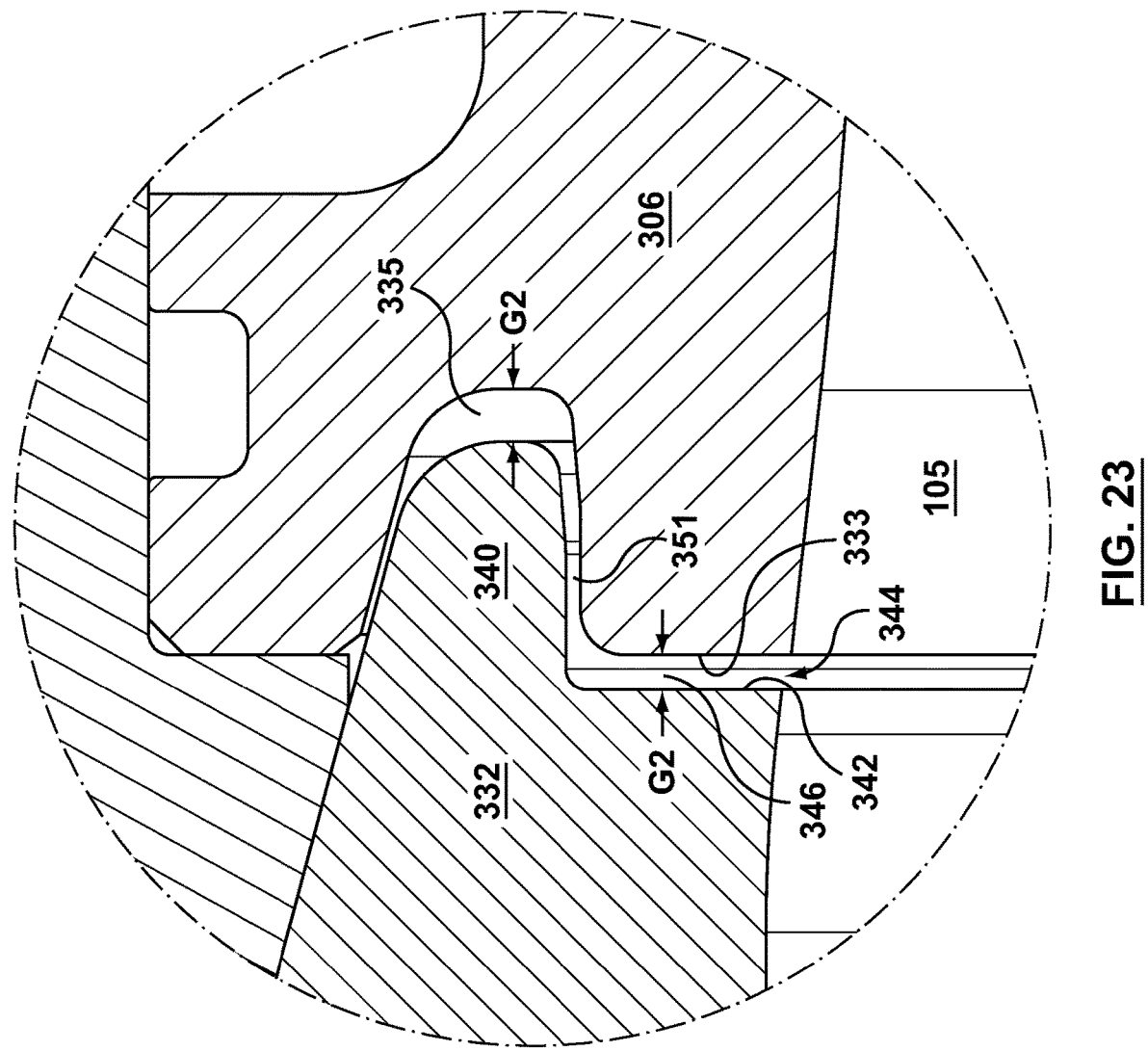

MOLDING SYSTEM HAVING A MOLD STACK WITH A CLEANING CONFIGURATION AND A SHUT HEIGHT ADJUSTMENT MECHANISM

RELATED APPLICATIONS

This application is a divisional of U.S. patent application Ser. No. 16/886,122 filed May 28, 2020, which is a divisional of U.S. patent application Ser. No. 15/552,606 filed Aug. 22, 2017, which is a national phase entry of PCT/CA2016/050184 filed Feb. 24, 2016 and claims priority from U.S. Patent Application No. 62/135,987 filed Mar. 20, 2015, the entire disclosures of which are incorporated herein by reference thereto.

TECHNICAL FIELD

The present disclosure relates to molding systems and molds, and in particular to injection molds having a mold stack with a cleaning configuration and/or a shut height adjustment mechanism.

BACKGROUND

A molding system, such as an injection molding system, forms molded articles from a molding material. The molding material may be a plastic or resin material, such as Polyethylene Terephthalate (PET) for example. The molded article may be a container, or a container precursor such as a preform capable of being subsequently blown into a beverage container (e.g. a plastic bottle).

An injection molding system may heat a molding material, such as PET, to a homogeneous molten state, in which state the molding material may be referred to as "melt." The melt may be injected, under pressure, into a molding cavity that is defined by a collection of components referred to as a "mold stack." The mold stack typically includes, among other components, a female cavity piece and a male core piece attached to a cavity plate and a core plate respectively. The molding cavity that is defined by the mold stack may have a shape that substantially corresponds to a final cold-state shape of the article to be molded.

During injection of melt, a clamp force is applied to the cavity and core plates that is sufficient to keep the cavity and the core pieces together despite the opposing force of the pressurized melt within the molding cavity. Once the molding cavity has been filled with melt, the molded article is typically allowed to cool and harden within the molding cavity for a brief period of time. Cooling may cause the molded article to shrink within the molding cavity such that, when the cavity and core plates are urged apart, the molded article may remain associated with the core piece. The molding system may use various types of ejection structures to assist in removing the molded article from the core piece. Examples of ejection structures include stripper plates and ejector pins.

A molded article such as a preform may have a neck portion (or "neck finish") having various features in relief. The neck portion features may include one or more of: threads for accepting and retaining a closure assembly (e.g. a bottle cap); an anti-pilferage assembly configured to cooperate with the closure assembly to indicate whether the end product (e.g. a beverage container filled with a beverage) has been tampered with; and a support ledge that cooperates with parts of the molding system. The relief of these features is such that removal of the neck portion from a molding cavity defined by a unitary female cavity piece would be difficult or impossible. For this reason, the neck portion is typically defined by a split mold insert (also referred to as a neck ring) designed to separate laterally into two or more parts/halves to release the neck portion of the cooled molded article for axial ejection from the core piece.

At the beginning of an injection molding cycle, a molding cavity is empty, i.e. filled with air. As melt is injected, the melt progressively replaces the air within the molding cavity. The air is typically vented from the molding cavity through vents that are defined between mold stack components at or near the end of the melt flow path within the molding cavity. Vents may be sized to permit passage of a gas (normally air) therethrough without permitting passage of melt therethrough. The vent sizes may be set based on the type and/or viscosity of the melt to be used. For example, in the case where the molding material is PET, the vents may comprise gaps approximately 30 to 40 microns wide. The venting may promote molded article quality by reducing or eliminating a risk of trapped air within the molding cavity, which might otherwise cause imperfections in the molded article.

When an injection molding system is operated over many molding cycles, a residue may accumulate on vent surfaces. The residue may for example be made up of material dust, contaminants or other particles. An excessive buildup of such residue may prevent air from being properly or completely vented from the molding cavity, which may jeopardize the quality of the molded article.

SUMMARY

According to one aspect of the present disclosure, there is provided a mold stack comprising: two adjacent mold stack components for collectively defining at least a portion of a molding cavity; a vent, at least partially defined by one of the mold stack components, that is adjustable between: a molding configuration wherein the vent is configured to vent gas from the molding cavity while preventing passage of any substantial amount of melt therethrough; and a cleaning configuration wherein the vent is configured to receive melt from the molding cavity for cleaning the vent; and a junction, defined between two respective mating faces of the two mold stack components, that is adjustable between: a molding configuration wherein the mating faces contact one another to define a parting line of the molding cavity; and a cleaning configuration wherein the mating faces are separated to create a space between the mating faces, the space acting as an extension of the molding cavity, and wherein the junction further defines an auxiliary melt barrier for preventing uncontrolled flashing from the extension.

In some embodiments the auxiliary melt barrier comprises an auxiliary vent configured to vent gas from the extension of the molding cavity while preventing passage of melt from the extension of the molding cavity.

In some embodiments the junction comprises a tongue and groove interface.

In some embodiments the auxiliary vent is between a tongue and a groove of the tongue and groove interface.

In some embodiments the auxiliary vent is substantially parallel to an operational axis of the mold stack.

In some embodiments the two adjacent mold stack components are a split mold insert and a cavity insert.

In some embodiments the groove is an annular groove in an end of the cavity insert.

In some embodiments the split mold insert has a tapered male portion and the tongue is an annular tongue at a distal end of the tapered male portion.

According to another aspect of the present disclosure, there is provided a method of cleaning a vent in a mold stack, the method comprising: adjusting two mold stack components of a mold stack, from: a molding configuration, wherein the two mold stack components collectively define at least a portion of a molding cavity, wherein a vent at least partially defined by one of the mold stack components is configured to vent gas from the molding cavity while preventing passage of any substantial amount of melt therethrough, and wherein two respective mating faces of the two mold stack components contact one another at a junction of the mold stack components to define a parting line of the molding cavity, to: a cleaning configuration, wherein the vent is dimensioned to receive melt, and wherein the mating faces are separated to create a space between the mating faces, the space acting as a molding cavity extension, and wherein the junction defines an auxiliary melt barrier; and injecting melt into the molding cavity, the injected melt entering into the vent and into the molding cavity extension but being prevented from flashing beyond the molding cavity extension by the auxiliary melt barrier.

In some embodiments the two adjacent mold stack components are a split mold insert having a tapered male portion and a cavity insert at least partially defining a tapered female seat and the adjusting comprises partially withdrawing the tapered male portion from the tapered female seat.

According to another aspect of the present disclosure, there is provided a mechanism for adjusting a shut height of a mold, comprising: a mold component movable along an operational axis of the mold; a stop member movable along the operational axis of the mold relative to the mold component, the stop member having a first stop for providing a first gap on a front side of the mold component when the stop member is in a deployed position, the stop member further having a second stop for providing a second gap on a back side of the mold component when the stop member is in the deployed position; and a spacer movable between an inboard position aligned with the stop member and an outboard position out of alignment with the stop member, the spacer for selectively blocking, and thereby deploying into the deployed position, the stop member.

In some embodiments the first stop is defined by a forward section of the stop member and the second stop is defined by a rear section of the stop member.

In some embodiments the mold component is a first mold component, the forward section of the stop member extends from the head end of the stop member through to and including the first stop, and the forward section of the stop member is receivable within an opening through a thickness of a second mold component adjacent to the first mold component within the mold.

In some embodiments a length of the forward section of the stop member exceeds the thickness of the second mold component.

In some embodiments the first mold component is a stripper plate and the second mold component is a core plate.

In some embodiments the rear section of the stop member extends between a tail end of the stop member and the first stop, and the rear section is slidably receivable within a hole through a thickness of the mold component.

In some embodiments the rear section of the stop member comprises one or more peripheral grooves, each of the peripheral grooves for retaining an O-ring.

In some embodiments a length of the rear section of the stop member exceeds the thickness of the mold component.

In some embodiments the first stop comprises a protrusion protruding from the stop member.

In some embodiments the protrusion comprises a radial flange.

In some embodiments the second stop comprises a tail end of the stop member.

In some embodiments the tail end of the stop member is configured to engage an adjacent mold component for providing the second gap on the back side of the mold component.

In some embodiments the adjacent mold component is a tonnage block or a cavity plate.

In some embodiments the mechanism further comprises a retaining mechanism for retaining the stop member with the mold component so that the stop member has a limited range of play, relative to the mold component, along the operational axis of the mold.

In some embodiments the mechanism comprises a retaining pin attached to the mold component, the retaining pin and the mold component collectively encompassing at least a portion of the radial flange in order to define the limited range of play.

In some embodiments the spacer, when in the outboard position, vacates a space for receiving a head end of the stop member when the stop member is in a stowed position.

In some embodiments the spacer is reciprocable in a direction orthogonal to the operational axis of the mold.

According to another aspect of the present disclosure, there is provided a method of increasing a shut height of a mold, comprising: opening the mold along an operational axis of the mold; moving a spacer from an outboard position, out of alignment with a stop member of the mold, to an inboard position, in alignment with the stop member of the mold; providing relative movement between the stop member and the spacer along the operational axis of the mold until the spacer blocks the stop member and thereby deploys the stop member into a deployed position; providing relative movement between the mold component and the deployed stop member until a first stop of the deployed stop member engages the mold component to provide a first gap on a front side of the mold component, whereupon a second stop of the deployed stop member is disposed to provide a second gap on a back side of the mold component; and closing the mold along the operational axis of the mold.

In some embodiments the method further comprises, before the moving of the spacer from the outboard position to the inboard position, providing relative movement between the stop member and the spacer until the stop member clears the spacer.

In some embodiments the stop member is retained with the mold component by a retaining mechanism that provides the retained stop member with a degree of play relative to the mold component along the operational axis of the mold, and the providing of the relative movement between the stop member and the spacer comprises moving the mold component with the retained stop member towards the spacer.

In some embodiments the providing of the relative movement between the mold component and the deployed stop member comprises moving the mold component towards the spacer until the first stop of the deployed stop member engages the mold component.

According to another aspect of the present disclosure, there is provided a mold stack for defining a molding cavity for molding a preform, the mold stack comprising: a lock ring defining a tapered female seat; a split mold insert defining a molding surface of the molding cavity for molding a neck finish portion of the preform, the split mold insert having a split tapered male portion configured to cooperate with the tapered female seat of the lock ring to align and hold closed the split mold insert, the split mold insert further defining a pocket that extends coaxially through the split tapered male portion; a core ring defining a molding surface of the molding cavity for molding at least a portion of a top sealing surface of the preform, the core ring configured to be received within the pocket defined in the split mold insert; and a vent for evacuating air from the molding cavity, the vent including: a primary vent; and a secondary vent, wherein the primary vent and the secondary vent are each defined between the split mold insert and the core ring.

In some embodiments the primary vent is defined, in part, by a recessed face of the pocket in the split mold insert.

In some embodiments the secondary vent comprises a gap, between the split mold insert and the core ring, that is substantially parallel to an axis of operation of the mold stack.

In some embodiments the primary vent comprises a gap, between the split mold insert and the core ring, that is substantially orthogonal to an axis of operation of the mold stack.

Other features will become apparent from the drawings in conjunction with the following description.

DESCRIPTION OF THE DRAWINGS

In the figures, which illustrate non-limiting example embodiments:

FIGS. 5 and 6 are a perspective view and plan view, respectively, of a split mold insert component of the mold of FIG. 1 in the standard molding configuration;

FIG. 7 is a perspective view of the split mold insert of FIGS. 5 and 6 separated into its two component halves with their respective mating faces visible;

FIG. 8 is a close up view of a portion of the cross-sectional view of FIG. 3

FIG. 15 is a cross-sectional elevation view of a portion of another mold embodiment illustrating a single mold stack in a molding configuration;

FIG. 23 is a close up view of a portion of the cross-sectional view of FIG. 20;

DETAILED DESCRIPTION OF THE NON-LIMITING EMBODIMENT(S)

Figure 1:
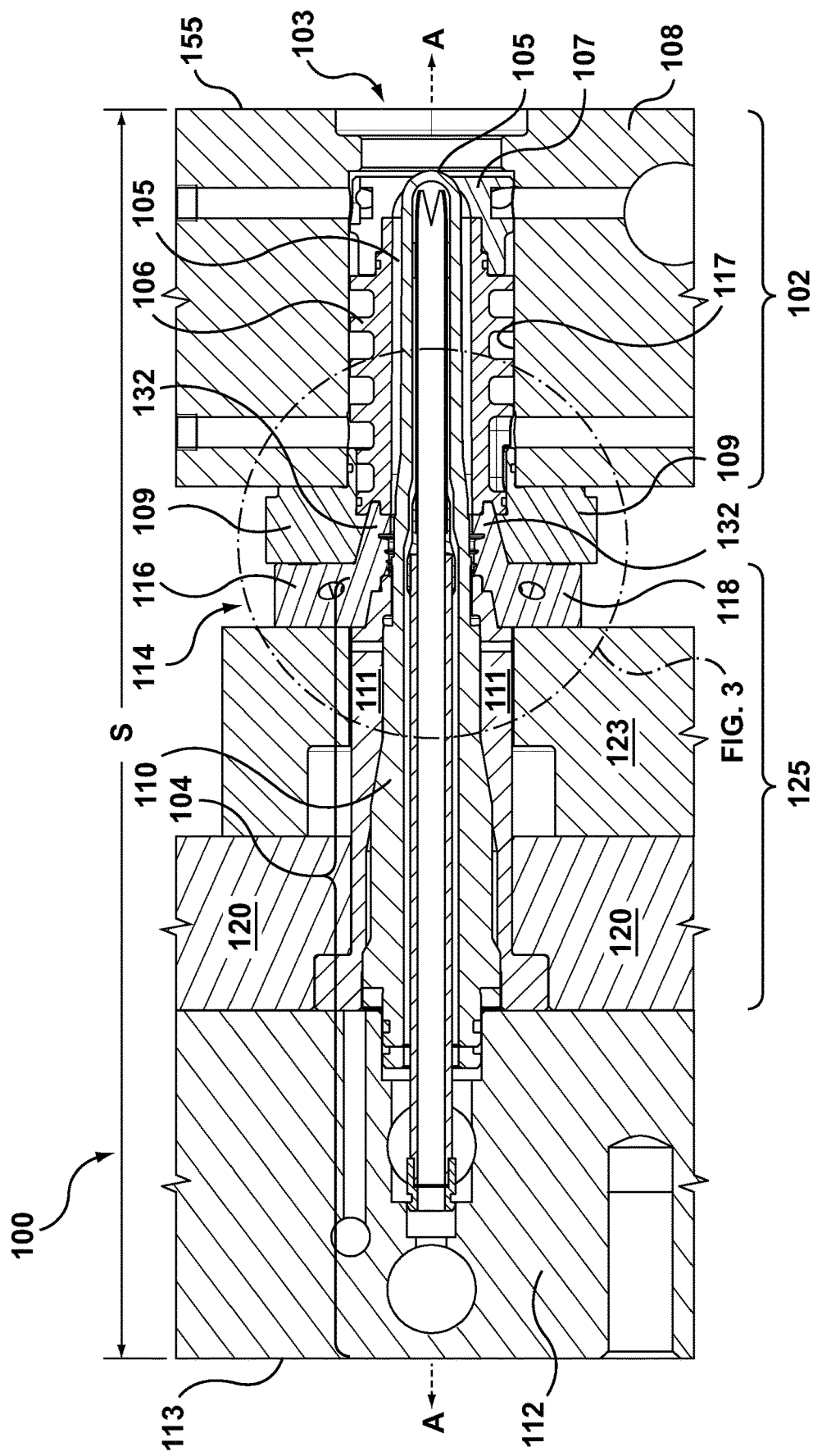
FIG. 1 is a cross-sectional view of a portion of a mold illustrating a single mold stack in a standard molding configuration.

In the description that follows, terms such as "top," "bottom", "right," "left," "back," "front," "horizontal," "vertical," "forward" and "rear" used with respect to system components in the drawings should not be understood to necessarily connote a particular orientation of the components during use.

With reference to FIG. 1, there is depicted a cross-sectional elevation view of a portion of a mold 100. The example mold 100 produces a molded article, which in this example is a preform 101 illustrated in FIG. 2. The portion of mold 100 shown in FIG. 1 is a longitudinal cross-section of a single mold stack 103 used to produce a single preform 101. It will be appreciated that this mold stack 103 may be one of many similar mold stacks (not illustrated) within the mold 100 that may collectively mold numerous preforms in a single batch during a single injection molding cycle. The mold 100 may include other components, which have been omitted from FIG. 1 for the sake of brevity.

Figure 2:
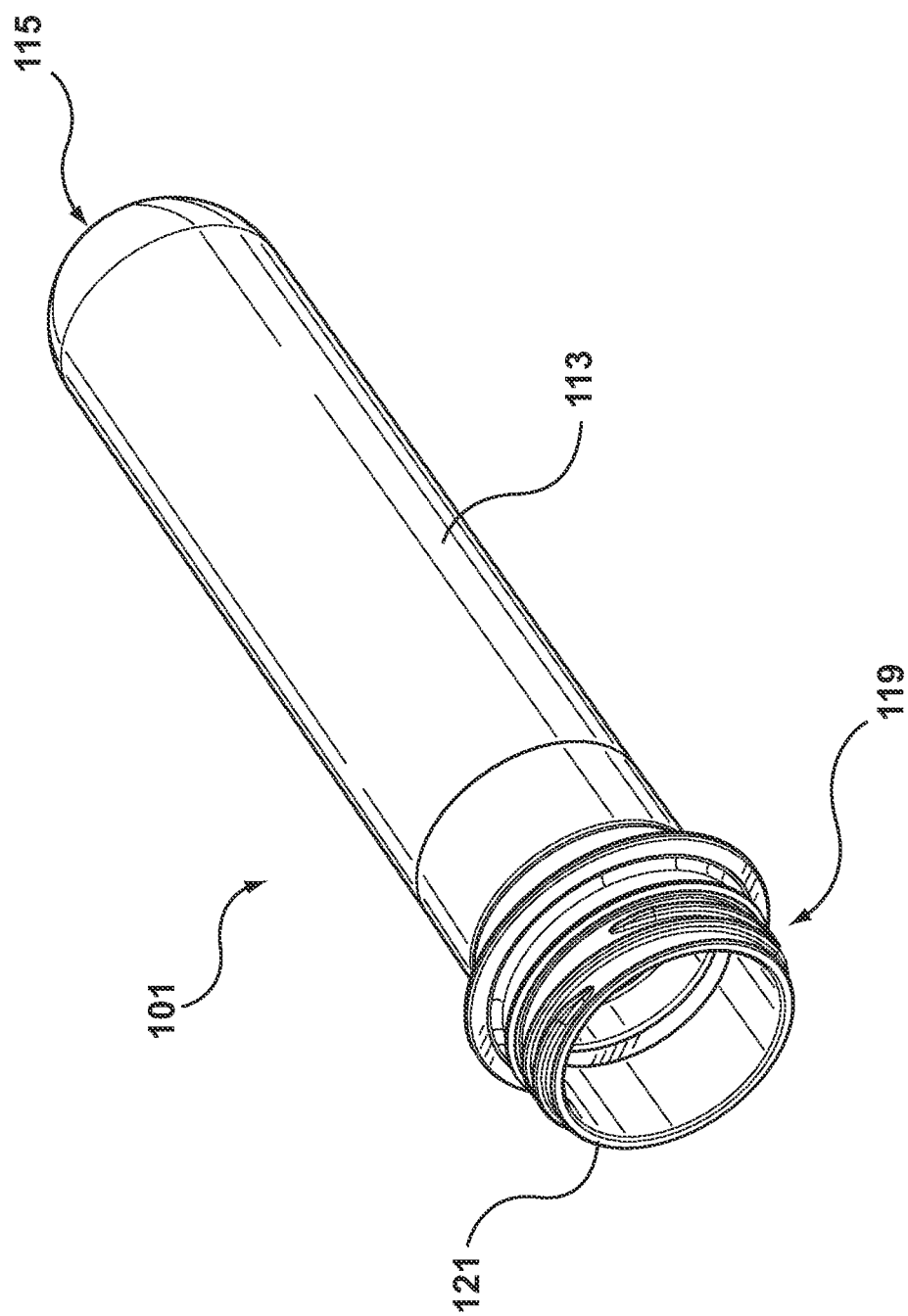
FIG. 2 is a perspective view of a molded article that may be molded by the mold of FIG. 1 in the standard molding configuration.

The mold stack 103 of FIG. 1 is in a production or molding configuration, i.e. in a configuration suitable for receiving melt into the molding cavity 105 and forming the preform 101 shown in FIG. 2. It will be appreciated that the mold stack 103 also has other configurations, including a vent-cleaning configuration (also referred to as a "residue-cleaning configuration" or simply as a "cleaning configuration"), that will be described below.

The example mold 100 of FIG. 1 includes a pair of mold halves that are relatively moveable along an operational axis A of the mold. The first mold half includes a cavity plate assembly 102. The second mold half includes a core plate assembly 104 and a stripper plate assembly 125 that is moveable relative thereto along the operational axis A.

The cavity plate assembly 102 includes a cavity insert 106 (a form of cavity piece), a gate insert 107, a cavity flange 109 and a cavity plate 108. The cavity flange 109 retains the cavity insert 106 and gate insert 107 within a bore 117 in the cavity plate 108. The cavity insert 106 defines an exterior shape of a body 113 (FIG. 2) of the preform 101 to be molded. The gate insert 107 defines an exterior shape of a closed end 115 (FIG. 2) of the preform 101 to be molded and defines a gate (aperture) through which melted molded material is injected into the molding cavity. For clarity, the components 106 and 107 are referred to as "inserts" because they are designed as modular components for insertion into the bore 117, to facilitate mold manufacturing and servicing. In alternative embodiments, the cavity piece 106 and gate insert 107 could form part of the plate 108 and/or may comprise a single component.

The core plate assembly 104 includes a core insert 110 (a form of core piece) that defines an interior surface of the preform 101 to be molded. The core plate assembly 104 also includes a lock ring 111 configured to define a portion of the top sealing surface 121 of the preform 101 (FIG. 2). The lock ring is also configured to retain the core insert 110 to a core plate 112.

The stripper plate assembly 125 comprises a stripper plate 120, slider bars 122, 123 slidably coupled to the stripper plate, and a split mold insert 114 for defining the neck finish 119 of the preform 101 (FIG. 2). The split mold insert 114 comprises a pair of complementary split mold insert halves 116, 118 that are attached to slider bars 122, 123 respectively. The slider bars 122, 123 are operable to separate the split mold insert halves 116, 118 laterally (vertically in FIG. 1), e.g. during molded article release.

As shown in FIG. 1, the mold 100 has an operational axis A. The operational axis A may be considered as an axis along which major components of the mold 100, such as the cavity plate assembly 102, core plate assembly 104 and stripper plate assembly 125, are moved during operation of the mold through an injection molding cycle. For example, the core plate assembly 104 and stripper plate assembly 125 can be moved along operational axis A with respect to the cavity plate assembly 102 to open the mold for ejecting the preform 101 or to close of the mold in preparation for a subsequent injection molding cycle. Similarly, the stripper plate assembly 125 is movable along operational axis A with respect to each of the cavity plate assembly 102 and core plate assembly 104. Movement of the stripper plate assembly 125 away from the core plate assembly 104, with the split mold insert halves 116, 118 supporting the neck finish 119 of preform 101, may facilitate stripping of the preform 101 from the core insert 110 during normal molding operation. In the present embodiment, the cavity plate assembly 102 is stationary.

The operational axis A of the mold 100 may alternatively be referred to as the operational axis of the mold. The term "mold" as used herein refers to the cavity plate assembly 102, core plate assembly 104 and stripper plate assembly 125, whereas the term "molding system" refers not only to those components but to other components, such as a mold clamp and an injection unit (not illustrated in FIG. 1). The operational axis A of the mold 100 is parallel to a longitudinal operational axis of the mold stack 103 (i.e. the axis along which the cavity and core pieces of the mold stack are opened and closed), and thus may also be considered as an operational axis of the mold stack 103.

The mold stack 103 depicted in FIG. 1 may be referred to as a cavity lock type of mold stack. The term "cavity lock" reflects a design whereby the split mold insert halves 116, 118 are "locked" together laterally (vertically in FIG. 1) by virtue of being snugly seated within a seat defined by the cavity portion of the mold stack 103, as clamping pressure is applied to the mold stack 103 in the axial direction. This relationship is illustrated in greater detail in FIG. 3.

Figure 3:
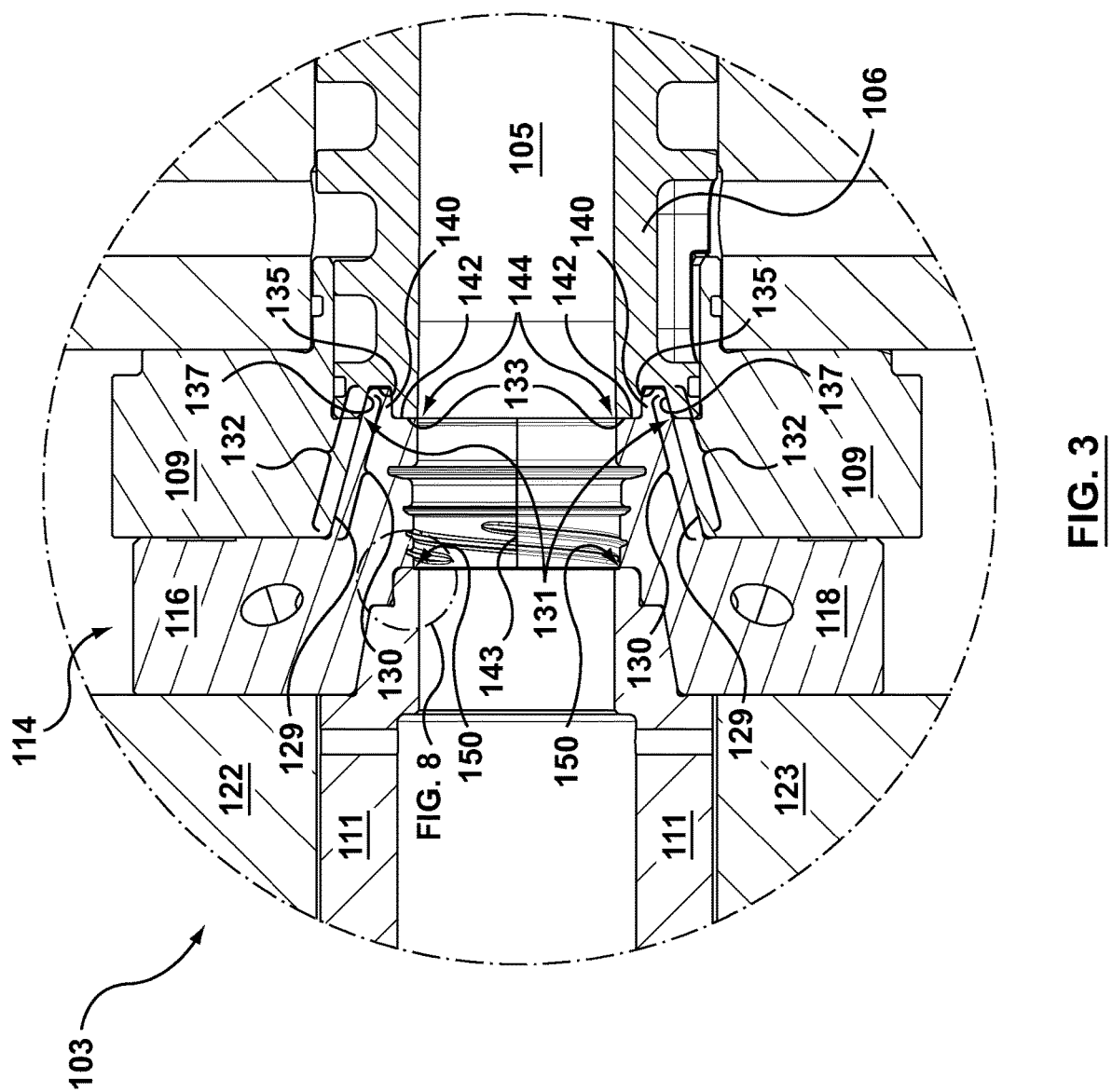
FIG. 3 is a close up view of a portion of the cross-sectional view of FIG. 1 with a core insert element removed for clarity.

Referring to FIG. 3, a close up cross-sectional elevation view of a portion of mold stack 103 is depicted. FIG. 3 illustrates the interaction between the lock ring 111, split mold insert 114, cavity flange 109 and cavity insert 106 when the example cavity lock type mold stack 103 is in the molding configuration. It should be noted that, in FIG. 3, the core insert 110 is omitted for clarity.

As illustrated, the cavity flange 109 and cavity insert 106 collectively define a tapered female seat 130 having a generally frusto-conical shape. The adjacent split mold insert 114 has a tapered male portion 132 with a complementary shape (i.e. generally frusto-conical) that allows the tapered male portion 132 to be snugly received within the tapered female seat 130 when the split mold insert 114 and the cavity insert 106 are in the mated molding configuration of FIG. 3. The shape of these features is perhaps best seen in FIGS. 4 and 5, which provide a perspective view of the tapered female seat 130 and a perspective view of the tapered male portion 132, respectively.

Figure 4:
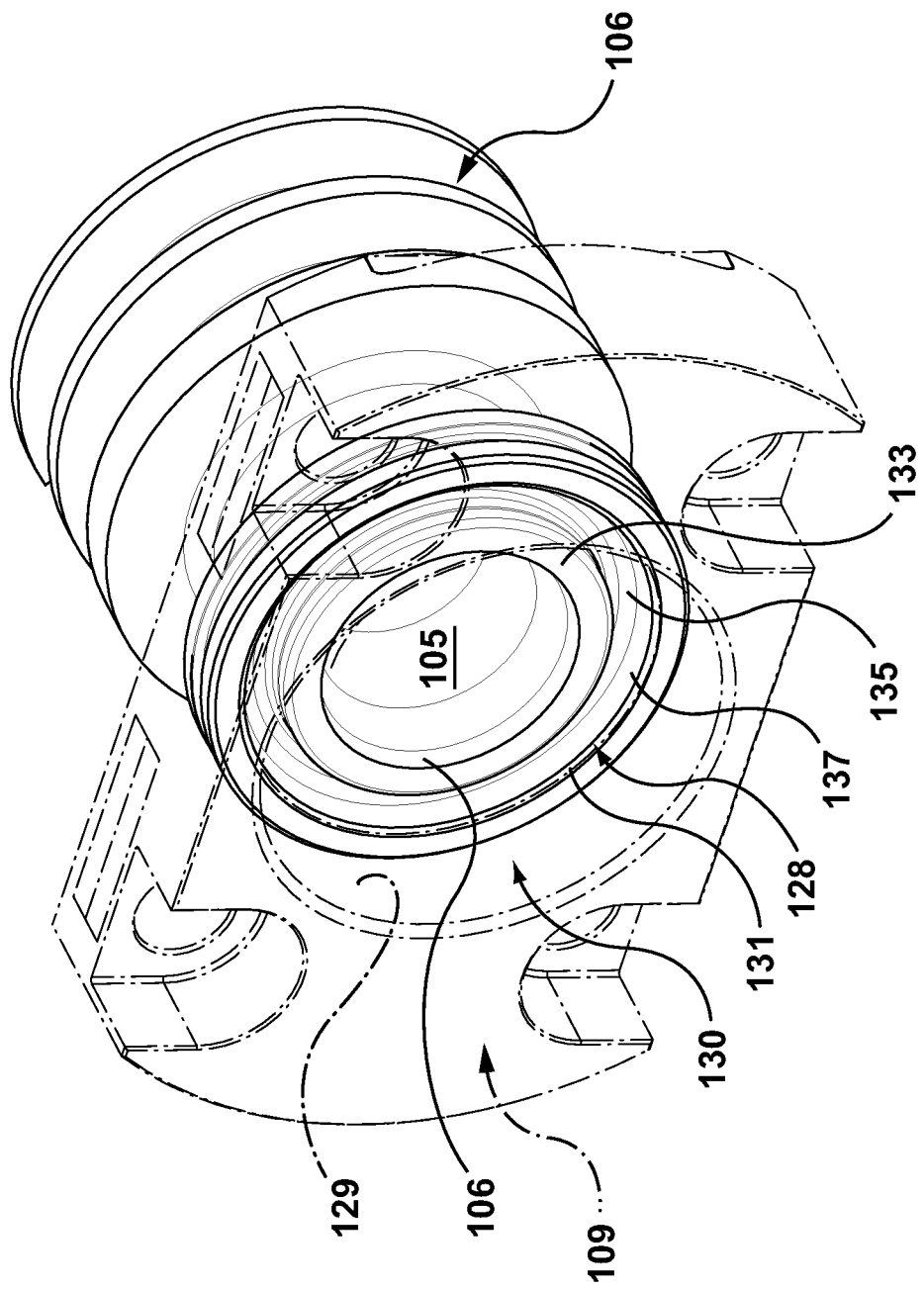
FIG. 4 is a perspective view of a tapered female seat formed by subcomponents of the mold of FIG. 1.

Referring to FIG. 4, it can be seen that the cavity insert 106 and cavity flange 109, which are illustrated in isolation from the remaining components of mold stack 103 (the latter being illustrated in dashed lines) collectively define the tapered female seat 130 of the present embodiment. The cavity flange 109 has a circular central aperture 128 defined by an inwardly tapered wall 129. The wall 129 ends at a parting line 131 that is formed between the cavity flange 109 and the cavity insert 106. The cavity insert 106 defines an annular groove 135 at the deepest portion of the tapered female seat 130. In the present embodiment, the annular groove 135 is formed between a central annular lip 133 and a surrounding wall 137 having a taper that matches the taper of wall 129 of cavity flange 109.

Turning to FIG. 5 in conjunction with FIG. 6, the split mold insert 114 is shown in perspective view and elevation view, respectively, in isolation from other mold stack components. In each of FIGS. 5 and 6, the spit mold insert 114 is shown in a molding configuration in which its halves 116, 118 are mated. The tapered male portion 132 of the insert 114 is split along a split line 143, with a first half 136 of the male portion 132 forming part of split mold insert half 116 and a second half 138 of the male portion 132 forming part of split mold insert half 118.

The split mold insert halves 116, 118 collectively define a vent 145 therebetween (i.e. the vent 145 is partially defined by split mold insert half 116 and is partially defined by split mold insert half 118). The vent 145 comprises a primary vent 149 (oriented horizontally in FIG. 6) in fluid communication with a secondary vent 147 (oriented vertically in FIG. 6). Each of the primary and secondary vents of the present embodiment comprises a gap between the split mold insert halves 116, 118. When the split mold insert 114 is in the molding configuration as shown in FIGS. 5 and 6, the vent 145 is configured to vent air from the molding cavity 105 while preventing passage of any substantial amount of melt therethrough. This may be achieved by appropriate dimensioning of the gaps comprising of each of primary vent 149 and secondary vent 147 (e.g. in the range of 30-40 microns, in the case where the molding material to be used is PET). It should be noted that in the molding configuration only the primary vent 149 of the vent 145 is relied upon to vent the molding cavity.

As shown in FIG. 6, the gap forming primary vent 149 is substantially orthogonal to an axis L of lateral separation of the two halves 116, 118, while the gap forming secondary vent 147 is parallel to the axis L of lateral separation of the two halves 116, 118. The primary vent 149 and secondary vent 147 thus may be considered to define an offset in the split line 143 between the split mold insert halves 116, 118. As will be appreciated, these relative gap orientations allow the vent 145 to continue to act as a vent (i.e. to vent air while preventing passage of melt) even when the split mold insert halves 116, 118 are slightly separated from one another when arranged in a residue cleaning configuration as described later on.

Turning to FIG. 7, the split mold insert 114 is illustrated in perspective view with the split mold insert halves 116, 118 being oriented so that their respective mating faces 190, 192 are visible. It will be appreciated that the view of FIG. 7 is for illustration purposes only and that the split mold insert halves 116, 118 are not actually used in this orientation.

As illustrated, the example vent 145 of the present embodiment comprises defines a series of grooves 141 defined in the mating face 192 of the split mold insert half 118. These grooves are for channeling the vented gas and venting it to the atmosphere. Such grooves are not necessarily present in other embodiments.

As should now be apparent from the foregoing description, when the mated halves 136, 138 of the tapered male portion 132 of split mold insert 114 are fully seated within the tapered female seat 130 (e.g. as shown in FIG. 3) and an axial clamping force is applied to the mold stack 103, the split mold insert halves 116, 118 are held together in the molding configuration despite the exertion of an opposing outward force pressurized melt within the neck finish area of the molding cavity 105.

Referring to FIGS. 3, 5 and 6, it can be seen that the tapered male portion 132 of the split mold insert 114 has a distal annular tongue 140 that is configured (e.g. shaped and sized) to be received within the annular groove 135 (FIG. 4) defined in the cavity insert 106 of the tapered female seat 130. These two features define a tongue and groove interface at a junction 144 between the split mold insert 114 and the cavity insert 106. When the cavity insert 106 and the split mold insert 114 are in the molding configuration of FIG. 3, the junction 144 acts as, or defines, a parting line between the cavity insert 106 and the split mold insert 114. The term "parting line" as used herein refers to a junction between two mold stack components that prevents melt from passing therethrough and, unlike a vent, is not intended or otherwise relied upon to vent gas therethrough.

In this example embodiment, the parting line is formed between mating faces that in the present embodiment, constitute the annular lip 133 of the cavity insert 106 and an inwardly projecting shoulder 142 of the split mold insert 114 (see, e.g., FIG. 3). As will be explained below, the junction 144 is designed to be adjustable between a molding configuration wherein the mating faces are in contact with one another to define a parting line of the molding cavity 105 (where the mold stack is in a molding configuration) and a cleaning configuration wherein the mating faces are separated to define a space therebetween that acts as an extension of the molding cavity 105, i.e. becomes part of the molding surface of the molding cavity 105 (when the mold stack 103 is in a residue cleaning configuration).

When the mold stack 103 is in the molding configuration, the split mold insert 114 and the lock ring 111 collectively define a vent 150 for venting air from the molding cavity 105 (see FIG. 3). The vent 150 is situated at or near an end of a flow path for melt within the molding cavity 105. Because melt will be injected into the molding cavity 105 via the gate insert 107 (i.e. from the right side of FIGS. 1 and 3) and will flow towards the neck finish 119 (i.e. leftwardly in FIGS. 1 and 3), the vent 150 will be among the last areas of the molding cavity 105 to be reached by the injected melt. Because advancing melt may push air ahead of it, the vent 150 may serve to vent any remaining air from within the molding cavity 105 near the conclusion of an injection molding cycle and may thus help promote molded article quality.

FIG. 8 provides a close-up view of a portion of the mold stack cross-section of FIG. 3 in which vent 150 is shown in greater detail. Referring to FIG. 8, it can be seen that the vent 150 comprises a primary vent 152 in fluid communication with a secondary vent 154. In FIG. 8, the primary vent 152 appears as a vertical gap between the split mold insert 114 and the lock ring 111, and the secondary vent 154 appears as a horizontal gap between the same two components. In the present embodiment, vent 150 is partially defined by the split mold insert 114 and partially defined by the lock ring 111.

When split mold insert 114 and lock ring 111 are in a molding configuration as shown in FIG. 8, the vent 150 is configured to vent air while preventing passage of melt, i.e. to allow air from the molding cavity 105 to pass therethrough without allowing any substantial amount of melt from the molding cavity 105 to pass therethrough. This may be achieved by appropriate dimensioning of the gaps of each of primary vent 152 and secondary vent 154 (e.g. in the range of 30-40 microns, in the case where the molding material to be used is PET). It should be noted that in the molding configuration only the primary vent 152 of the vent 150 is relied upon to vent the molding cavity.

When the mold 100 is operated over multiple molding cycles, residue may accumulate within the primary vent 152 of the vent 150 and likewise within the primary vents 149 of the vent 145 (FIG. 6) defined between the split mold insert halves 116, 118. The residue may for example be made up of molding material dust, contaminants or other particles. In traditional molding systems, removal of vent residue may be performed by taking the molding system out of operation, opening the mold stacks and manually scraping and/or cleaning the affected vent surfaces. A possible disadvantage of such an approach is the corresponding loss of production capacity and the manual labor involved and significant risk of damaging the mold.

To avoid the need for such traditional cleaning, the example mold stack 103 is configurable between the standard molding configuration, discussed above, and a vent-cleaning configuration. In the vent-cleaning configuration, mold stack components that normally cooperate to define vents therebetween are separated from one another slightly in order to widen the primary vents sufficiently for receiving melt from the molding cavity and yet maintain the secondary vents to contain the melt therein. Put another way, the primary vents to be cleaned are reconfigured to become extensions of the molding cavity. When a molding cycle is performed with the mold stack in the vent-cleaning configuration, melt from the molding cavity enters the widened vents as "intentional flashing." The extent of the flashing is controlled through the use of back-up or secondary vents designed to vent gas from the widened vents while preventing passage of any substantial amount of melt therethrough. Residue within the vents to be cleaned (i.e. the primary vents) may become incorporated into the flashing and may thus be removed when the molded article, complete with integral flashing, is ejected from the molding cavity. Such cleaning cycles may be scheduled to occur as needed, e.g. at predetermined time intervals, after a predetermined number of molding cycles, or on demand.

The present embodiment enhances the above-described vent-cleaning approach by additionally flashing areas that do not normally act as vents. By separating certain mold stack components that normally cooperate at a junction to define a parting line therebetween, the junction may be reconfigured to act as an extension of the molding cavity. The molding cavity extension has an auxiliary melt barrier (which may be an auxiliary vent) designed to contain the flashing within the extension. Thus, in the residue cleaning configuration of the present embodiment, controlled flashing occurs not only in vents to be cleaned of residue, but also within at least one junction that normally acts as a parting line. The utility of the foregoing relates not so much to a necessity to clean the parting line of any excess residue therein, although this is not precluded, rather it is the need to open the parting line to effect repositioning of the vents 145, 150, and in so doing necessitate some means of control to contain the melt within a molding space defined between the usual contacting faces of the parting line and thereby preclude an uncontrolled flashing of the mold stack.

Figure 9:
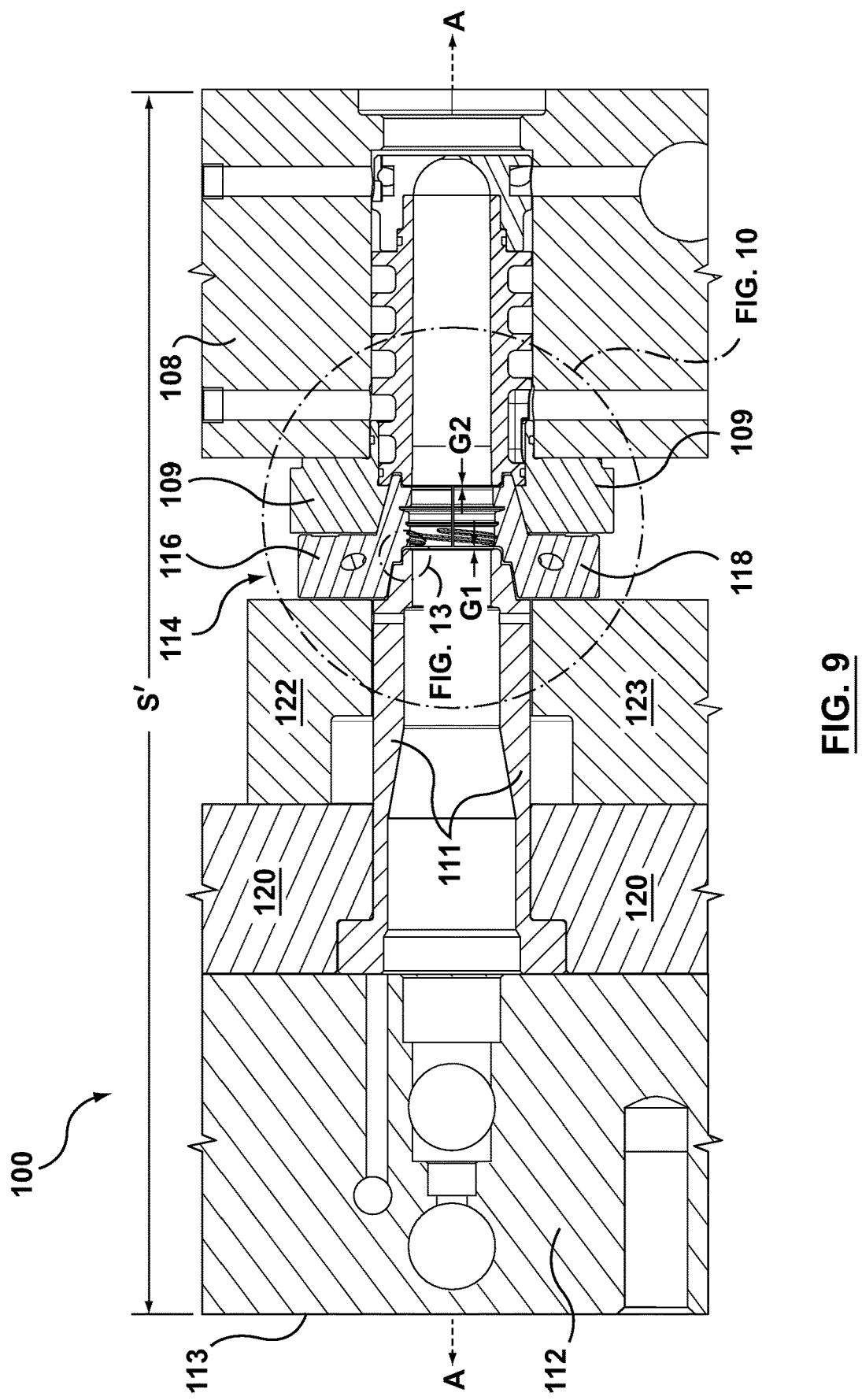
FIG. 9 is a cross-sectional view of the same portion of the mold as shown in FIG. 1 but with the mold stack in a residue cleaning configuration.
Figure 10:
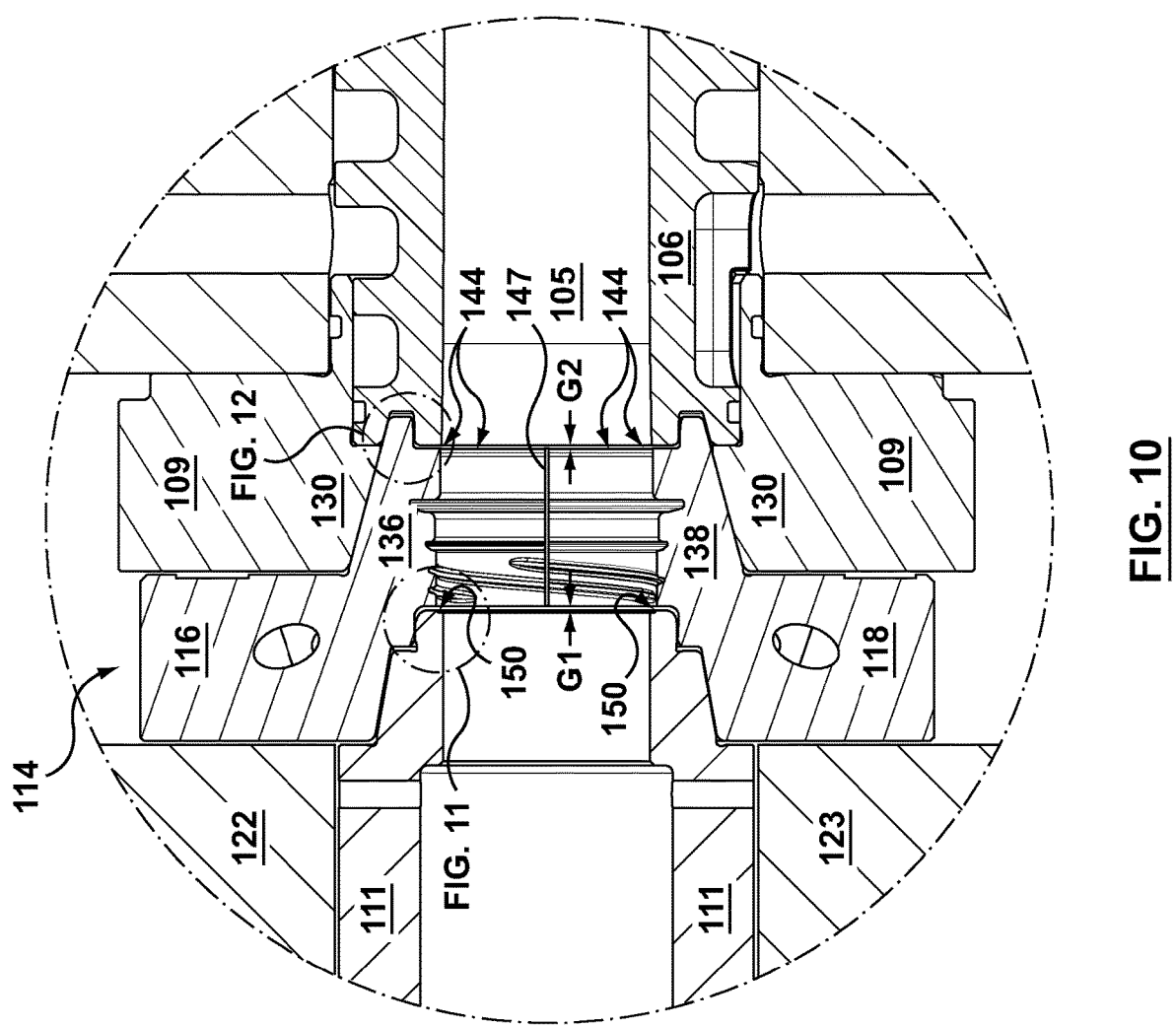
FIG. 10 is a close up view of a portion of the cross-sectional view of FIG. 9 with a core insert element being removed for clarity.

FIGS. 9-14 illustrate various aspects of the example mold 100 in a cleaning configuration. FIG. 9 is a cross-sectional elevation view showing the same portion of mold 100 as is shown in FIG. 1 but with the core insert 110 omitted for sake of clarity. FIG. 10 provides close up cross-sectional elevation view of a portion of FIG. 9 illustrating interaction between the lock ring 111, split mold insert 114, cavity flange 109 and cavity insert 106 when the example cavity type mold stack 103 is in the cleaning configuration. FIGS. 11-14 are described below.

FIG. 9 differs from FIG. 1 in that the shut height S' of the mold 100 of FIG. 9 has been increased in comparison to the shut height S of the mold 100 of FIG. 1. In the injection molding industry, the term "shut height" is typically used to refer to the distance between the end faces of the mold halves (which may or may not include a melt distribution apparatus such as a hot runner, omitted in the drawing)—that is, a front surface 113 of core plate 112 and a back surface 155 of cavity plate 108. In FIG. 9, the shut height has been increased to S' so that the mold stack 103 can be placed into the cleaning configuration. The increase in shut height may be achieved by various types of shut height adjustment mechanisms, none of which are expressly illustrated in any of FIGS. 1-14. An example shut height adjustment mechanism is described below.

Referring to FIGS. 9 and 10, it can be seen that the increase in shut height from S to S' is attributable to the introduction of gaps G1 and G2 on opposite sides of the split mold insert 114. The first gap G1 is between the split mold insert 114 and the lock ring 111, and the second gap G2 is between the split mold insert 114 and the cavity insert 106. It will be appreciated that, by virtue of the introduction of gaps G1 and G2, it is now possible to perform controlled flashing, during a cleaning molding cycle, in three areas of the mold stack 103 in which flashing does not normally occur during a standard molding cycle.

Figure 11:
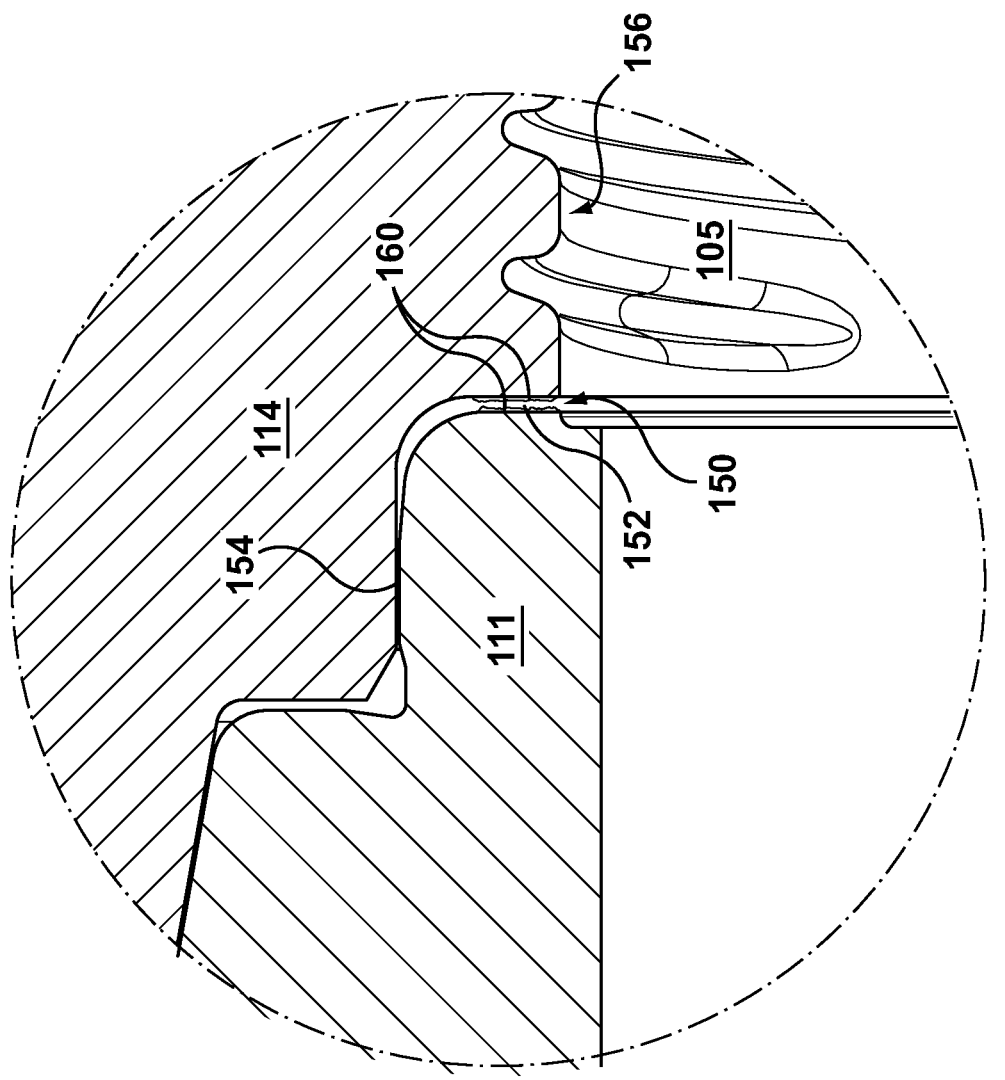
FIGS. 11 and 12 are close up views of portions of the cross-sectional view of FIG. 10.

The first area in which controlled flashing can now be performed, by virtue of the introduction of gap G1, is within the vent 150 between the lock ring 111 and the split mold insert 114, and specifically within the primary vent 152 portion of that vent. Referring to FIG. 11, it can be seen that, in the cleaning configuration, the size (width) of the primary vent 152 has increased from its molding configuration size (as in FIG. 8), which prevents passage of any substantial amount of melt, to an increased size (as in FIG. 11), which permits melt to enter the primary vent 152 for incorporation and removal of a residue 160. Notably, the dimension of the secondary vent 154 in the cleaning configuration of FIG. 11 remains the same, or substantially the same, as in the molding configuration (see FIG. 8). As such, the secondary vent 154 remains suitably dimensioned for venting gas (air) while substantially preventing passage of melt. In effect, the secondary vent 154 takes over the function of the primary vent 154 in this configuration and thereby prevents the flashing from being uncontrolled.

Figure 12:
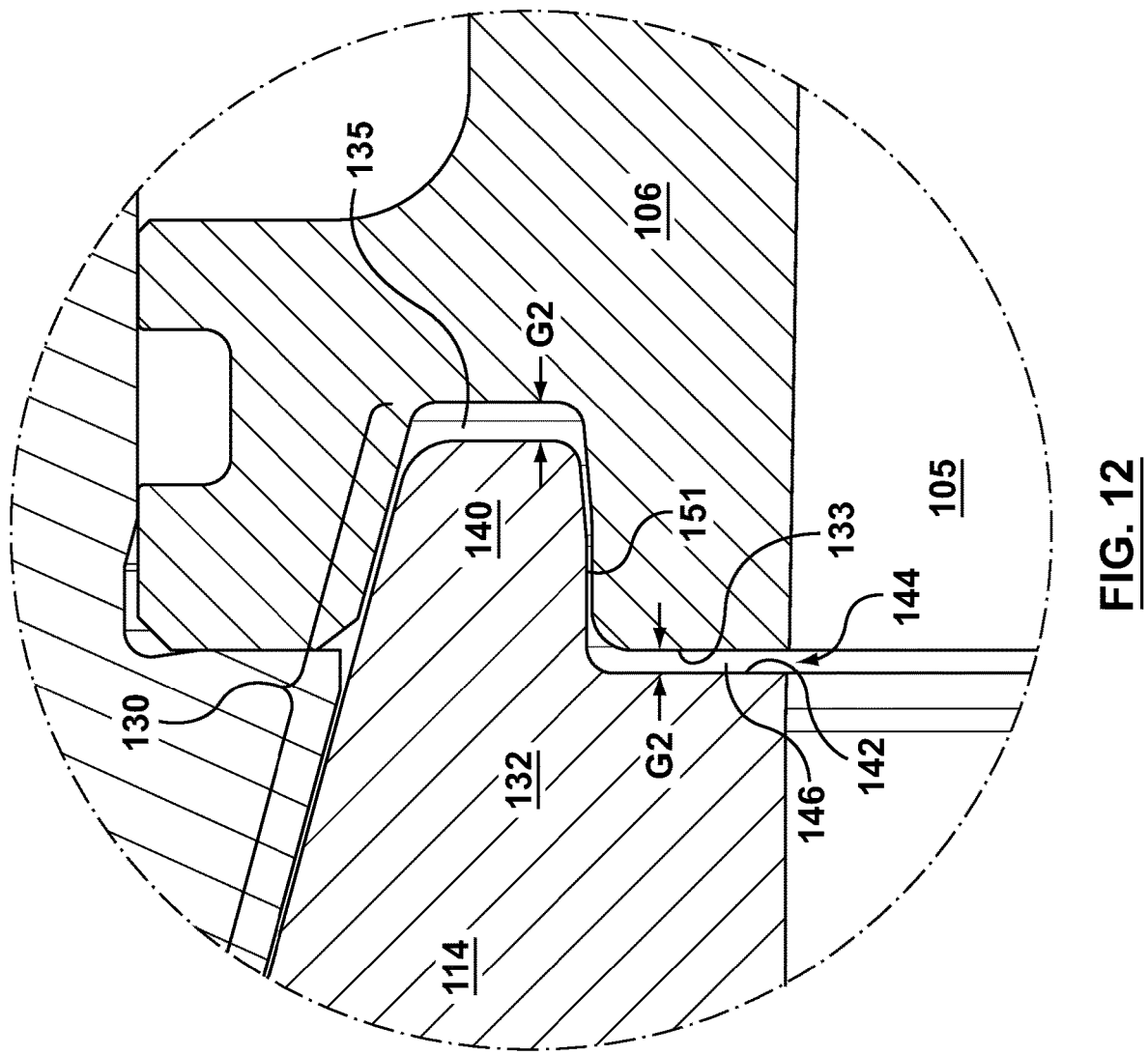

The second area in which controlled flashing can now be performed, by virtue of the introduction of gap G2, is within the junction 144 between split mold insert 114 and cavity insert 106. Referring to FIG. 12, which provides a close-up cross-sectional view of that junction, it can be seen that, in the cleaning configuration of the mold stack 103, the tongue 140 has been withdrawn slightly from the groove 135.

Moreover, the annular lip 133 (mating face) of the cavity insert 106 has separated slightly from the inwardly projecting shoulder 142 (mating face) of the split mold insert 114 to define space 146 acts as a cavity extension 146 of the molding cavity 105 into which melt can be received.

The appropriate size of gaps G1 and G2 for allowing melt to enter the primary vent 152 and the cavity extension 146, respectively, may depend upon the type of molding material being used, but may for example be approximately 500 microns (0.5 mm) in the case of PET.

It is noted that flashing the cavity extension 146 does not serve a residue cleaning purpose because the junction 144 normally acts as a parting line rather than as a vent. As such, performing controlled flashing (or indeed any kind of flashing) into this junction may be considered counterintuitive.

In the cleaning configuration, the junction 144 also defines an auxiliary melt barrier 151 to prevent uncontrolled flashing of melt, i.e. to contain the melt within the cavity extension 146. The reason for containing the melt within the cavity extension is to reduce or eliminate a risk of flash inadvertently reaching adjacent components of the mold stack 103 in which the flash may interfere with smooth operation of the mold 100 during normal molding operation. In the present embodiment, the auxiliary melt barrier 151 is an auxiliary vent sized appropriately for venting gas while preventing passage of any substantial amount of melt (e.g. similarly to secondary vent 154 of FIG. 11).

In the present embodiment, the auxiliary vent 151 (FIG. 12) is oriented substantially longitudinally (axially) with respect to the mold stack 103 (i.e. the auxiliary vent is substantially parallel to the longitudinal or operational axis of the mold stack 103 and thus to the operational axis A of the mold 100). In contrast, the cavity extension 146, is oriented substantially transversely (radially) with respect to the mold stack 103 (i.e. the cavity extension 146 is substantially orthogonal to the longitudinal or operational axis of the mold stack 103). The auxiliary vent 151 and the cavity extension 146 of FIG. 12 are thus substantially orthogonal to one another.

In alternative embodiments, the auxiliary melt barrier 151 may be configured as a parting line that is not intended, and is not otherwise relied upon, to act as a vent.

Figure 14:
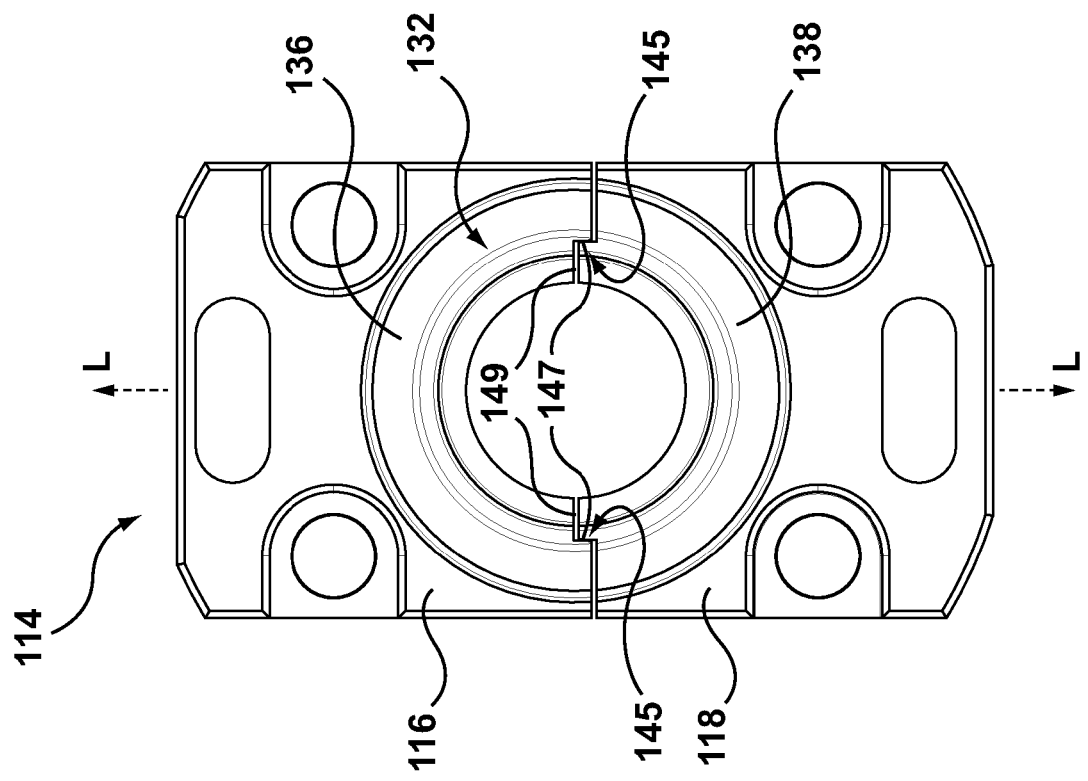
FIGS. 13 and 14 are a perspective view and plan view, respectively, of the split mold insert component of FIGS. 5 and 6 in the residue cleaning configuration.
Figure 13:
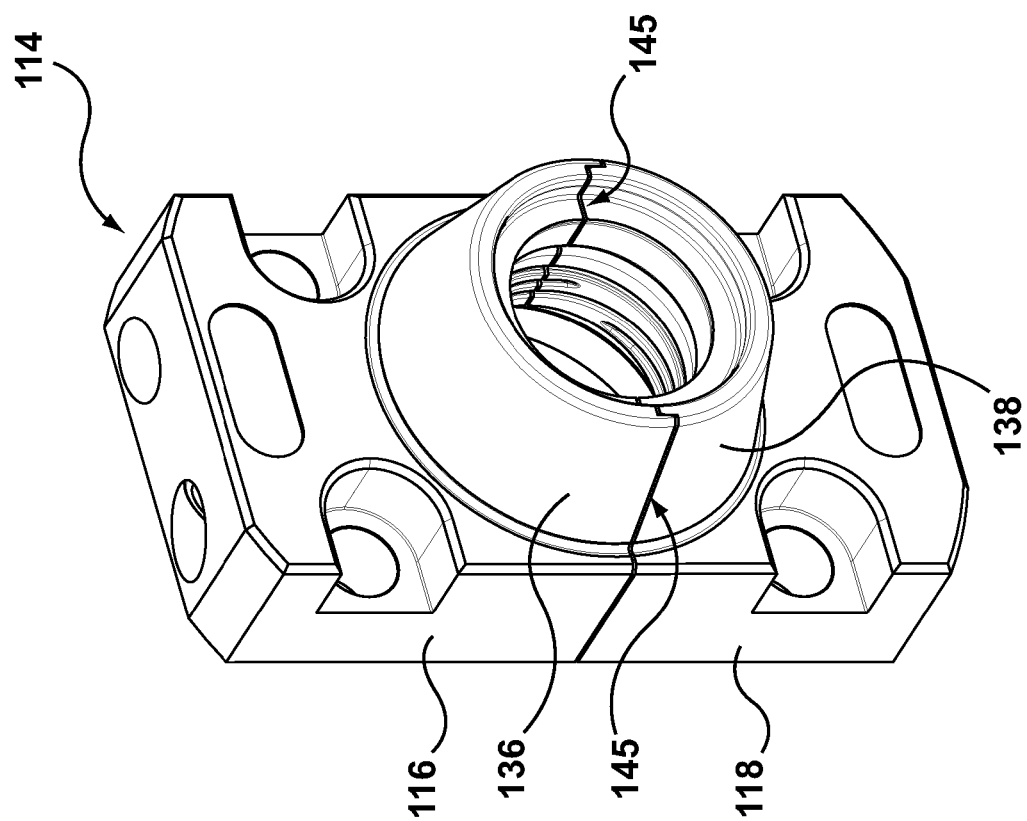

The third area in which controlled flashing can now be performed, also by virtue of the introduction of gap G2, is within the primary vent 149 portion of vent 145 between the split mold insert halves 116, 118. Referring to FIGS. 10, 13 and 14, it can be seen that, in view of gap G2 (FIG. 10) having been introduced between the split mold insert 114 and the cavity insert 106 (i.e. in view of the partial withdrawal of the tapered male portion 132 from the tapered female seat 130), the split mold insert halves 116, 118 are free to separate laterally to a dimension suitable for flashing to occur within the primary vent 149 (FIG. 14). Put another way, lateral separation of the split mold insert halves 116, 118 along the axis L (FIG. 14) has increased a width of the primary vent 149 sufficiently to allow melt to enter. In contrast, the size of the secondary vent 147, which has not substantially changed from its molding configuration size, remains at a suitable dimension for venting air without allowing any substantial amount of melt to pass therethrough, i.e. has remained generally constant. As such, the secondary vent 147 prevents uncontrolled flashing between the split mold insert halves 116, 118 when they are in the cleaning configuration shown in FIGS. 10, 13 and 14.

The tapered female seat 130 limits the degree of separating of the split mold insert halves 116, 118 by limiting a degree of separating of the associated halves 136, 138 of the tapered male portion 132 (see FIG. 10). The degree of separation of split mold insert halves 116, 118 may therefore be controlled by appropriately setting gap G2, e.g. by way of a shut height adjustment mechanism (such as the example mechanism described below).

Figure 14A:
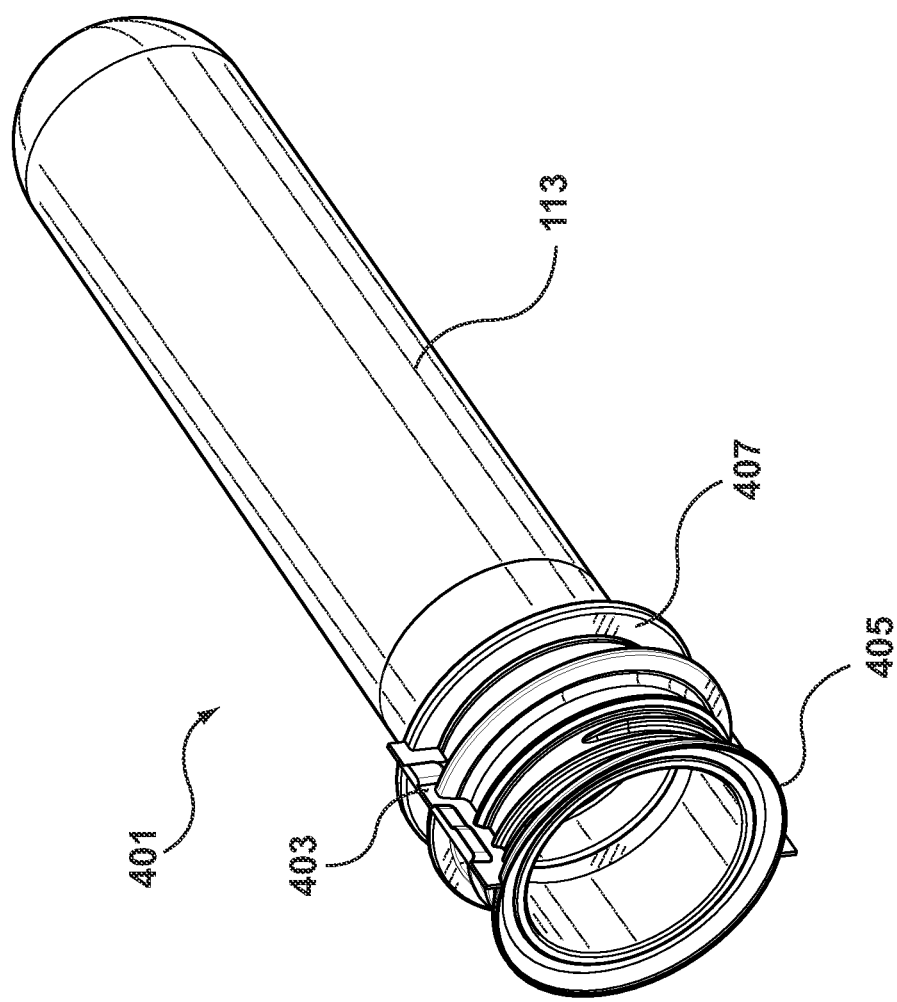
FIG. 14A is a perspective view of a molded article that may be molded by the mold of FIG. 9 in the residue cleaning configuration.

When an injection molding cycle is effected with the mold stack 103 in the cleaning configuration represented in FIGS. 9-14, the result may be a preform 401 as illustrated in FIG. 14A. With reference to that figure, it can be seen that the preform 401 has the appearance of a standard preform 101 (as in FIG. 2) with three additional flashing areas 403, 405 and 407 formed integrally with the preform 401. The first additional flashing area 403 has the shape of the widened primary vent 149 between the split mold insert halves 116, 118 (see FIG. 14). The second additional flashing area 405 has the shape of the widened primary vent 152 between the split mold insert 114 and the lock ring 111 (see FIG. 11). The third additional flashing area 407 has the shape of the cavity extension 146 formed between the mating faces of junction 144, i.e. between the inwardly projecting shoulder 142 of the split mold insert 114 and the lip 133 of cavity insert 106 (see FIG. 12).

In some embodiments, separation of the split mold insert halves 116, 118 into the cleaning configuration may be achieved with the use of a shut height adjustor (not shown) or through control of the applied clamp tonnage as described in commonly assigned patent publication WO2014/117246.

As noted above, the example mold stack 103 depicted in FIGS. 1-14 is a cavity lock type of a mold stack. It will be appreciated that other types of mold stacks types may be similarly configured to accommodate a cleaning configuration.

For example, with reference to FIG. 15, there is depicted another mold 300 embodiment whose mold stacks are of the core lock type. FIG. 15 is a cross-sectional view of the mold 300 capable of producing molded articles, namely preforms similar to the one illustrated in FIG. 2. The portion of mold 300 shown in FIG. 15 is a longitudinal cross-section of a single mold stack 303 used to produce a single preform 301. In FIG. 15, the mold stack 303 is depicted in a production or molding configuration.

The example mold 300 of FIG. 15 includes a pair of mold halves that are relatively moveable along an operational axis A. The first mold half includes a cavity plate assembly 302. The second mold half includes a core plate assembly 304 and a stripper plate assembly 325 that is moveable relative thereto along the operational axis A.

The cavity plate assembly 302 includes a cavity insert 306 and a gate insert 307 retained by a cavity flange 309. In alternative embodiments, the cavity piece 306 and gate insert 307 could form part of the plate 308 and/or may comprise a single component.

The core plate assembly 304 includes a core insert 310, a lock ring 311 configured to support the core insert 310 and to help align and hold closed a split mold insert 314 (described below), a core ring 339 configured to define a portion of the top sealing surface of the preform to be molded and, in conjunction with the split mold insert 314, a core ring-to-split insert parting line within a pocket of the split mold insert, and a core plate 312 to which the core insert 310 and lock ring 311 are both attached.

The stripper plate assembly 325 comprises a stripper plate 320, slider bars 322, 323 slidably coupled to the stripper plate 320, and a split mold insert 314 for defining the neck finish of the preform to be molded. The split mold insert 314 comprises a pair of complementary split mold insert halves 316, 318 that are attached to slider bars 322, 323 respectively. As shown in FIG. 15, the mold 300 has an operational axis A which is parallel to a longitudinal axis of the mold stack 303. The axis A may also be considered as an operational axis of the mold stack 303.

The mold stack 303 depicted in FIG. 1 is referred to as a "core lock" type of mold stack. This term reflects a design whereby the split mold insert halves 316, 318 are "locked" together laterally (vertically in FIG. 1) at least partly due to a tapered male portion being snugly seated within a seat defined between the lock ring 311 and the core ring 339 of the mold stack 303, as clamping pressure is applied to the mold stack 303 in the axial direction. This relationship is illustrated in greater detail in FIG. 16.

Figure 16:
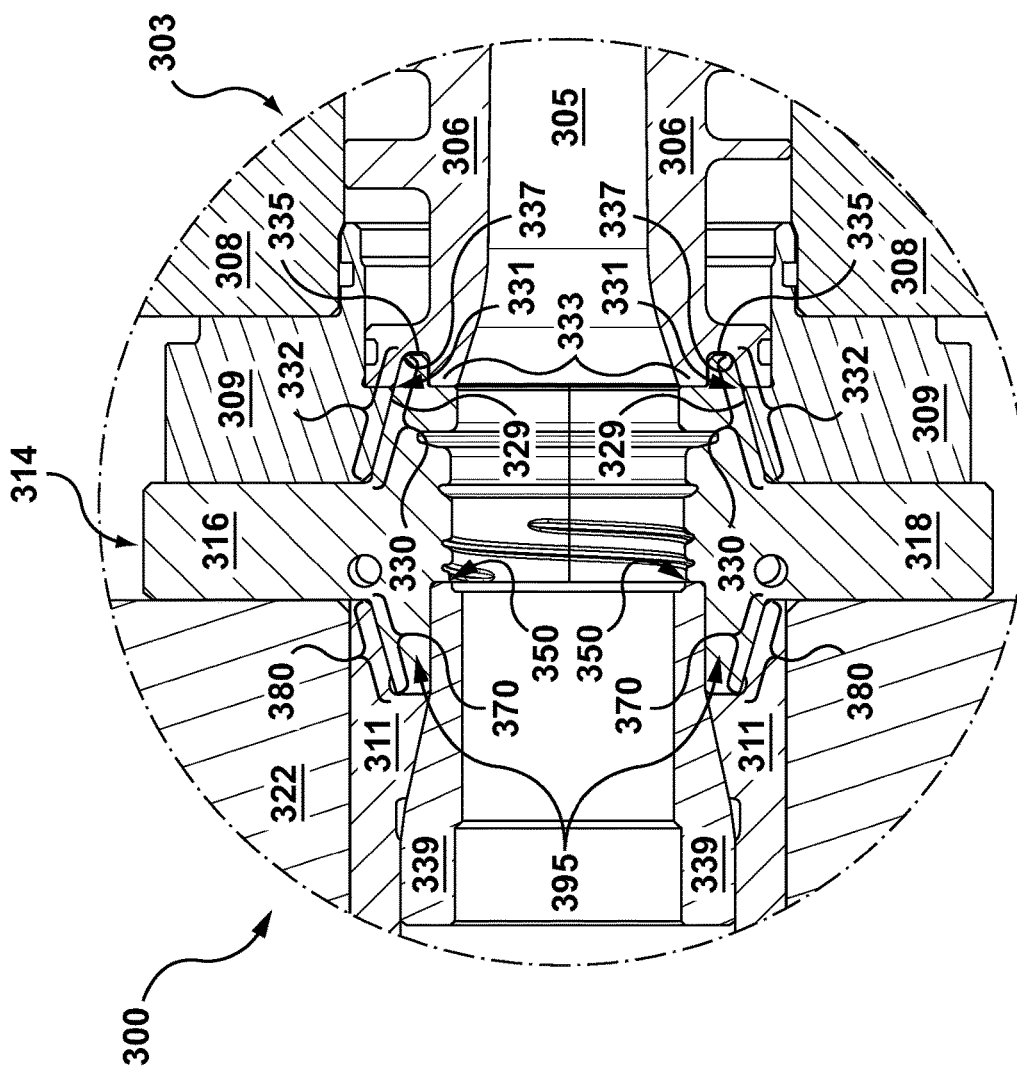
FIG. 16 is a close up view of a portion of the cross-sectional view of FIG. 15 with a core insert element removed for clarity.

Referring to FIG. 16, a close up cross-sectional elevation view of a portion of mold stack 303 of FIG. 15 is depicted. FIG. 16 illustrates the interaction between the lock ring 311, core ring 339, split mold insert 314, cavity flange 309 and cavity insert 306 when the example cavity type mold stack 303 is in the molding configuration. In FIG. 16, the core insert 310 of FIG. 15 has been omitted for clarity.

As illustrated, the cavity flange 309 and cavity insert 306 collectively define a tapered female seat 330 having a generally frusto-conical shape. The adjacent split mold insert 314 has a tapered male portion 332 with a complementary shape (i.e. generally frusto-conical) that allows the tapered male portion 332 to be snugly received within the tapered female seat 330 when the split mold insert 314 and the cavity insert 306 are in a mated molding configuration. The shape of these features is perhaps best seen in FIG. 16 in conjunction with FIG. 17, the latter providing a perspective view of the tapered male portion 332.

Referring to FIG. 16, it can be seen that the cavity flange 309 has an inwardly tapered wall 329 that ends at a parting line 331 formed between the cavity flange 309 and the cavity insert 306. The cavity insert 306 defines an annular groove 335 at the deepest portion of the tapered female seat 330. In the present embodiment, the annular groove 335 is formed between a central annular lip 333 in the end of the cavity insert 306 and a surrounding wall 337 of cavity insert 306 whose taper matches the taper of wall 329 of cavity flange 309. The configuration of these features may be similar to the corresponding features of the cavity insert 106 and cavity flange 109 of the earlier described embodiment (see FIG. 4).

Referring still to FIG. 16, it can further be seen that the lock ring 311 defines another tapered female seat 370 opposite the first tapered female seat 330 discussed above. The tapered female seat 370 has a complementary shape to a second tapered male portion 380 of the split mold insert 314 that extends away from the cavity place 308. The lock ring 311 and the core ring 339 may be considered to collectively define an annular pocket 395 into which a tapered male portion of the split mold insert 314 can be snugly received.

Figure 18:
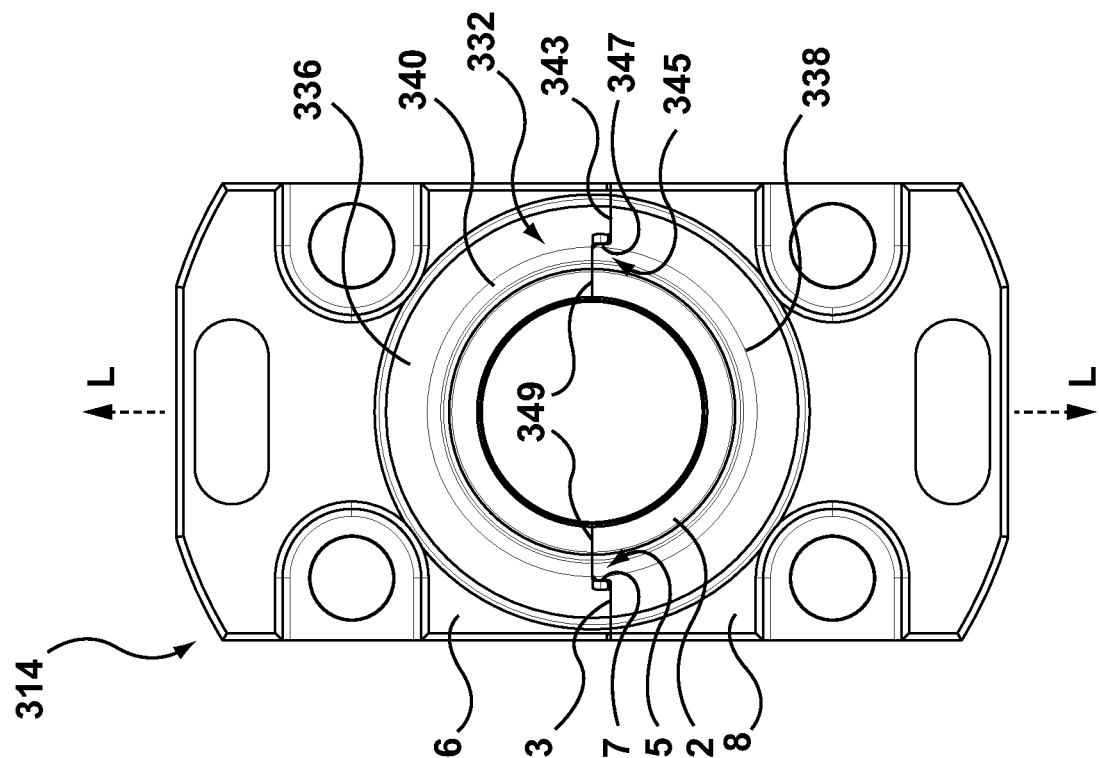
FIGS. 17 and 18 are a perspective view and plan view, respectively, of a split mold insert component of the mold of FIG. 15 in the molding configuration.
Figure 17:
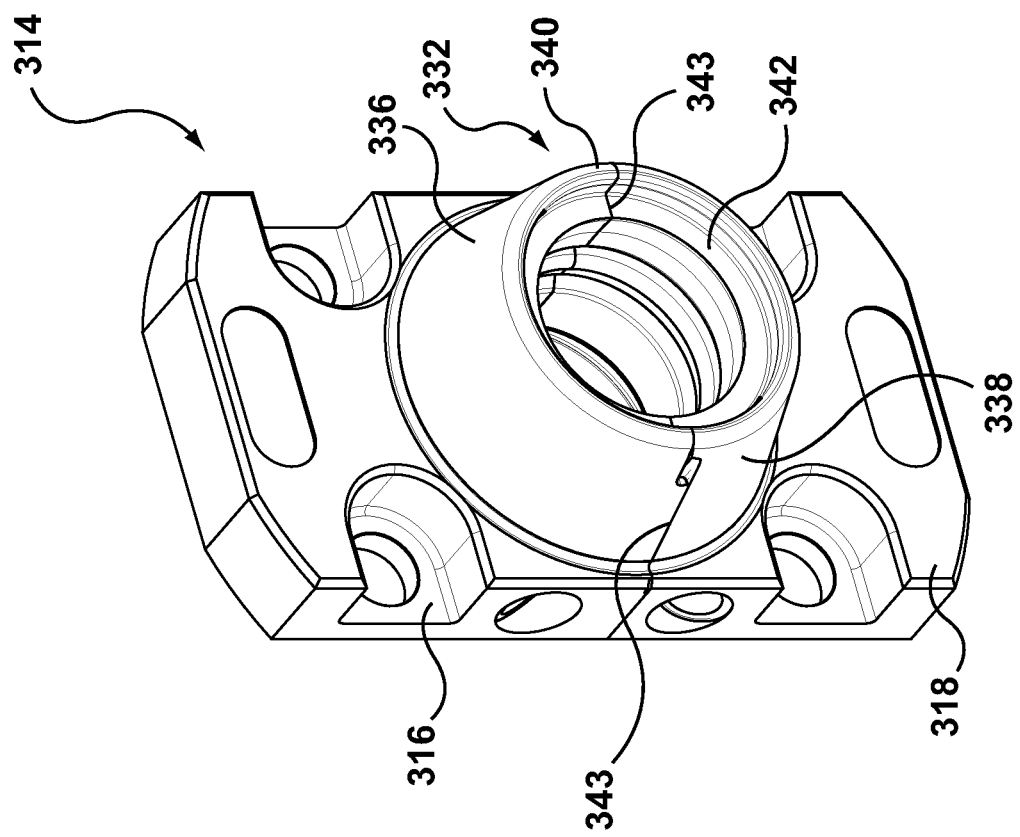

Turning to FIG. 17 in conjunction with FIG. 18, the split mold insert 314 is shown in perspective view and elevation view, respectively, in isolation from other mold stack components. In each of FIGS. 17 and 18, the spit mold insert 314 is shown in a molding configuration in which its halves 316, 318 are mated. The visible tapered male portion 332 of the insert 314 is split by split line 343, with a first half 336 of the male portion 332 forming part of split mold insert half 316 and a second half 338 of the male portion 332 forming part of split mold insert half 318. The other tapered male portion 380 is not visible in FIGS. 17 and 18, but is similarly split.

As illustrated, the split mold insert halves 316, 318 collectively define a vent 345 therebetween, which may be similar to the vent 145 of the previous embodiment. The vent 345 comprises a primary vent 349 (oriented horizontally in FIG. 18) in fluid communication with a secondary vent 347 (oriented vertically in FIG. 18). Each of the primary and secondary vents of the present embodiment comprises a gap between the split mold insert halves 316, 318. When the split mold insert 314 is in the molding configuration as shown in FIGS. 17 and 18, the vent 345 is configured to vent air from the molding cavity 305 while preventing passage of any substantial amount of melt therethrough. This may be achieved by appropriate dimensioning of the gaps comprising of each of primary vent 349 and secondary vent 347.

As shown in FIG. 18, the gap forming primary vent 349 is orthogonal to an axis L of lateral separation of the two halves 316, 318, while the gap forming secondary vent 347 is parallel to the axis L. These relative gap orientations will allow the vent 345 to continue to act as a vent (i.e. to vent air while preventing passage of melt) even when the split mold insert halves 316, 318 are slightly separated from one another. It should be noted that in the molding configuration only the primary vent 349 of the vent 345 is relied upon to vent the molding cavity.

Figure 18A:
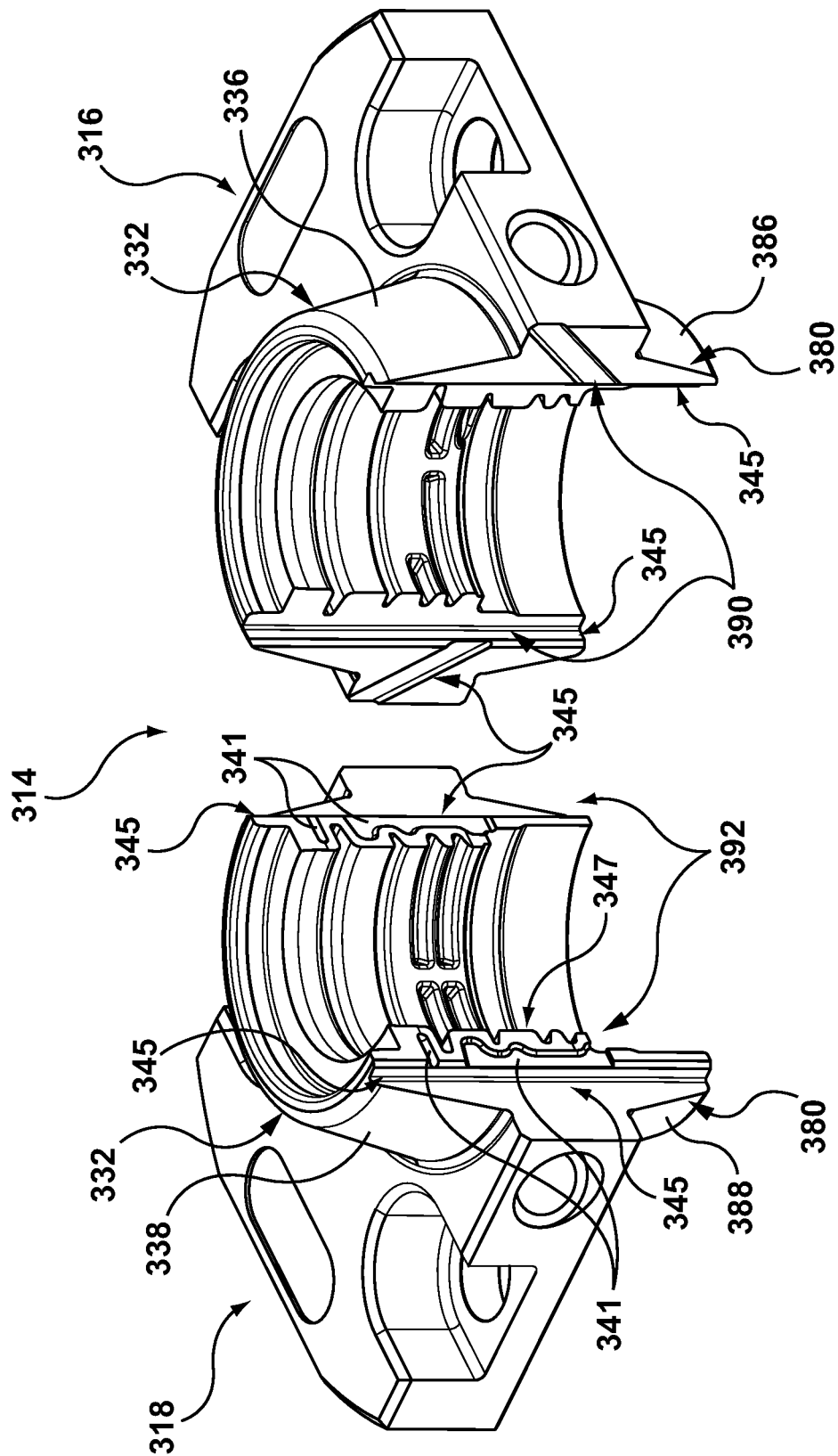
FIG. 18A is a perspective view of the split mold insert of FIGS. 17 and 18 separated into its two component halves with their respective mating faces visible.

Turning to FIG. 18A, the split mold insert 314 is illustrated in perspective view with the split mold insert halves 316, 318 being oriented so that their respective mating faces 390, 392 are visible. It will be appreciated that view of FIG. 18A is for illustration only and that the split mold insert halves 316, 318 are not actually used in this orientation. As illustrated, the example vent 345 of the present embodiment comprises defines a series of grooves 341 in mating face 392. These grooves are for channeling the vented gas and venting it to the atmosphere. Such grooves are not necessarily present in other embodiments.

FIG. 18A shows the second tapered male portion 380 which is not visible in FIG. 17 or 18. As illustrated, the tapered male portion 380 is also split by split line 343, with a first half 386 of the male portion 332 forming part of split mold insert half 316 and a second half 388 of the male portion 332 forming part of split mold insert half 318.

It will be appreciated that, when the mated halves 336, 338 of the tapered male portion 332 of split mold insert 314 are seated within the tapered female seat 330 and the mated halves 386, 388 of the tapered male portion 380 of split mold insert 314 are seated within the tapered female seat 370 (e.g. as shown in FIG. 16), and an axial clamping force is applied to the mold stack 303, the split mold insert halves 316, 318 are held together in the molding configuration despite the exertion of an opposing outward force pressurized melt within the neck finish area of the molding cavity 305.

Referring to FIGS. 17 and 18, it can be seen that the tapered male portion 332 of the split mold insert 314 has a distal annular tongue 340 that is configured (e.g. shaped and sized) to be received within the annular groove 335 (FIG. 16) defined in the cavity insert 306. These two features collectively define a tongue and groove interface in the junction between the split mold insert 314 and the cavity insert 306. When the cavity insert 306 and the split mold insert 314 are in the molding configuration of FIG. 16, the junction 344 acts as, or defines, a parting line between the cavity insert 306 and the split mold insert 314. In this example embodiment, the parting line is formed between the annular lip 333 (mating face) of the cavity insert 306 and an inwardly projecting shoulder 342 (mating face) of the split mold insert 314. The junction 344 is designed to be adjustable between a molding configuration wherein the mating faces are in contact with one another to define a parting line of the molding cavity 305 (where the mold stack is in a molding configuration) and a cleaning configuration wherein the mating faces are separated to define a space therebetween that acts as an extension of the molding cavity 305, i.e. becoming part of the molding surface of the molding cavity 305 (when the mold stack 303 is in a vent-cleaning configuration).

When the mold stack 303 is in the molding configuration of FIG. 16, the split mold insert 314 and the core ring 339 collectively define a vent 350 therebetween for venting air from the molding cavity 305 without allowing passage of any substantial amount of melt therethrough. This is illustrated in greater detail in FIG. 18B.

Figure 18B:
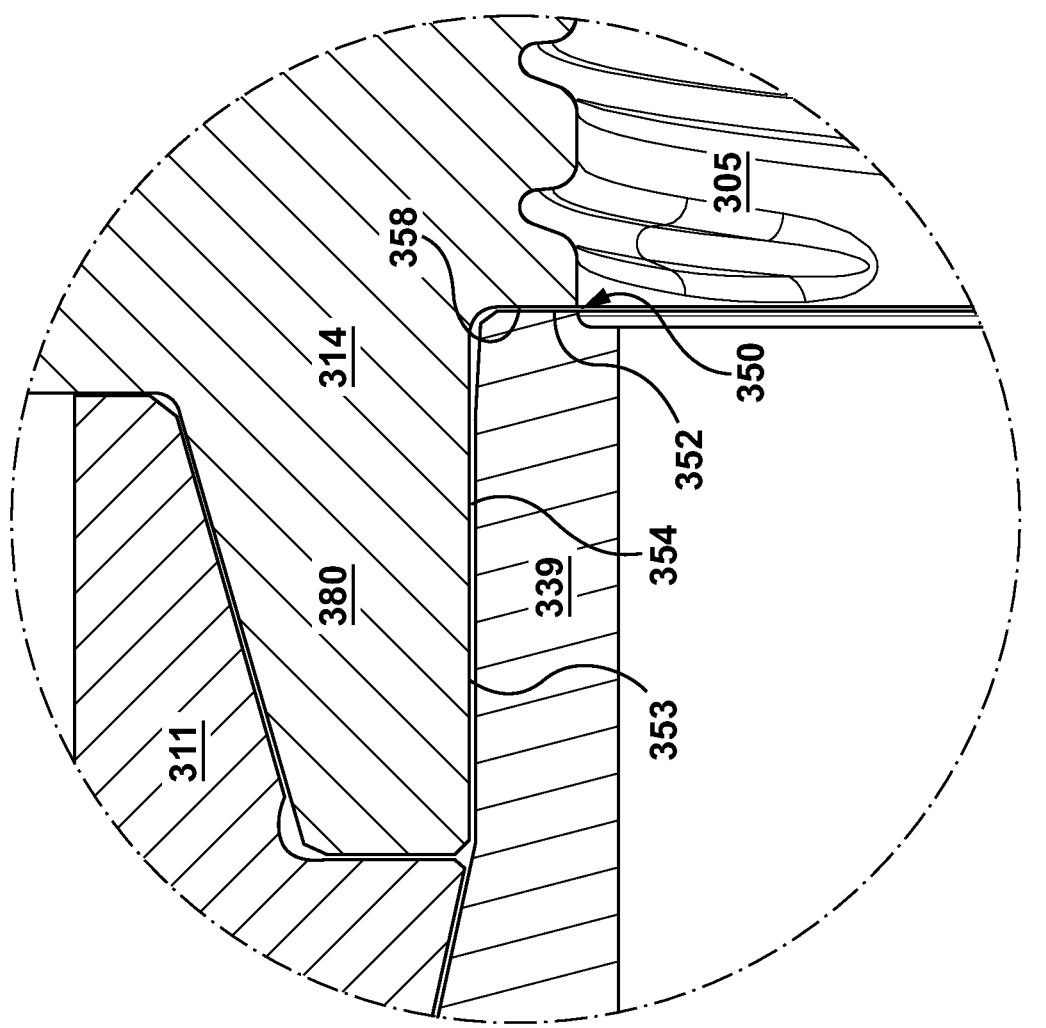
FIG. 18B is a close up view of a portion of the cross-sectional view of FIG. 16.

As illustrated in FIG. 18B, the vent 350 of the present embodiment is formed at a split line between the core ring 339 and a recessed face 358 the split mold insert 314 (the recess being in relation to a distal end of tapered male portion 380). The vent 350 is situated within a pocket 353 formed within the split mold insert 314 for receiving an end of the core ring 339, the pocket 353 being coaxial with the tapered male portion 380. The vent 350 comprises a primary vent 352 in fluid communication with a secondary vent 354. In FIG. 18B, the primary vent 352 appears as a vertical gap between the split mold insert 314 and the core ring 339, and the secondary vent 354 appears as a horizontal gap between the same two components.

When split mold insert 314 and core ring 339 are in a molding configuration as shown in FIG. 18B, the vent 350 is configured to vent air while preventing passage of melt, i.e. to allow air from the molding cavity 305 to pass therethrough without allowing any substantial amount of melt from the molding cavity 305 to pass therethrough. This may be achieved by appropriate dimensioning of the gaps of each of primary vent 152 and secondary vent 154 (e.g. in the range of 30-40 microns, in the case where the molding material to be used is PET). It should be noted that in the molding configuration only the primary vent 352 of the vent 350 is relied upon to vent the molding cavity.

Because the primary vent 352 is oriented orthogonally to an operational axis of the mold stack 303 and the secondary vent is parallel to the operational axis of the mold stack 303, the primary vent 352 may be widened while the width of the secondary vent 354 remains substantially constant when the mold slack 303 and/or mold 300 is placed into a cleaning configuration. The secondary vent 354 may thus continue to act as a vent for air without allowing any substantial amount of melt to pass therethrough when the mold stack 303 is in a cleaning configuration.

Figure 19:
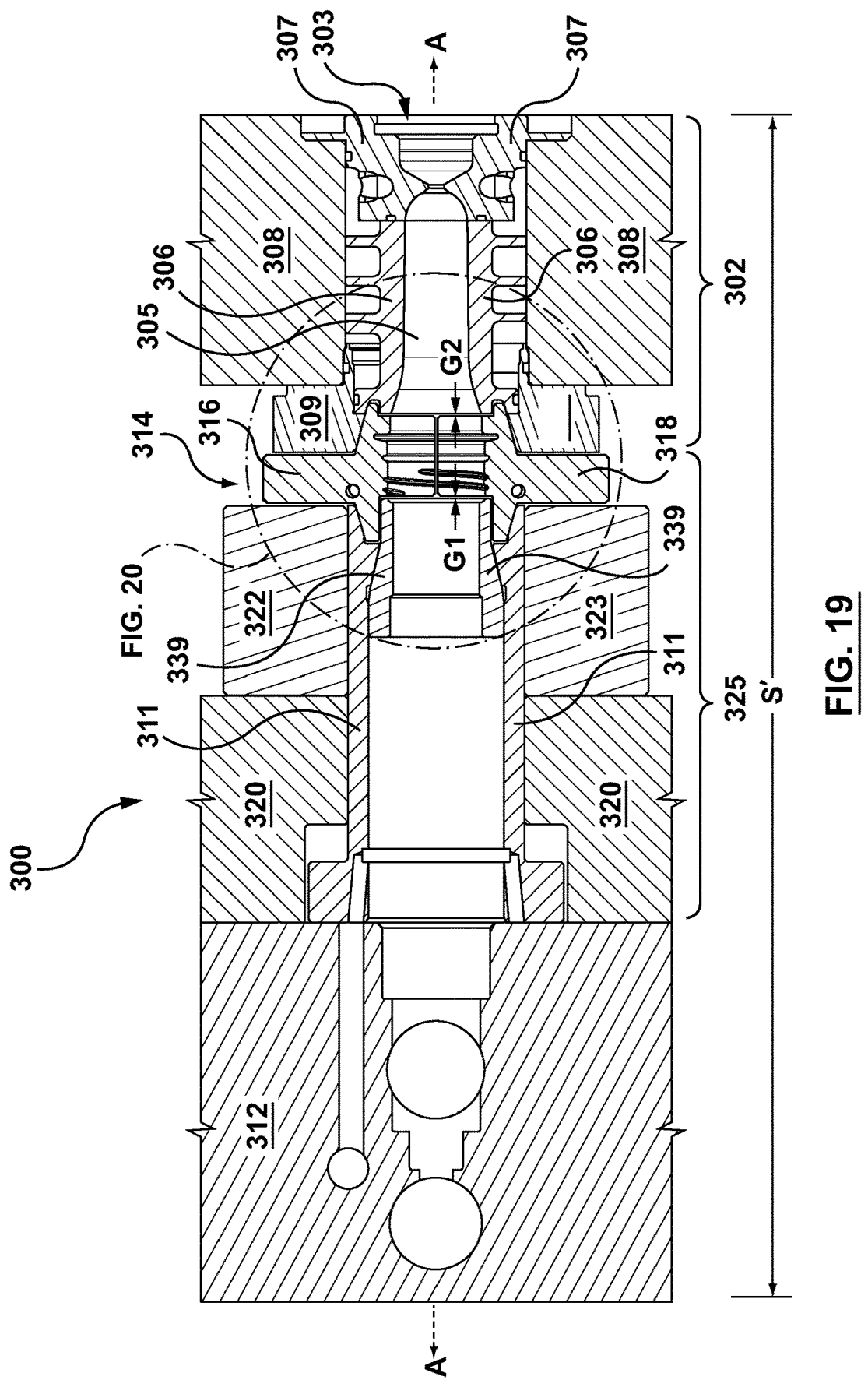
FIG. 19 is a cross-sectional elevation view of the same portion of the mold as shown in FIG. 15 but with the mold stack in a residue cleaning configuration.
Figure 20:
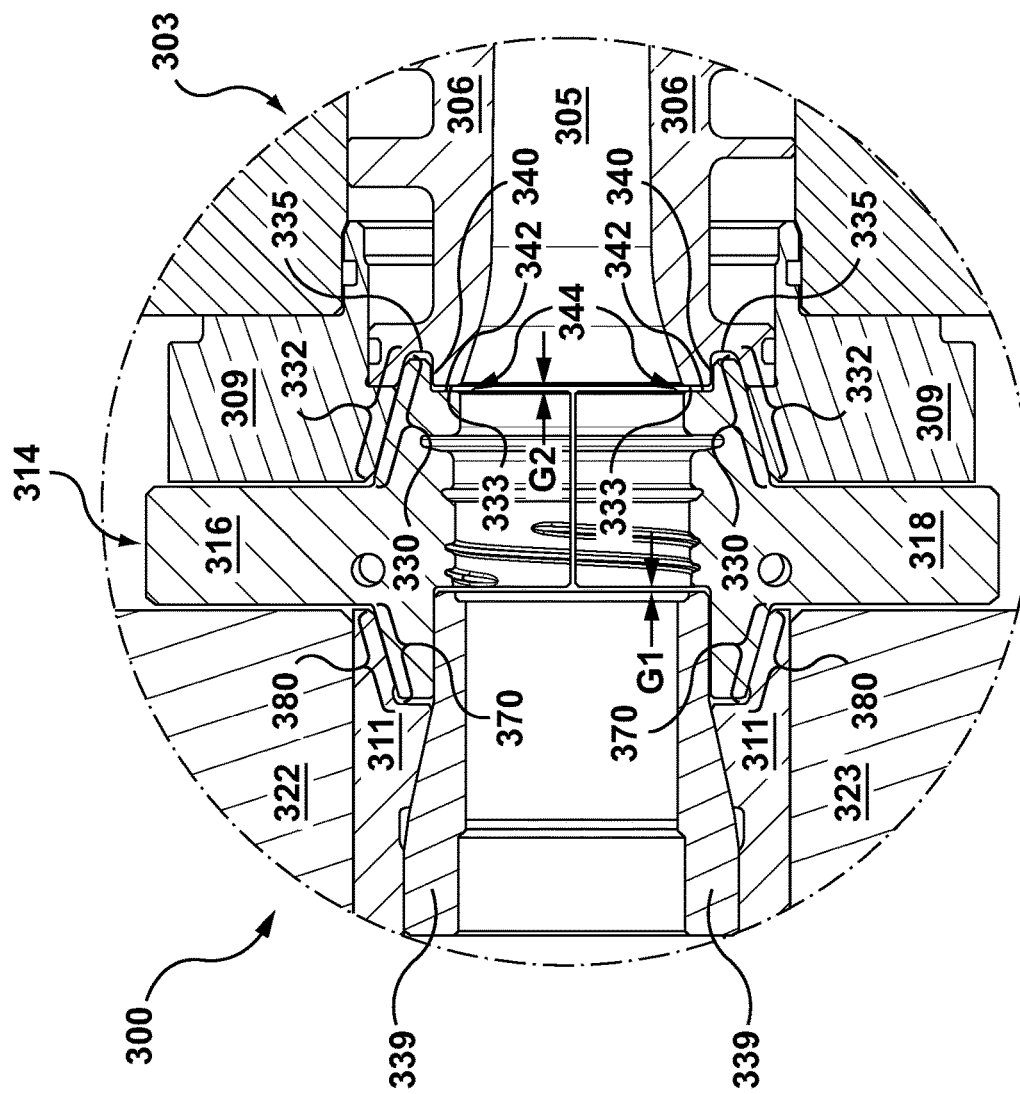
FIG. 20 is a close up view of a portion of the cross-sectional view of FIG. 19 with the core insert element removed for clarity.
Figure 22:
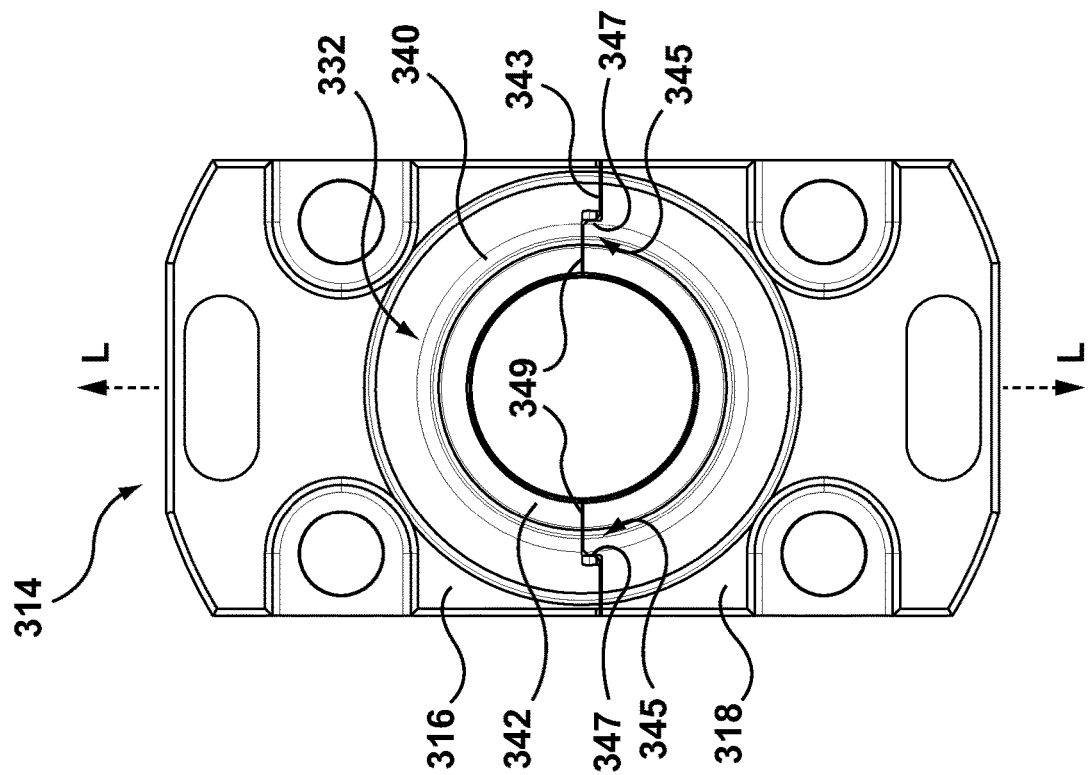
FIGS. 21 and 22 are a perspective view and elevation view, respectively, of the split mold insert component of FIGS. 17 and 18 in a residue cleaning configuration.
Figure 21:
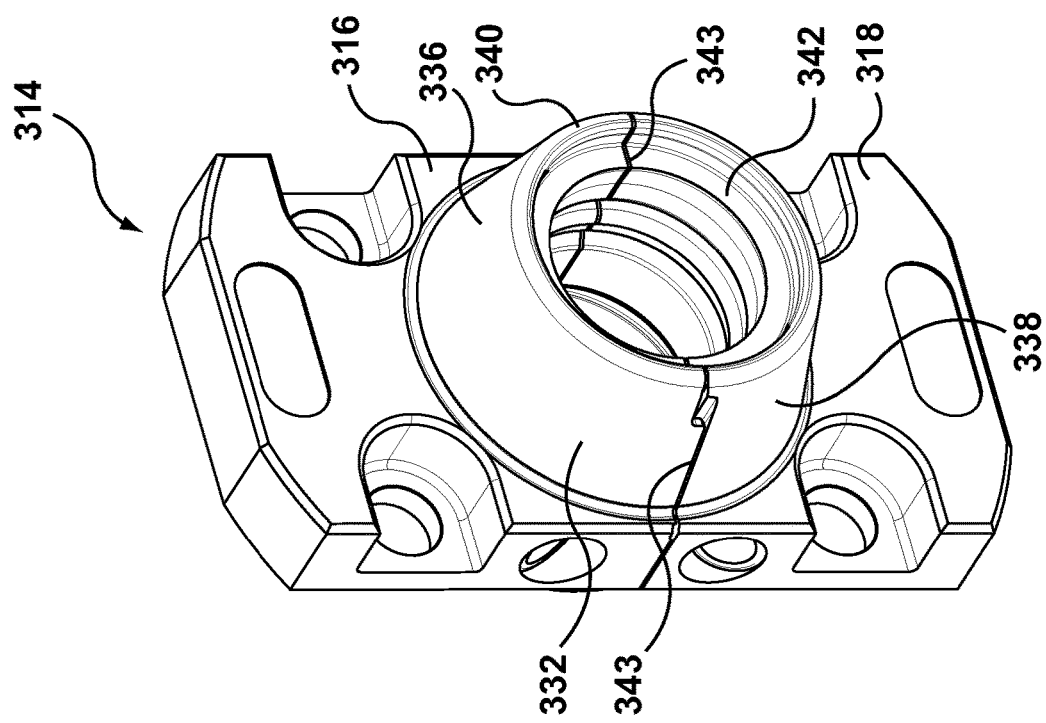

FIGS. 19-23 illustrate various aspects of the example mold 300 and mold stack 303 in a cleaning configuration. FIG. 19 is a cross-sectional elevation view showing the same portion of mold 300 as is shown in FIG. 15 but with the core insert 310 being omitted for clarity. FIG. 20 provides close up cross-sectional elevation view of a portion of FIG. 19 illustrating interaction between the lock ring 311, core ring 339, split mold insert 314, cavity flange 309 and cavity insert 306 when the example core lock type mold stack 303 is in the cleaning configuration. FIGS. 21-23 are described below.

In FIG. 19, the shut height of the system 300 of FIG. 15 has been increased to S' through the introduction of gaps G1 and G2 on opposite sides of the split mold insert 314. The first gap G1 is between the split mold insert 314 and the lock ring 311/core ring 339, and the second gap G2 is between the split mold insert 314 and the cavity insert 306. By virtue of the introduction of gaps G1 and G2, it is now possible to perform controlled flashing, during a cleaning molding cycle, in three areas of the mold stack 303 in which flashing does not normally occur during a standard molding cycle.

The first area in which controlled flashing can now be performed, by virtue of the introduction of gap G1, is within the vent 350 between the core ring 339 and the split mold insert 314, in a similar manner to vent 150 of FIG. 11, discussed above.

The second area in which controlled flashing can now be performed, by virtue of the introduction of gap G2, is within the junction 344 between split mold insert 314 and cavity insert 306. Referring to FIG. 23, it can be seen that, in the cleaning configuration of the mold stack 303, the tongue 340 has been withdrawn slightly from the groove 335. Moreover, the annular lip 333 (mating face) of the cavity insert 306 has separated slightly from the inwardly projecting shoulder 342 (mating face) of the split mold insert 314. This reconfigures the junction 344 to define a space 346 between the mating faces 333, 342 that acts as an extension of the molding cavity 305 into which melt can be received. It is noted that flashing the cavity extension area 346 does not serve a residue cleaning purpose because the junction 344 normally acts as a parting line rather than as a vent.

In the cleaning configuration, the junction 344 also defines an auxiliary melt barrier 351 to prevent uncontrolled flashing of melt, i.e. to contain the melt within the cavity extension 346. In the present embodiment, the auxiliary melt barrier 351 is an auxiliary vent sized appropriately for venting gas while preventing passage of melt therethrough. The auxiliary vent 351 (FIG. 23) is oriented substantially longitudinally (axially) with respect to the mold stack 303 (i.e. the auxiliary vent is substantially parallel to the longitudinal or operational axis of the mold stack 303 and to the operational axis A of the mold 300). This is in contrast with the cavity extension 346, which is oriented substantially transversely (radially) with respect to the mold stack 303 (i.e. the cavity extension 346 is substantially orthogonal to the longitudinal or operational axis of the mold stack 303). The auxiliary vent 351 and the cavity extension 346 are thus substantially orthogonal to one another.

The third area in which controlled flashing can now be performed, by virtue of the introduction of gaps G1 and G2, is within the primary vent 349 portion of vent 345 between the split mold insert halves 316, 318. Referring to FIGS. 20, 21 and 22, it can be seen that, in view of gap G1 (FIG. 20) having been introduced between the split mold insert 314 and the core ring 339 (i.e. in view of the partial withdrawal of the tapered male portion 380 from the tapered female seat 370), and further in view of gap G2 (FIG. 20) having been introduced between the split mold insert 314 and the cavity insert 306 (i.e. in view of the partial withdrawal of the tapered male portion 332 from the tapered female seat 330), the split mold insert halves 316, 318 are free to separate laterally to a dimension suitable for flashing to occur within the primary vent 349. Put another way, lateral separation of the split mold insert halves 316, 318 along the axis L (FIG. 22) has increased a width of the primary vent 349 sufficiently to allow melt to enter. In contrast, the size of the secondary vent 347, which is of a suitable dimension for venting air without allowing any substantial amount of melt to pass therethrough, has remained generally constant. As such, the secondary vent 347 prevents uncontrolled flashing between the split mold insert halves 316, 318 when they are in the cleaning configuration shown in FIGS. 20, 21 22.

As shown in FIG. 20, the tapered female seat 370 limits the degree of separating of the split mold insert halves 316, 318 by limiting a degree of separating of the associated halves of the tapered male portion 380, and the tapered female seat 330 limits the degree of separating of the split mold insert halves 316, 318 by limiting a degree of separating of the associated halves 336, 338 of the tapered male portion 332. The degree of separation of split mold insert halves 316, 318 may therefore be controlled by appropriately setting gaps G1 and G2, e.g. via a shut height adjustment mechanism (not shown) or through control of the applied clamp tonnage as described in commonly assigned patent publication WO2014/117246.

As noted above with respect to FIG. 9 and FIG. 20, a shut height adjustment mechanism may be used to adjust the shut height of a mold so that the mold stack can be placed into the cleaning configuration. A mold 500 comprising a shut height adjustment mechanism that can be used for that purpose, or others, is illustrated in FIG. 24 to FIG. 45.

Figure 24:
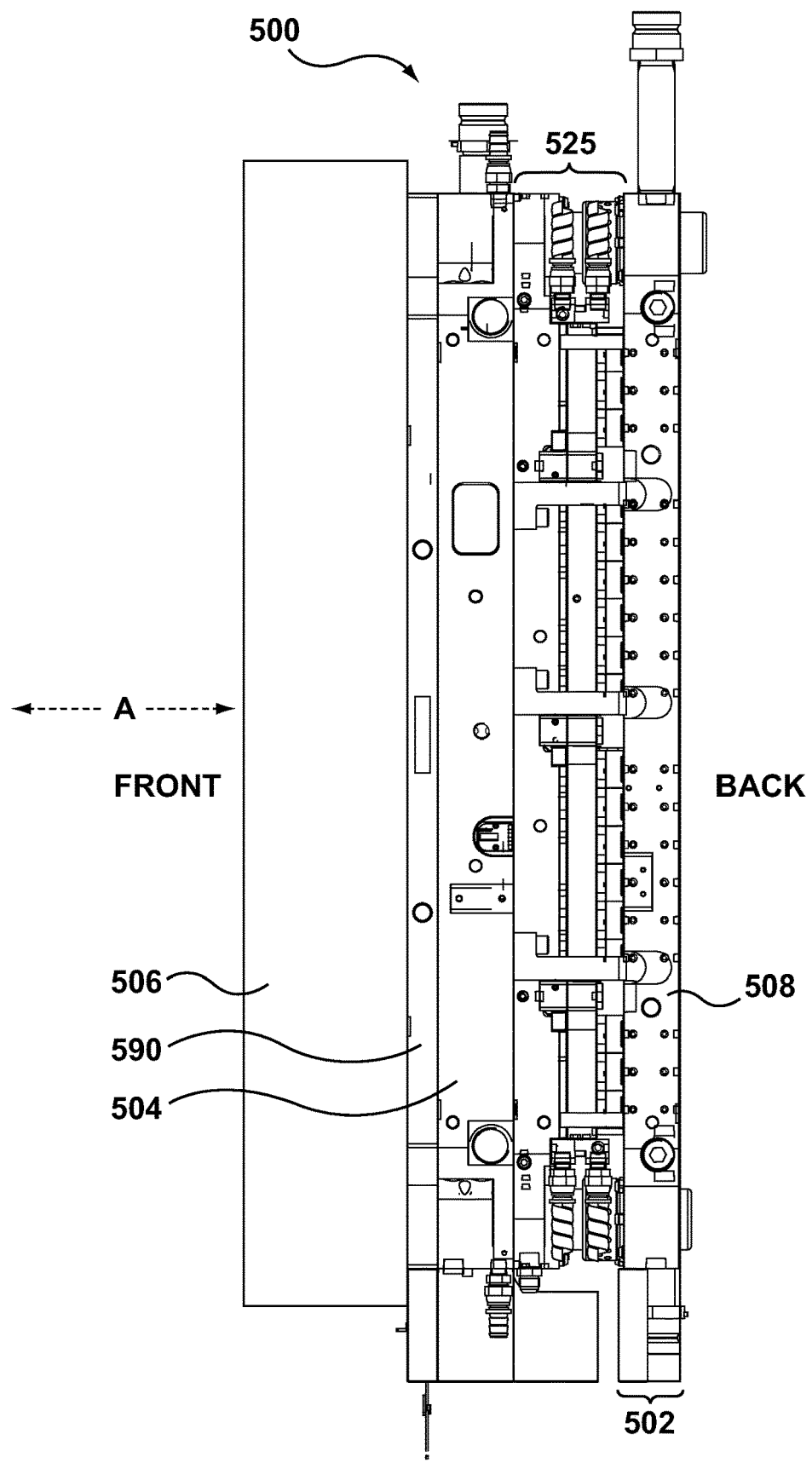
FIG. 24 is a side elevation view of a mold having a shut height adjustment mechanism in a standard molding configuration.

Referring to FIG. 24, an example mold 500 is illustrated in side elevation view. This particular mold 500 is designed to mold preforms, in batches of 144 preforms in a single molding cycle (i.e. the mold contains a total of 144 mold stacks). The type and number of molded articles may vary in other embodiments.

The example mold 500 includes a cavity plate assembly 502, a stripper plate assembly 525, and a core plate assembly 504, each of which is movable relative to one another. FIG. 24 also illustrates a spacer assembly 590 fixed to the core plate assembly 504.

The left and right sides of the mold as illustrated are referred to as the front and back (or rear) of the mold 500 respectively. This convention is used for convenience and does not necessarily connote any particular orientation of the mold 500 during use. For consistency, the same convention is used throughout in the description of mold 500 and its components, i.e. throughout FIG. 24 to FIG. 45.

Figure 25:
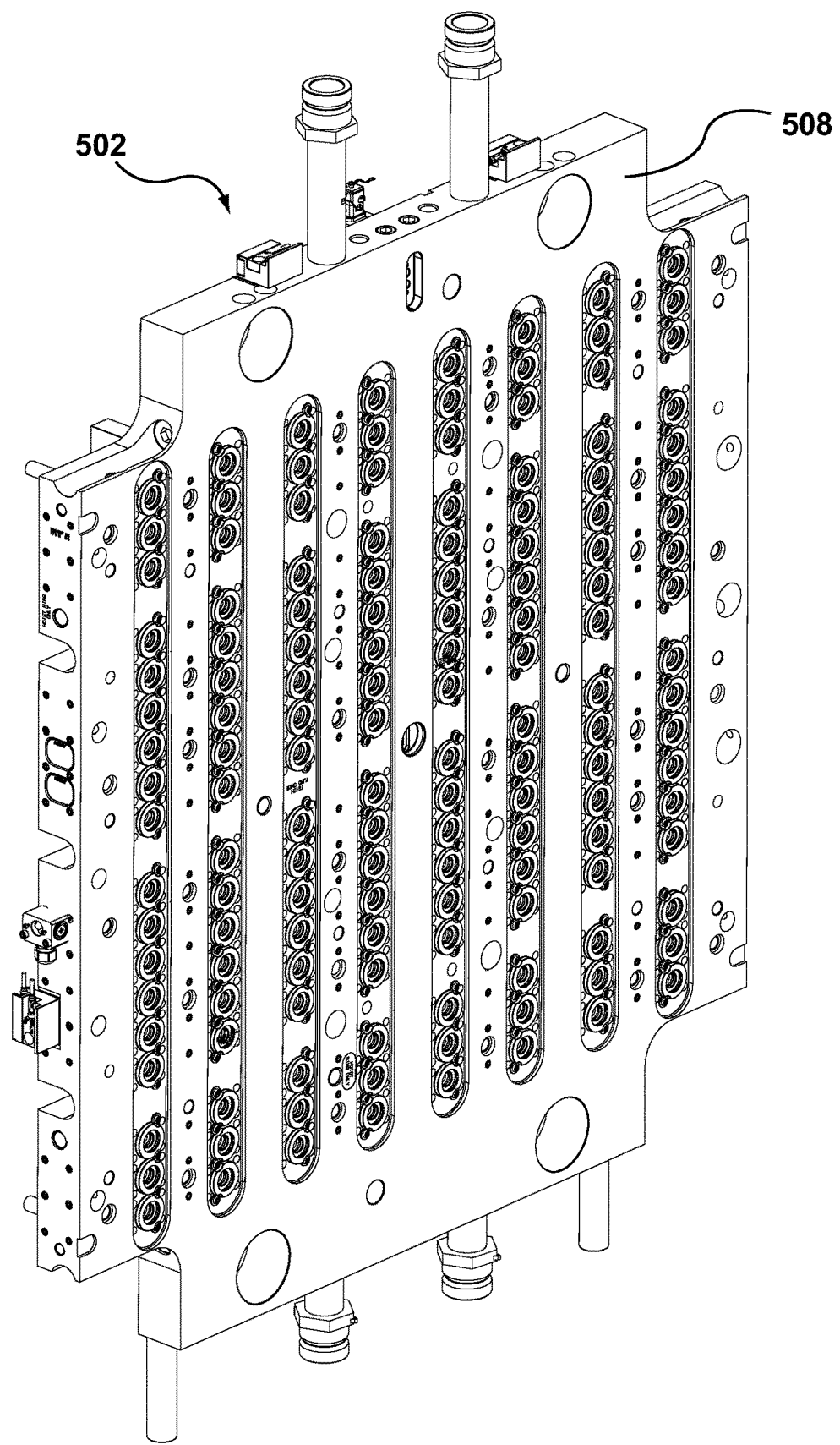
FIGS. 25 and 26 are back and front perspective views, respectively, of a cavity plate assembly of the mold of FIG. 24.
Figure 26:
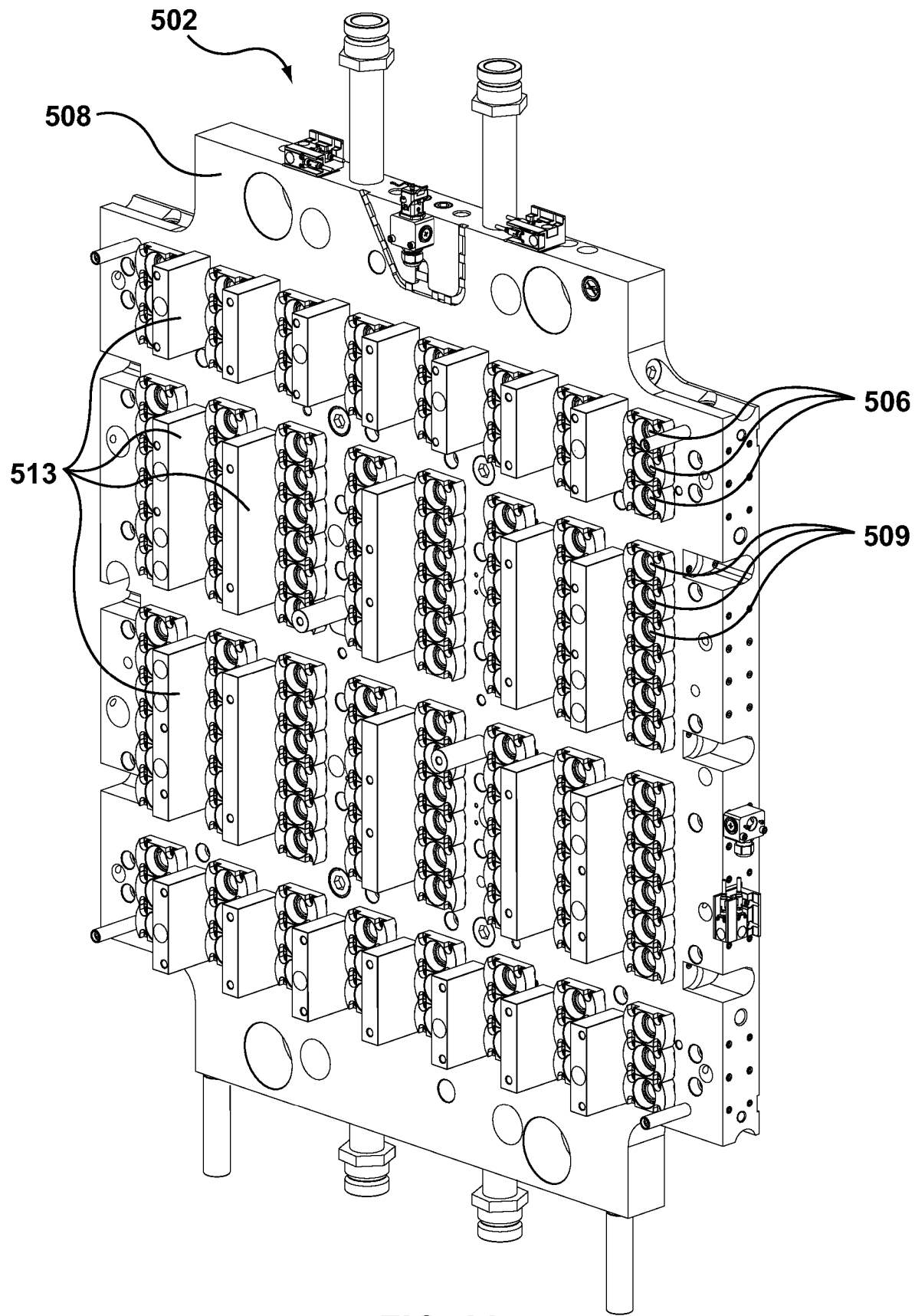

FIGS. 25 and 26 illustrate cavity plate assembly 502 of mold 500 in back and front perspective view respectively. As illustrated, the cavity plate assembly 502 includes a cavity plate 508 having a plurality of cavity inserts 506 in eight vertical rows of 18 units (i.e. totaling 144 units). Each cavity insert 506 is held in place by a respective cavity flange 509 (FIG. 26) that is attached to the front face of the cavity plate 508. A plurality of tonnage blocks 513 is mounted to the front side of the cavity plate 508. As is known in the art, tonnage blocks may be used to bear some of the clamping force applied to a mold to avoid application of excessive force to, and possibly damaging, mold stacks within the mold. In a standard molding configuration, the tonnage blocks 513 may be used to transfer force between the cavity plate 508 and the stripper plate 520. The height of the tonnage blocks may be selected to provide an appropriate or desired distance between the cavity plate 508 and the stripper plate 520 in that configuration. As will be appreciated, in a vent-cleaning configuration, the tonnage blocks 513 will instead transfer force between the cavity plate 508 and spacer frame 594 via stop members 560 (described below), bypassing both of the stripper plate 520 and the core plate 512. In the embodiment illustrated in FIG. 26, the tonnage blocks 513 are arranged in seven columns, to fit between the eight columns of cavity inserts 506 on the cavity plate 508.

Figure 27:
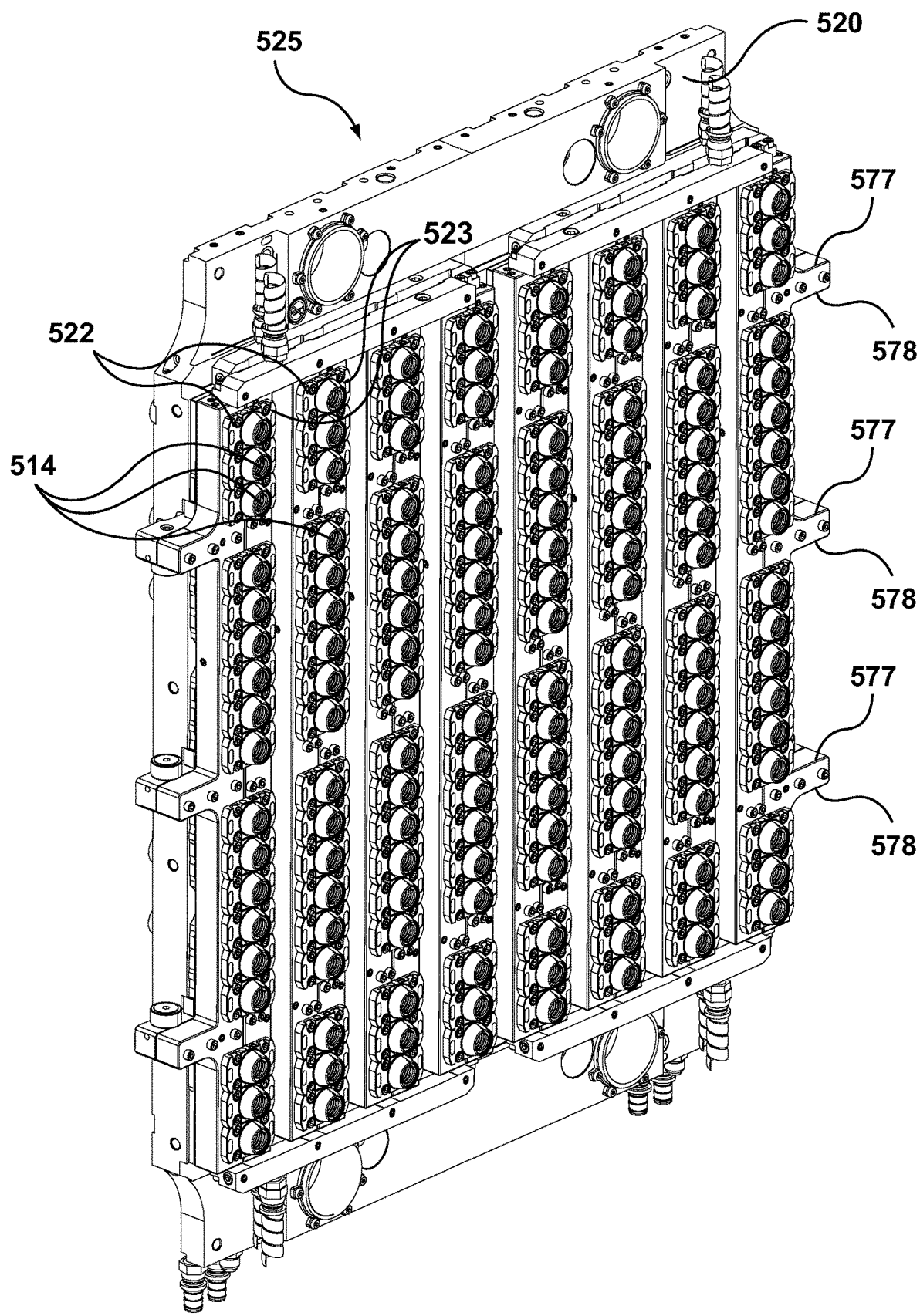
FIGS. 27 and 28 are back and front perspective views, respectively, of a stripper plate assembly of the mold of FIG. 24.
Figure 28:
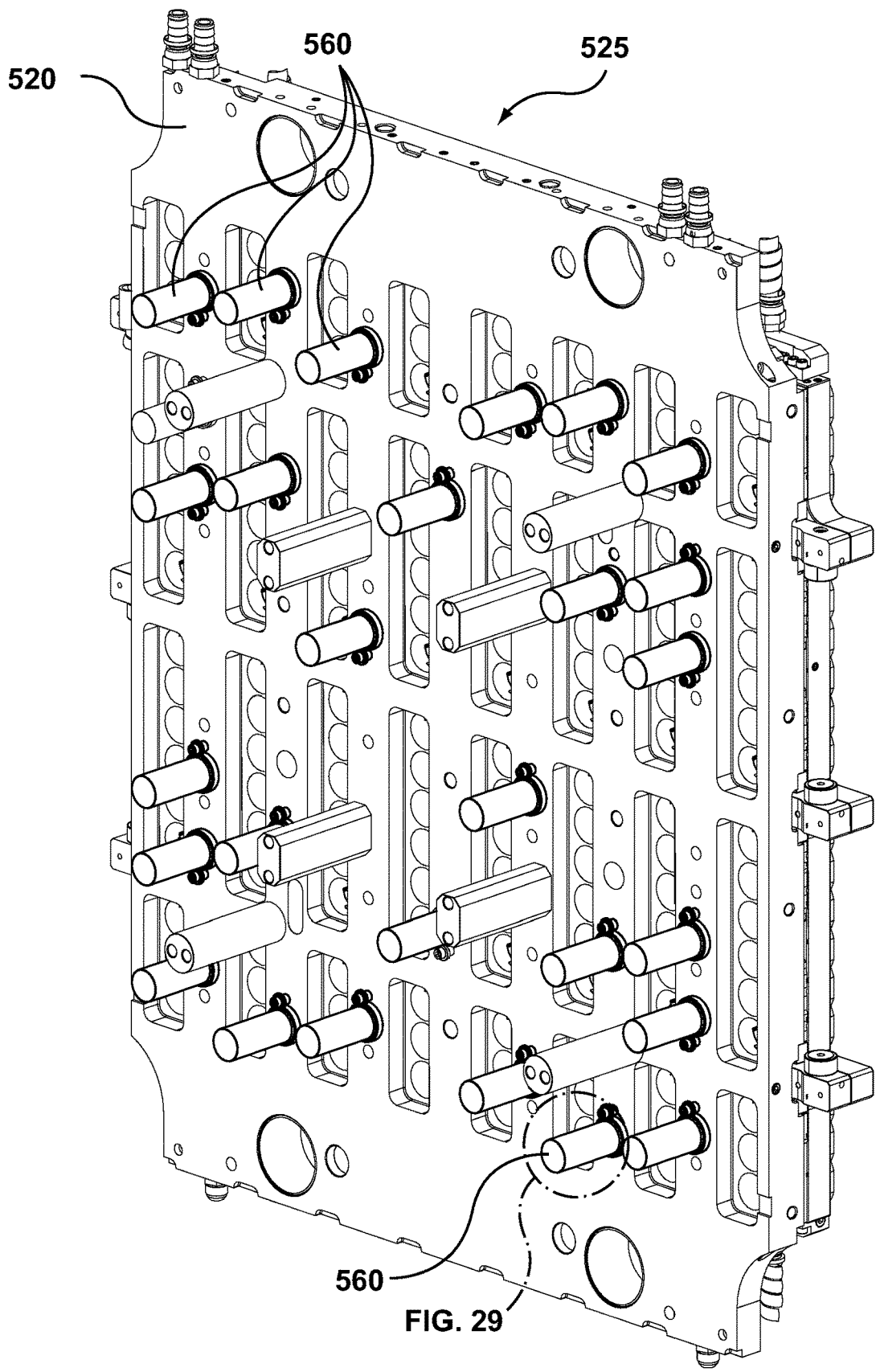

FIGS. 27 and 28 illustrate stripper plate assembly 525 of mold 500 in back and front perspective view respectively. As illustrated, the stripper plate assembly 525 includes a stripper plate 520 with eight pairs of slider bars 522, 523 slidably coupled thereto. The slider bars are substantially vertically oriented in FIG. 27. Each pair of slider bars has eighteen split mold inserts 514 attached thereto, with each of the split mold insert halves 516, 518 being attached to a respective one of the slider bars 522, 523 of a pair. The slider bars 522, 523 of each pair are reciprocable with respect to one another in the substantially horizontal direction, e.g. for releasing the neck finish of a molded preform. Three substantially horizontal pairs of connecting bars 577, 578 are coupled to, and may be used to drive the coordinated reciprocating movement of, all of the slider bar pairs.

Figure 29:
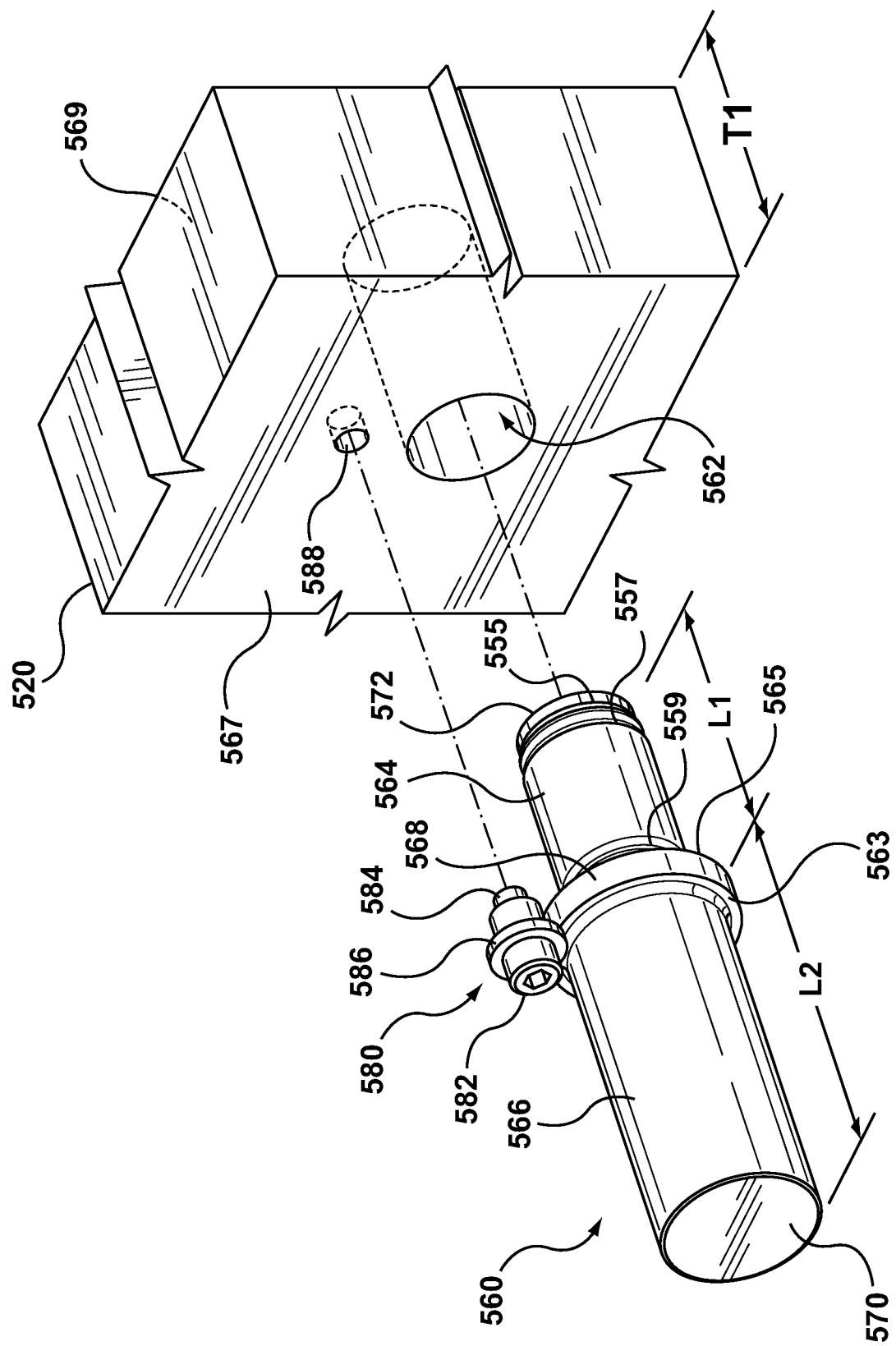
FIG. 29 is a perspective view of a stop member forming part of the stripper plate assembly of FIGS. 27 and 28.

The stripper plate assembly 525 further includes a plurality of stop members 560 (FIG. 28) slidably received within respective holes in the stripper plate 520. The stop members 560 are part of the shut height adjustment mechanism that is used to selectively increase a shut height of the mold 500, e.g. for placing the mold stacks into a cleaning configuration. As shown in FIG. 28, the present embodiment includes a total of twenty-eight stop members 560 distributed throughout the area of plate 520. Use of a plurality of stop members 560 allows a mold clamping force to be distributed among them and may reduce a risk of damage to a single stop member or bending of plate 520. An example stop member 560 is shown in FIG. 29. For clarity, the reference numeral 560 is used herein not only to refer the stop members 560 collectively, but also generically.

Referring to FIG. 29, an example stop member 560 is illustrated in perspective view. The stop member is intended to be stowed when the mold 500 effects a standard shut height S, e.g. during normal molding operation of the mold 500, and to be deployed in order to cause the mold 500 to effect an increased shut height S', e.g. during cleaning operation of the mold 500. In particular, the stop member is designed to increase the shut height of the mold by providing a gap on either side (front and back) of a mold component, which in this example embodiment is a stripper plate 520. To that end, the stop member 560 has two stops, i.e. features that act as or define a stop when the stop member is deployed. As will be appreciated, the first stop is designed provide a first gap (G1) on a front side of the stripper plate, and the second stop is designed provide a second gap (G2) on a back side of the stripper plate.

The example stop member 560 of the present embodiment takes the form of a cylindrical pin. Stop members in alternative embodiments may have different shapes. The pin has two ends 570, 572, which may be referred to as the head end 570 and the tail end 572 of the stop member 560, respectively and are each substantially flat in the present embodiment. The stop member 560 has a forward section 566 and a rear section 564. The forward section 566 defines the first stop of the stop member 560, and the rear section 564 defines the second stop of the stop member 560.

The forward section 566 of the stop member 560 extends from the head end 570 of the stop member through to and including radial flange 568, the latter being a form of protrusion in the stop member 560. The radial flange 568 is the feature of the present stop member embodiment that acts as or defines the first stop. The forward section 566 of the stop member 560 is sized to be slidably received within a hole through the adjacent core plate (described below). The forward section 566 has a length L2 (measured from the back face 565 of the radial flange 568 to the head end 570 of the stop member 560) that is slightly greater than the thickness T2 of the core plate.

The rear section 564 of the stop member 560 extends between the tail end 572 of the stop member and the first stop and is configured (sized and shaped) to be slidably received within a corresponding hole 562 through stripper plate 520. The rear section 564 has a length L1, which is measured from the back face 565 of the radial flange 568 to the tail end 572 of the stop member 560. The length L1 is slightly greater than the thickness T1 of the stripper plate 520. As such, when the stop member 560 is inserted into the hole 562 and when the first stop (here, the back face 565 of the radial flange 568) engages the front side 567 of the stripper plate 520 (in view of the fact that the flange 568 is wider than hole 562), the tail end 572 of the stop member 560 will sit slightly proud of, i.e. protrude slightly from, the back side 569 of the stripper plate 520. As will be appreciated, the protruding tail end 572 will act as the second stop that provides a gap G2 (FIG. 45) on the back side 569 of the stripper plate 520.

In the present embodiment, the diameter of the forward section 566 is greater than that of the rear section 564. This relative sizing may be dictated by the geometry of, or size constraints dictated by, adjacent components of the mold 500. The diameter of the forward and rear sections of alternative embodiments may be the same or different.

The rear section 564 of the example stop member 560 of FIG. 29 has a number of peripheral grooves 555, 557, 559 therein. The peripheral groove 555 (which may be considered as a single stepped diameter of the rear section 564) may redirect stress in the stop member away from the groove 557 under axial compressive loading. This may avoid excessive stress that could cause the stop member 560 to yield. Separating the grooves 555 and 557 by some distance may facilitate this effect at the possible expense of compromising a stop member tilt avoidance effect, discussed below.

The peripheral grooves 557, 559 may each house O-rings. The O-rings may not be intended to seal but rather may serve to dampen or limit the axial movement of the stop member 560 when stowed. The O-rings may be designed to improve a fit between the stop member 560 and the hole 562 in the stripper plate 520, which may advantageously reduce or eliminate a rattling of the stop member 560 within the hole 562 as the mold 500 is used for standard molding purposes. This may reduce or eliminate impact loads upon the radial flange 568 which may in turn reduce the risk of damage to the radial flange 565. The O-rings may alternatively, or in conjunction, limit the stop member 560 from dropping/ tilting within the hole 562 so that, when the stop member 560 is axially loaded, the stop member 560 will not be loaded heavily on an edge before straightening. The latter could potentially impart a high degree of loading the spacer frame 594 tonnage block 513. The grooves/O-rings may also help to center the stop member 560 within the hole 562 to promote its alignment with the spacer 598. In some embodiments, peripheral grooves could instead be added to the hole 562 in the stripper plate 520, with a view to providing similar benefits. The latter may be harder to manufacture than the former and may complicate O-ring installation.

Referring still to FIG. 29, it can be seen that the stop member 560 has an associated retaining pin 580, a form of retaining mechanism. The role of the retaining pin 580 is to retain the stop member 560 with the stripper plate 520 during use, i.e. to prevent the stop member 560 from falling out of the hole 562 during operation of the mold 500. The example retaining pin 580 of the present embodiment comprises a fastener 582 with a threaded end 584 and a radial lip 586. The threaded end 584 is designed to threadably engage a corresponding threaded hole 588 in the stripper plate 520.

The retaining pin 580 and the stripper plate 520 collectively define a range of motion (axial play) of the radial flange 568 of the stop member 560. A frontward extent of this range is defined by contact between the front face of the radial flange 568 and the back face of the radial lip 586. A rearward extent of the range is defined by contact between the rear face of the radial flange 568 and the front face of the stripper plate 520. Thus, the retaining pin 580 and stripper plate 520 collectively define the range of axial play of the stop member 560 relative to the stripper plate 520 along the operational axis of the mold 500.

Figure 30:
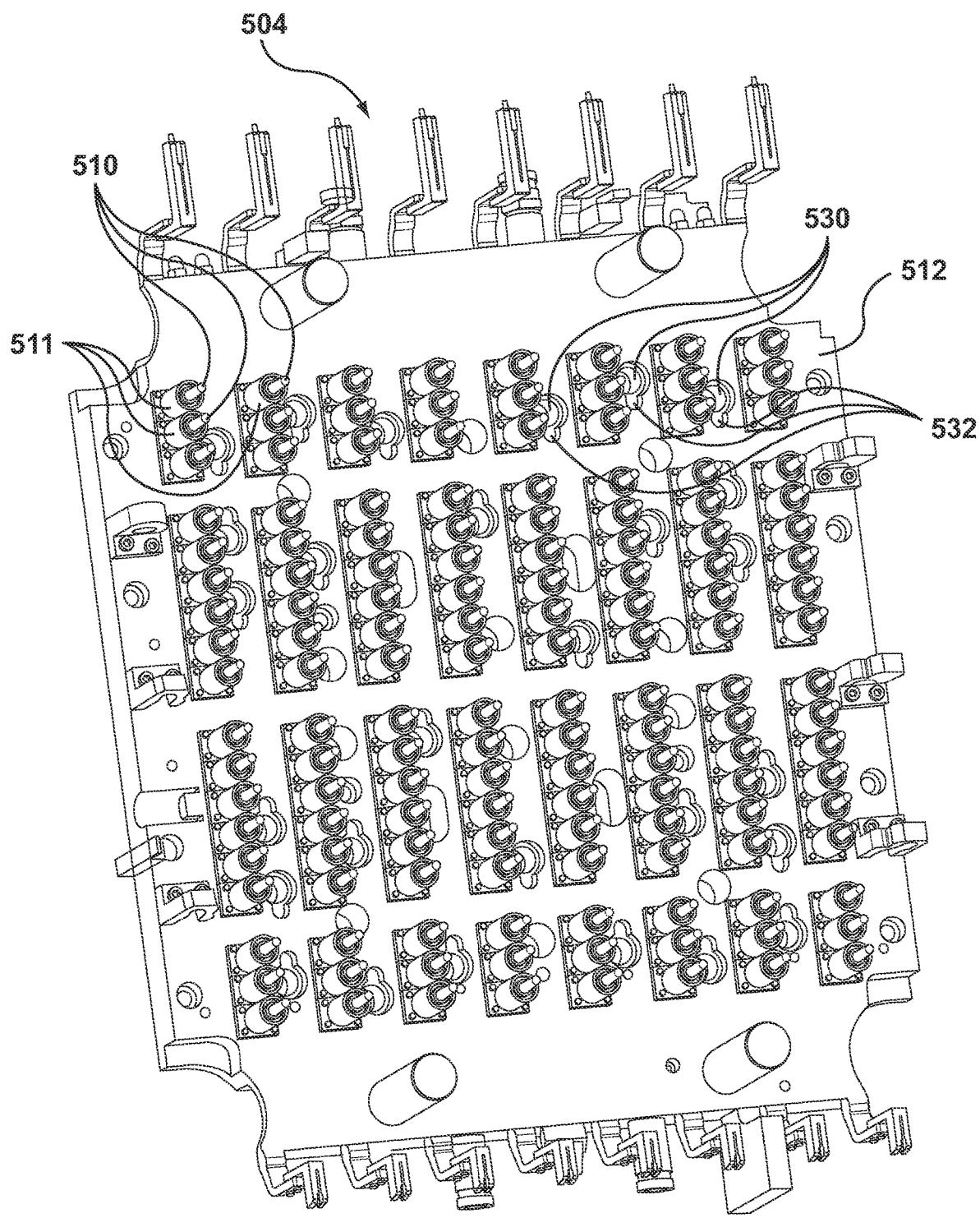
FIGS. 30 and 31 are back and front perspective views, respectively, of a core plate assembly of the mold of FIG. 24.
Figure 31:
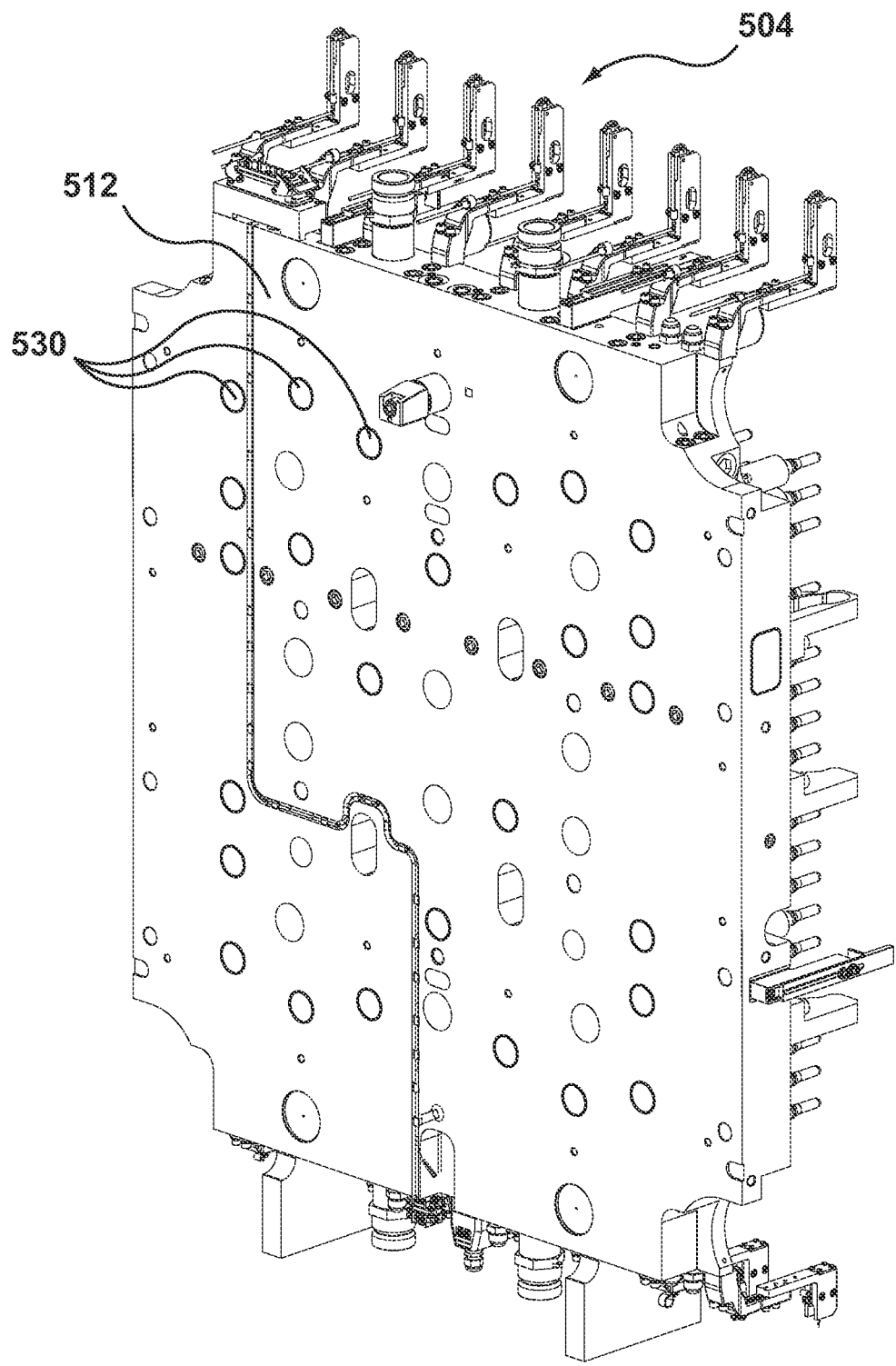

FIGS. 30 and 31 illustrate the core plate assembly 504 of mold 500 in back and front perspective view respectively. Referring to those figures, it can be seen that the core plate assembly 104 includes a core plate 512 with a plurality of core inserts 510 and respective lock rings 511 protruding therefrom. The core inserts 510 and respective lock rings 511 are arranged in eight substantially vertical rows of eighteen units to correspond with the arrangement of the split mold inserts 514 on the stripper plate 520 and the cavity inserts 506 on the cavity plate 508.

The core plate 512 further includes a plurality of holes 530, each configured to slidably receive the forward section 566 (FIG. 29) of a corresponding stop member 560. The number of holes 530 through the core plate 512 corresponds to the number of stop members 560 in the present embodiment, i.e. twenty-eight. This number may vary between embodiments.

On the back face of the core plate 512 (FIG. 30), a keyhole shaped depression 532 surrounds each hole 530. This depression 532 accommodates both the radial flange 568 of a stop member 560 and the retaining pin 580 associated with the stop member 560.

It is noted that other holes, besides holes 530, may be formed through the core plate 512 and may be used for other purposes (e.g. to accommodate ejector pins used during stripping of molded articles). These are not central to the present description.

Figure 32:
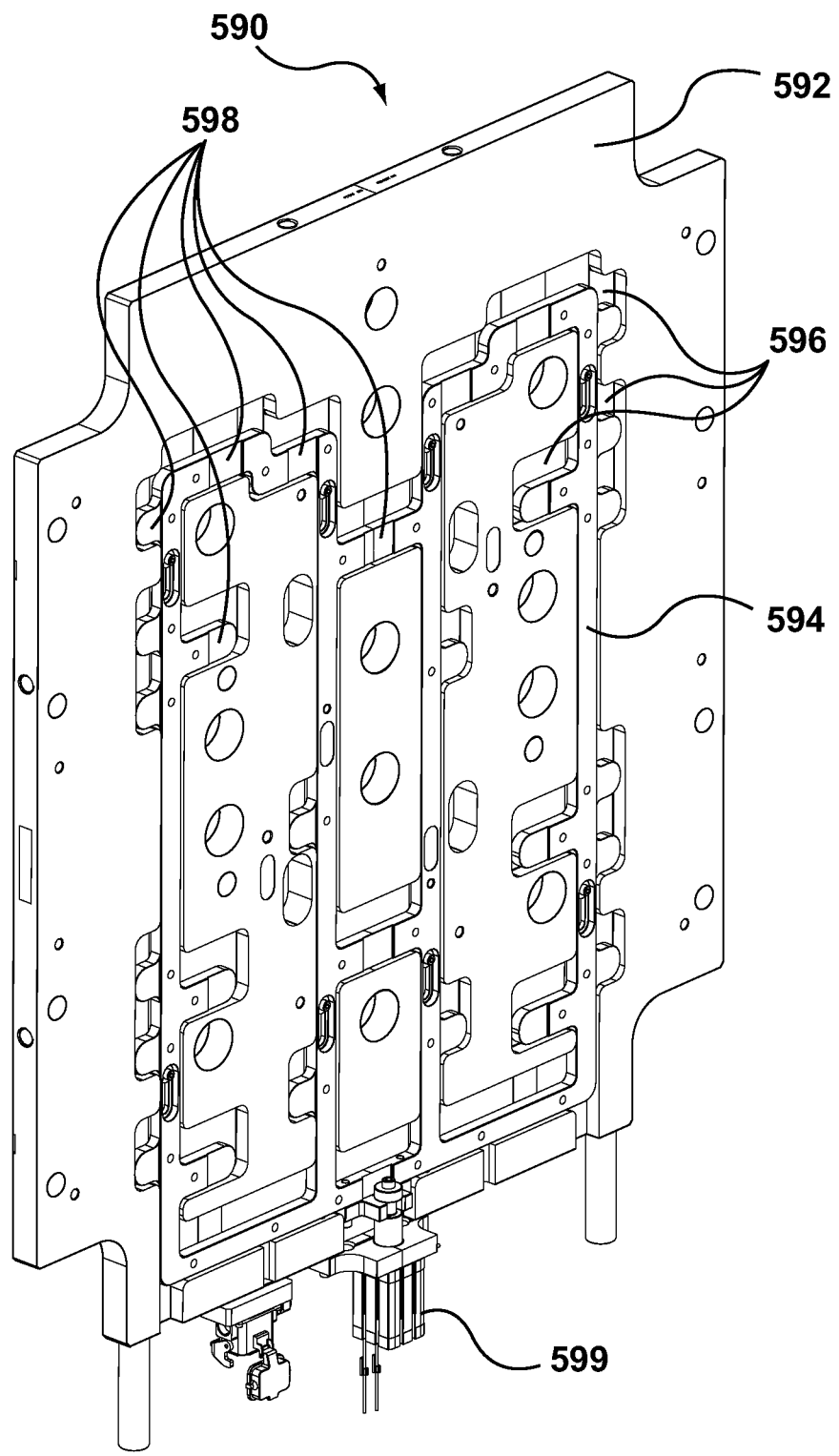
FIGS. 32 and 33 are back and front perspective views, respectively, of a spacer assembly of the mold of FIG. 24.
Figure 33:
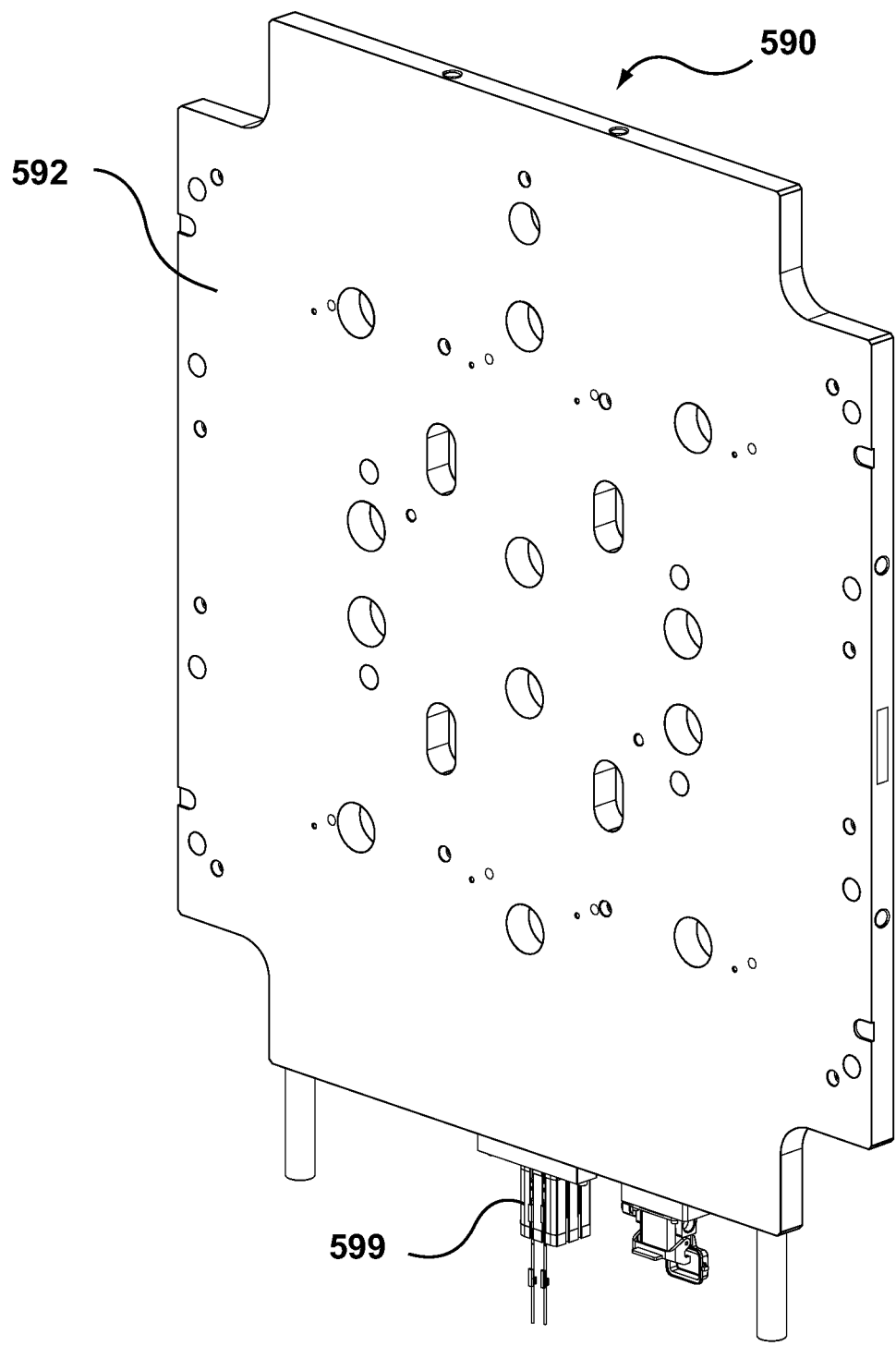
Figure 41:
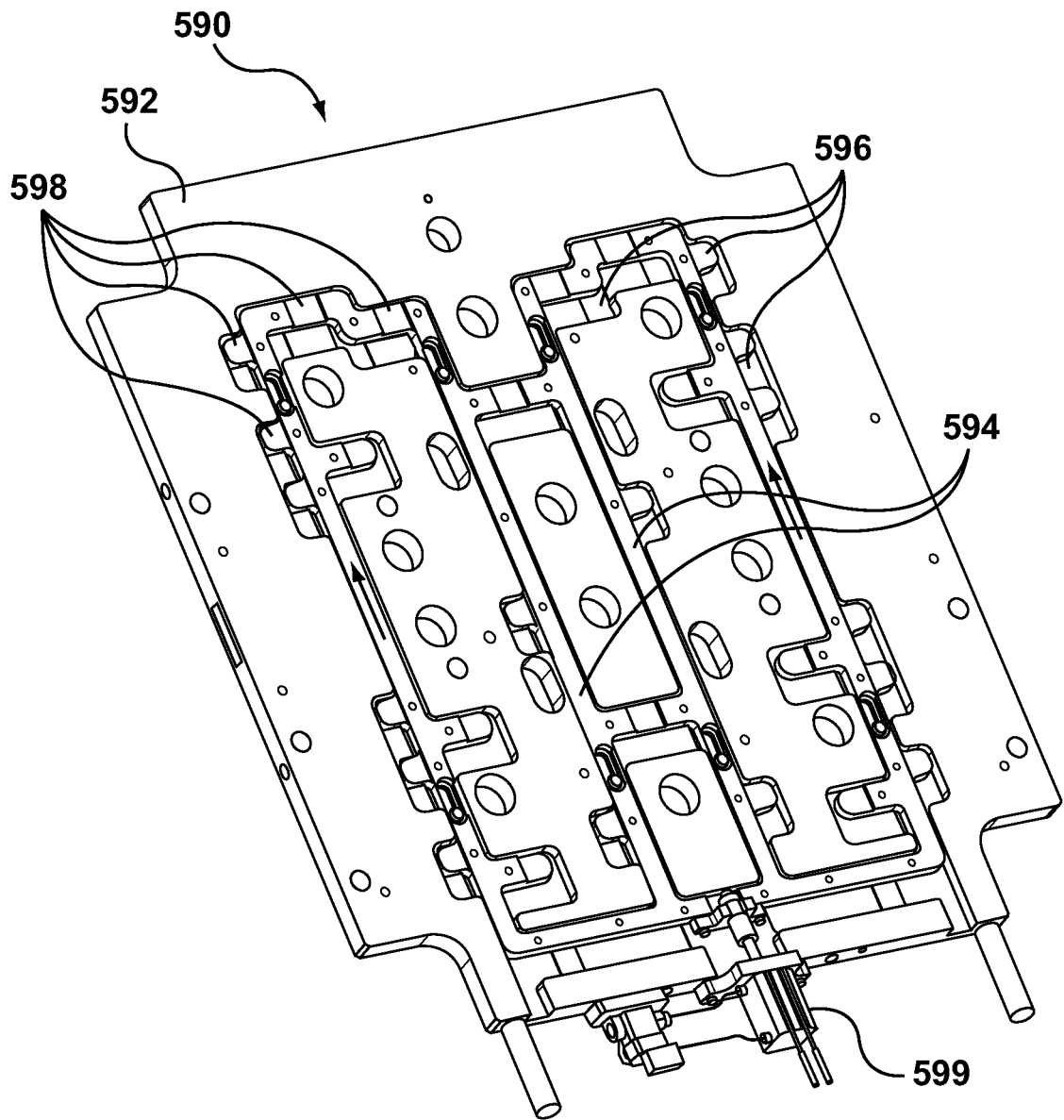
FIG. 41 is a back perspective view of the spacer assembly of the mold of FIG. 24 effecting the third operation for increasing a shut height of the mold.

FIGS. 32 and 33 illustrate the spacer assembly 590 component of mold 500 in back and front perspective view respectively. The spacer assembly 590 includes a spacer backing plate 592 and a spacer frame 594 that sits within a complementary shaped recess 596 in a back surface of the spacer backing plate 592. The spacer frame 594 interconnects a plurality (here, twenty-eight) of spacers 598 into an integral planar unit. Each spacer 598 is associated with a respective stop member 560. The spacer frame 594 is reciprocable, within the recess 596 under the control of actuator 599 (which may be a pneumatic or hydraulic actuator for example), between an outboard and an inboard position. In the outboard position, which is shown in FIG. 32, the spacers 598 are out of alignment with their corresponding stop members 560, vacating space for the head ends 570 of stop members 560 within recess 596 when the mold is being used in the standard molding configuration. In the inboard position, which is shown in FIG. 41, the spacers 598 are aligned with their corresponding stop members 560 for deploying the stop members 560 into their deployed positions in which the annular flange 568 and the tail end 572 of each stop member defines a respective stop, as will be described.

Figure 34:
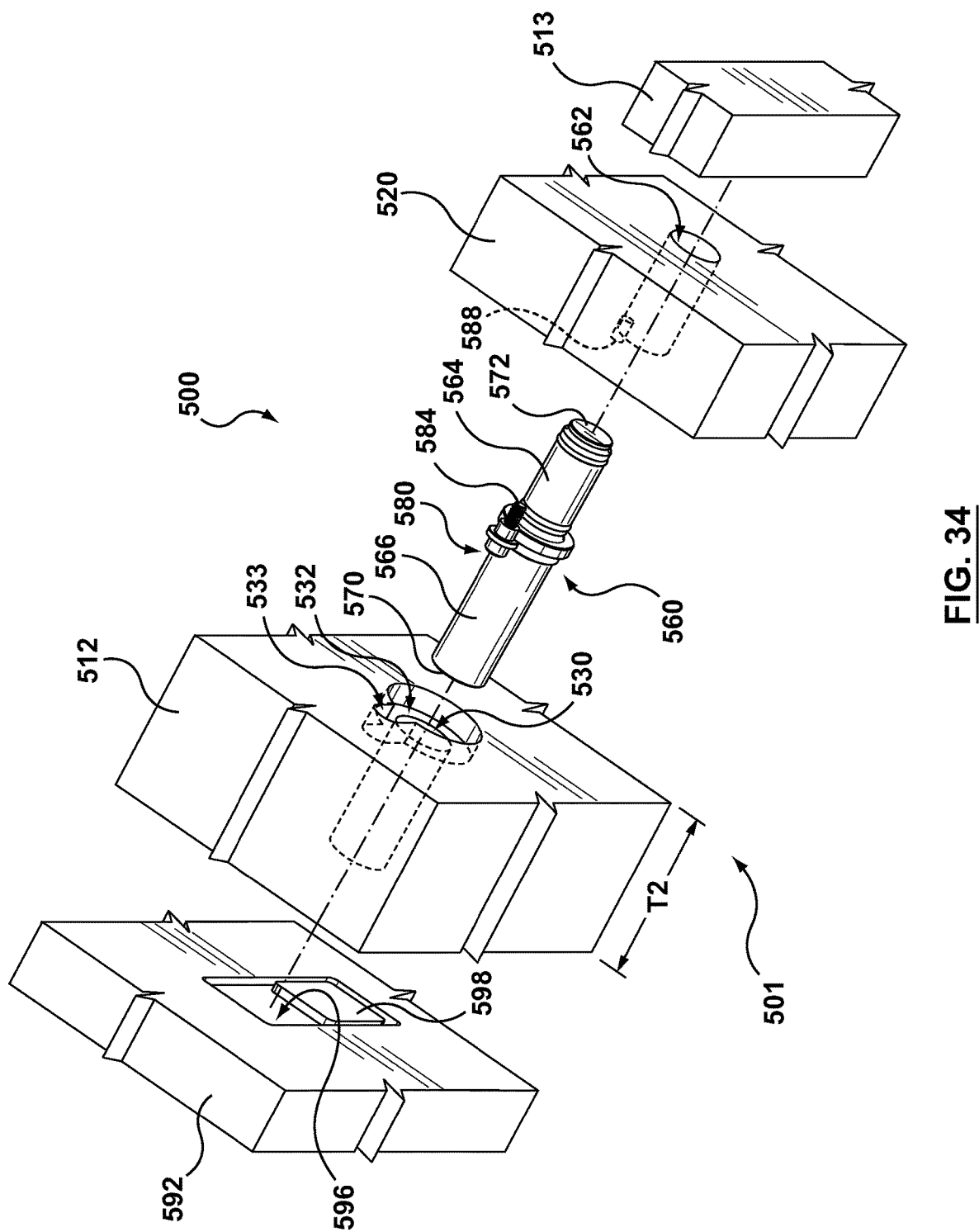
FIG. 34 is an exploded view of a portion of the mold of FIG. 24 illustrating a portion of a shut height adjustment mechanism of the mold.

FIG. 34 is an exploded view of a portion of the mold 500 illustrating the relationship between a single example stop member 560 and various nearby mold components. FIG. 34 may be considered to comprise the shut height adjustment mechanism 501 of the present embodiment (or a portion thereof). As illustrated, the rear section 564 of the stop member 560 is configured to be slidably received within the hole 562 in the stripper plate 520. The threaded end 584 of retaining pin 580 is configured for threading into threaded hole 588 for retaining the stop member 560 with the stripper plate 520. The tail end 572 of the stop member 560 is flat.

This shape is suitable for abutting a tonnage block extending from a front side of cavity plate 508.

The forward section 566 of the stop member 560 is configured to be slidably received in within the hole 530 in the core plate 512. The keyhole shaped depression 532 in the back surface of the core plate 512 is sufficiently deep to accommodate both of the radial flange 568 of the stop member 560 as well as the retaining pin 580 when the core plate 512 and the stripper plate 520 are in abutment (the main circular area of the depression 532 accommodating the radial flange 568 and the neck area 533 accommodating the retaining pin 580). The stop member 560 is aligned with the recess 596 in the spacer plate 592. Depending upon whether the spacer 598 within the recess 596 is in the outboard position (as shown in FIG. 34) or the inboard position, the end 570 of the stop member 560 will either be freely received within the recess 596 or will be in abutment with the spacer 598, respectively.

Figure 35:
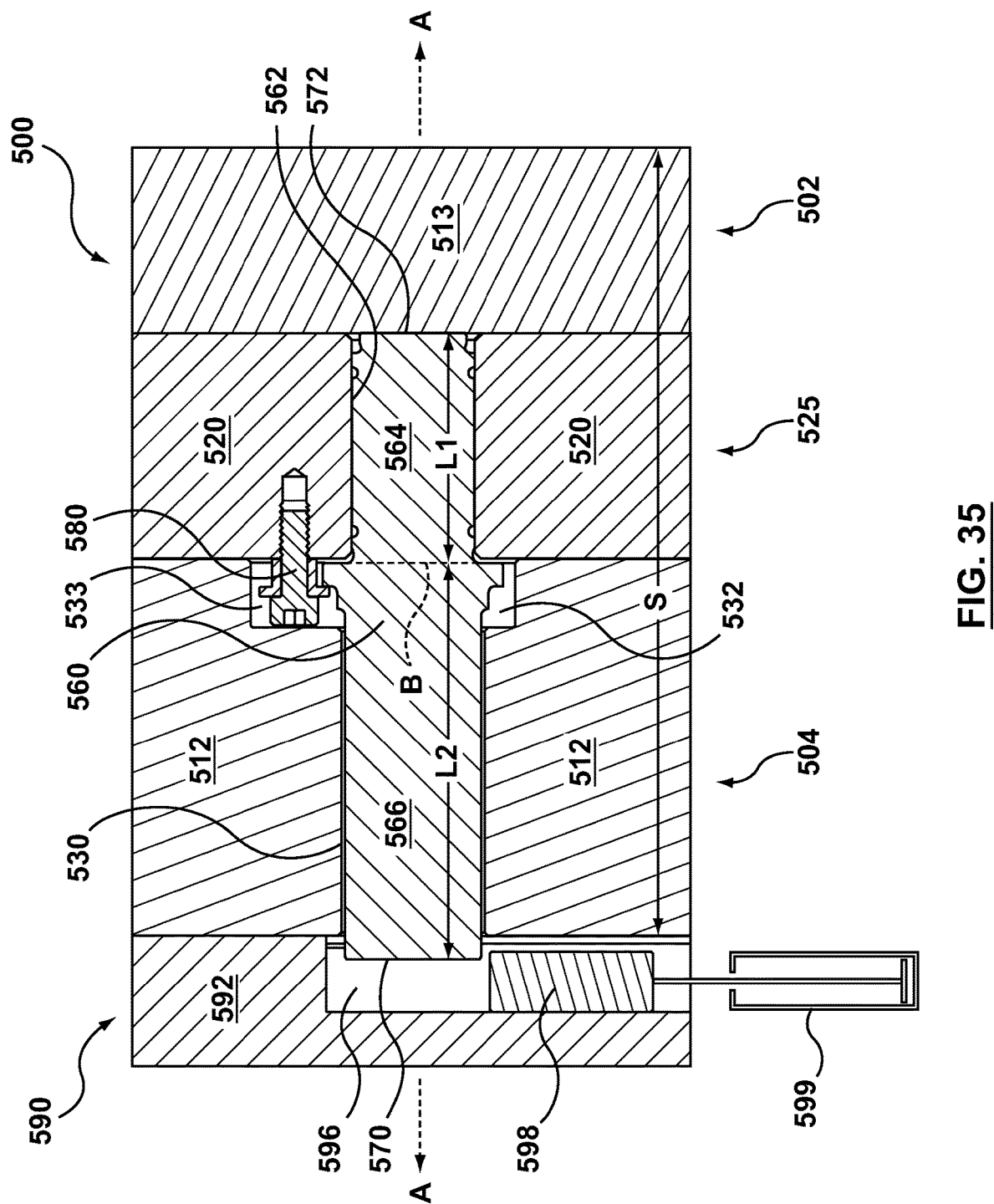
FIG. 35 is a schematic cross sectional view of a portion of a shut height adjustment mechanism of the mold of FIG. 24 when the mold is in a standard molding configuration.
Figure 36:
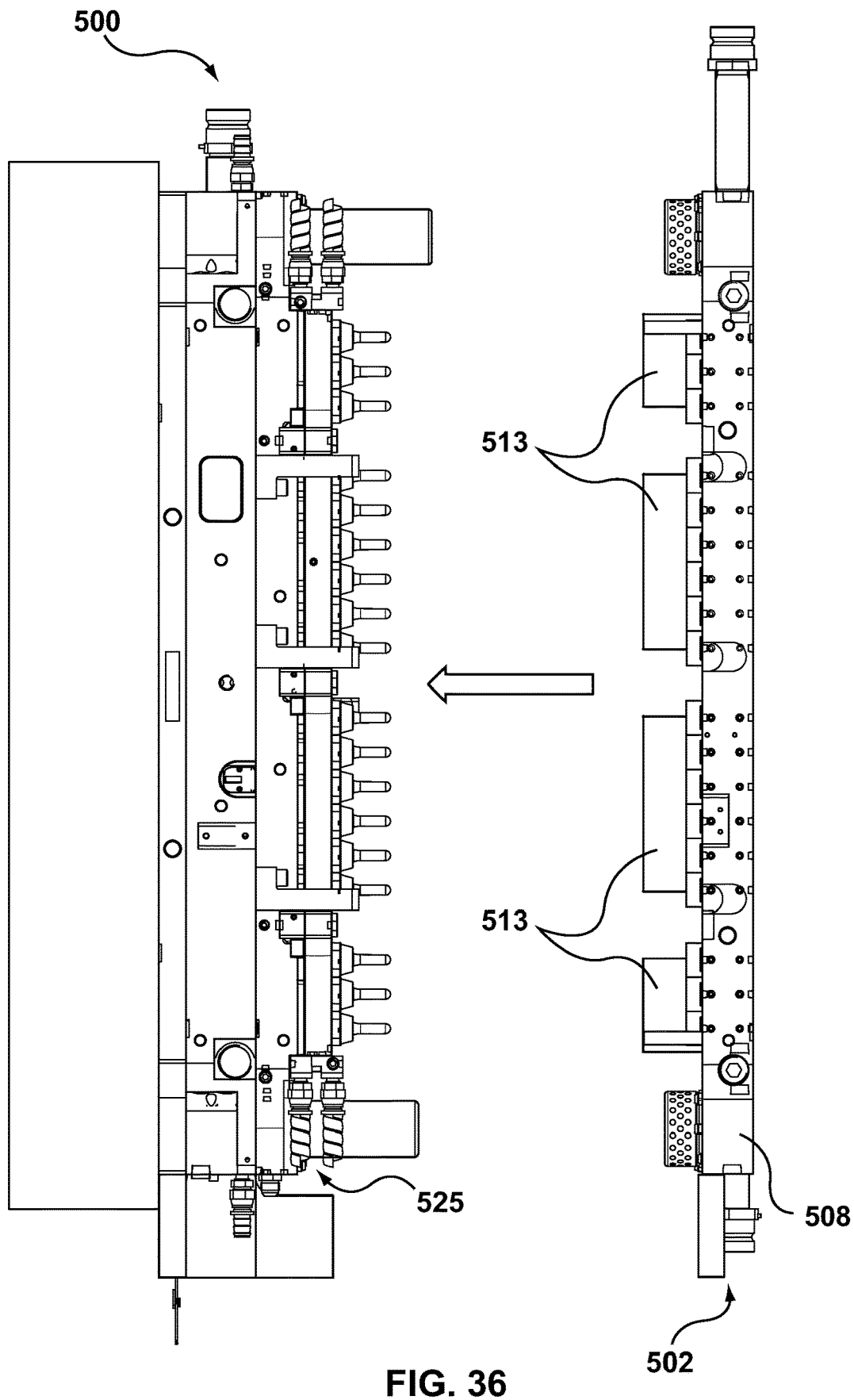
FIG. 36 illustrates the mold of FIG. 24 effecting a first operation for increasing a shut height of the mold.
Figure 46:
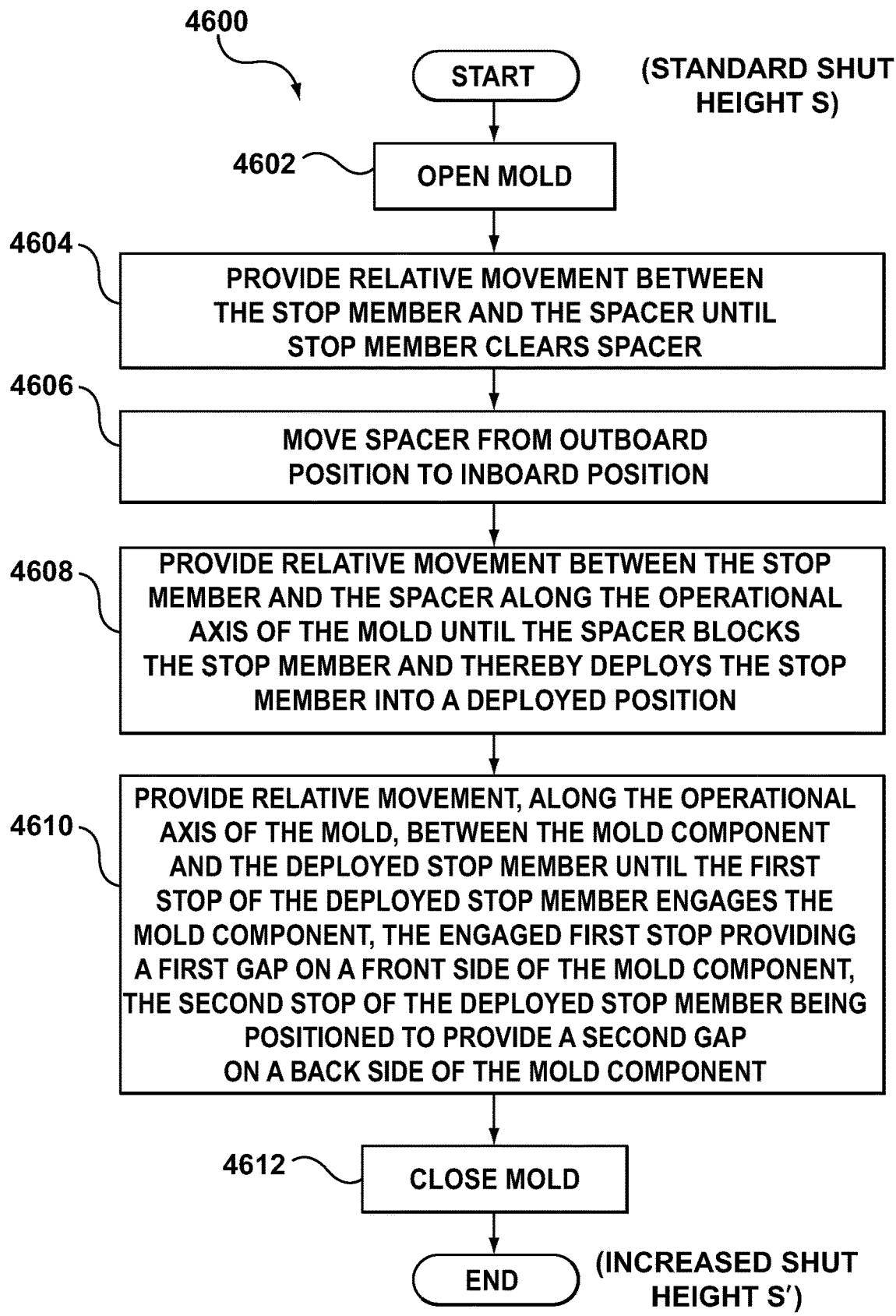
FIG. 46 is a flowchart illustrating operations for increasing the shut height of the mold of FIG. 24.

Operation 4600 for increasing a shut height of the mold 500 is depicted in flowchart form in FIG. 46. It is presumed that the mold is initially in a standard molding configuration, as shown in FIG. 24 for example. Referring to FIG. 35, there is depicted a cross section of an example stop member 560 and nearby components when the mold 500 in the standard molding configuration, with shut height S.

When the mold 500 is in the standard molding configuration, the stop member 560 is in a stowed (undeployed) position, as shown in FIG. 35. In the stowed position, the stop member 560 is fully contained within the collective space formed by: the hole 562 through the stripper plate 520; the hole 530 through the core plate 512; and the recess 596 behind the core plate 512. More specifically, the forward section 566 of the stop member 560 (which is illustrated in FIG. 35 as being separated from the back section 564 by a dashed line B) is contained mostly within hole 530 and partially within the recess 596, and the rear section 564 of stop member 560 is contained mostly within hole 562 and partially within hole 530. As will be appreciated from FIG. 35, when the stop member 560 is in the stowed position, it does not prevent the stripper plate 520 from abutting either of the core plate 512 or the tonnage block 513 that is attached to cavity plate 508 (the latter not being shown in FIG. 35). In the stowed position, neither the axial flange 568 nor the tail end 572 acts as a stop.

As is further illustrated in FIG. 35, the tail end 572 of the stop member 560 abuts, or is in close proximity to the tonnage block 513, when the stop member 560 is in the stowed position. The reason is that the stop member 560 will have been pushed forwardly into the stowed position when the tonnage block 513 is brought into abutment with the stripper plate 520 in preparation for a molding cycle. The head end 570 of the stop member 560 is in free space within the recess 596. This situation occurs because the combination of the length L1 of the rear section 564 of the stop member 560 and the length L2 of the forward section 566 of the stop member 560 exceeds the combined thickness of the core plate 512 and the stripper plate 520. In FIG. 35, the spacer 598 is in the outboard position, out of alignment with the stop member 560.

Figure 37:
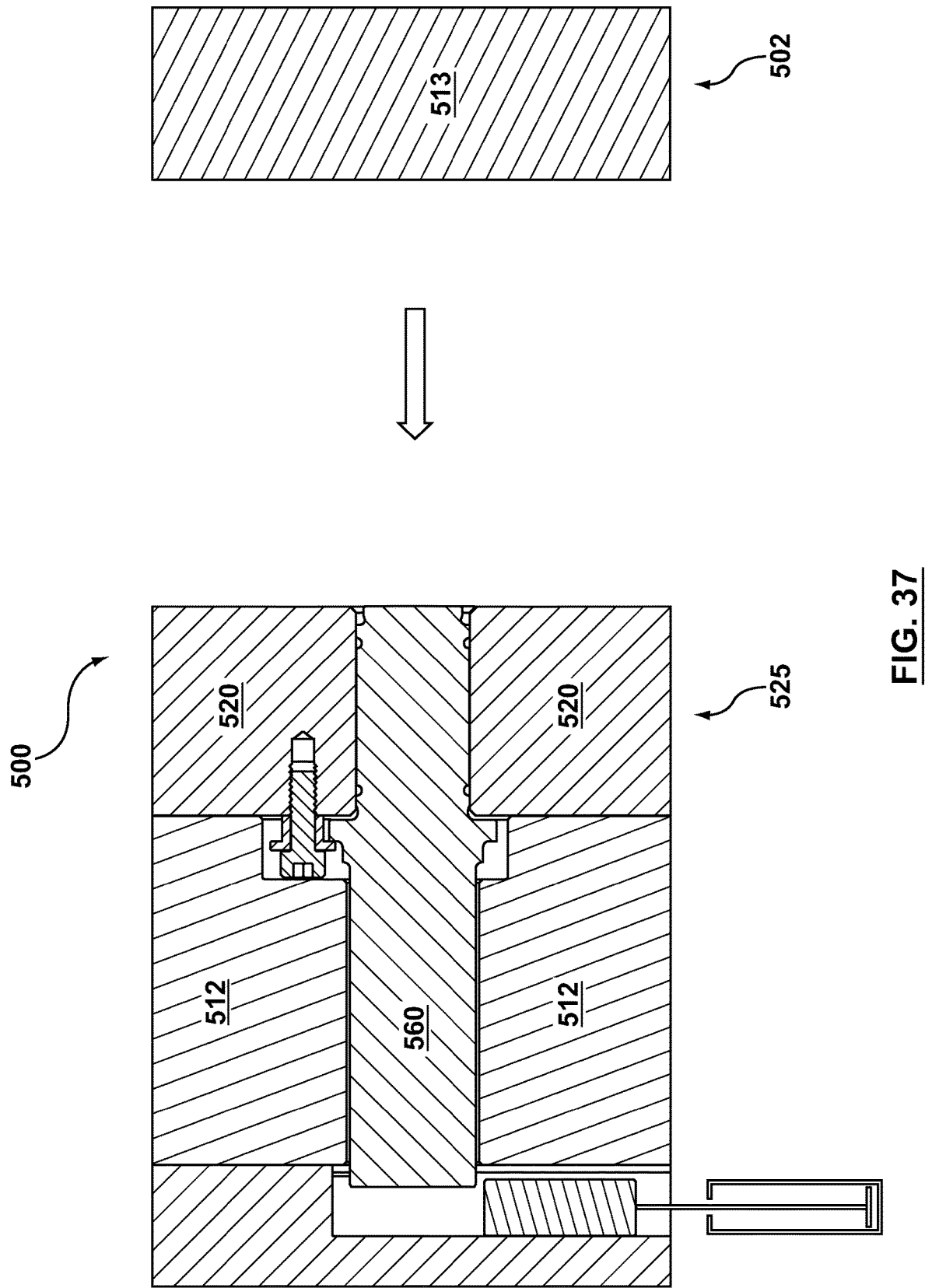
FIG. 37 is a schematic cross sectional view of a portion of a shut height adjustment mechanism of the mold of FIG. 36 effecting the first operation for increasing a shut height of the mold.

In operation 4602 (FIG. 46), the mold 500 is opened. In this embodiment, opening of the mold involves collectively moving the platen 506, the core plate assembly 504, and the stripper plate assembly 525 frontwardly along the operational axis of the mold 500, away from the cavity plate assembly 502. The stripper plate 520 thus moves forwardly away from the tonnage block 513 (FIG. 37).

Figure 38:
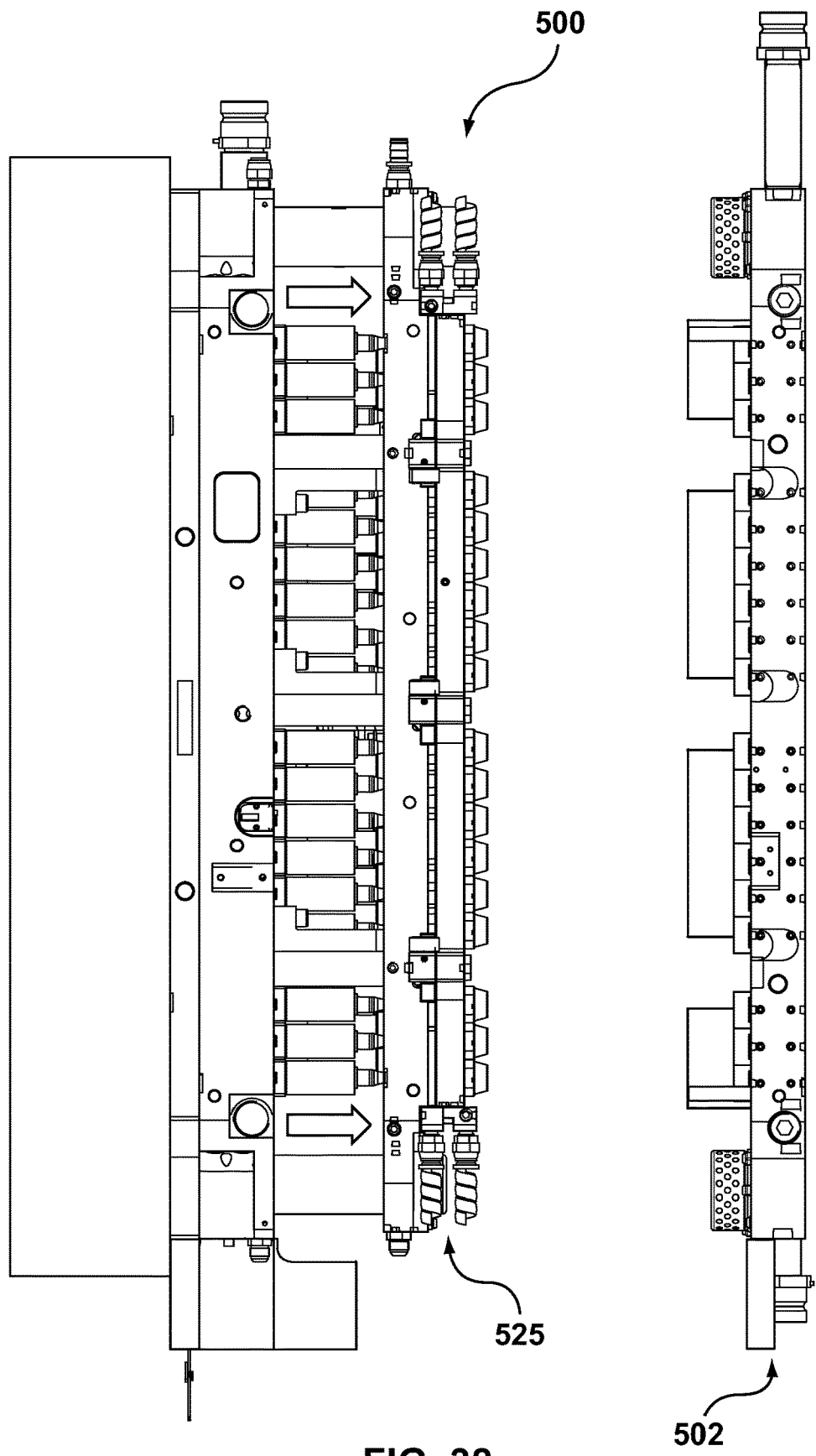
FIG. 38 illustrates the mold of FIG. 24 effecting a second operation for increasing a shut height of the mold.
Figure 39:
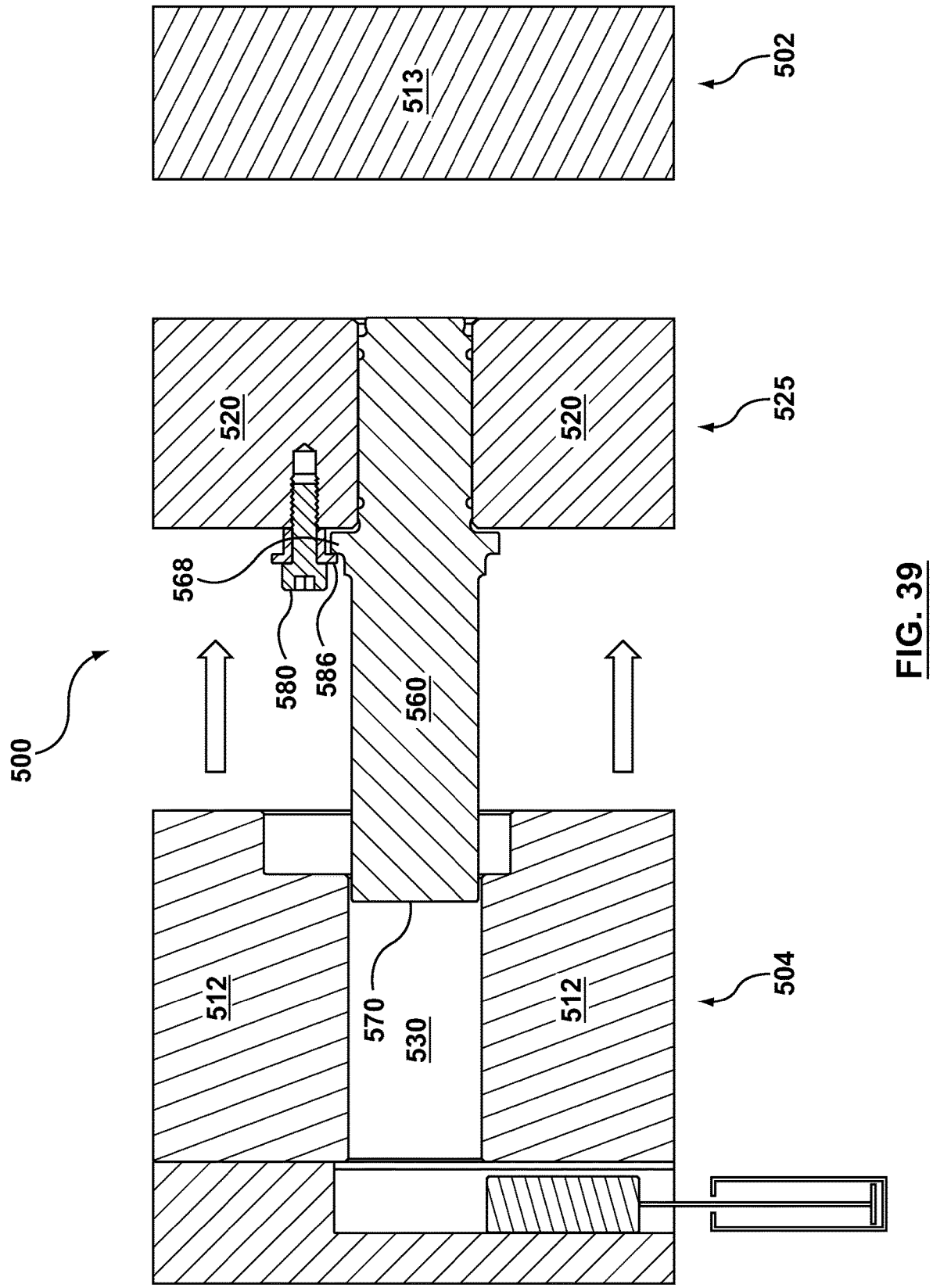
FIG. 39 is a schematic cross sectional view of a portion of a shut height adjustment mechanism of the mold of FIG. 38 effecting the second operation for increasing a shut height of the mold.

In operation 4604 (FIG. 46), relative movement is provided between the stop member 560 and the spacer 598, along the operation axis of the mold 500, until the stop member 560 clears the spacer 598. In the present embodiment, this is achieved by moving the stripper plate assembly 525 rearwardly away from the core plate assembly 504 (FIG. 38). When the stripper plate 520 moves rearwardly, the stop members 560 will be retained with the stripper plate 520 by their respective retaining pins 580 (FIG. 39). The rearward movement of the stripper plate assembly 525 is sufficient for the head end 570 of the stop member 560 to clear spacer 598.

Figure 40:
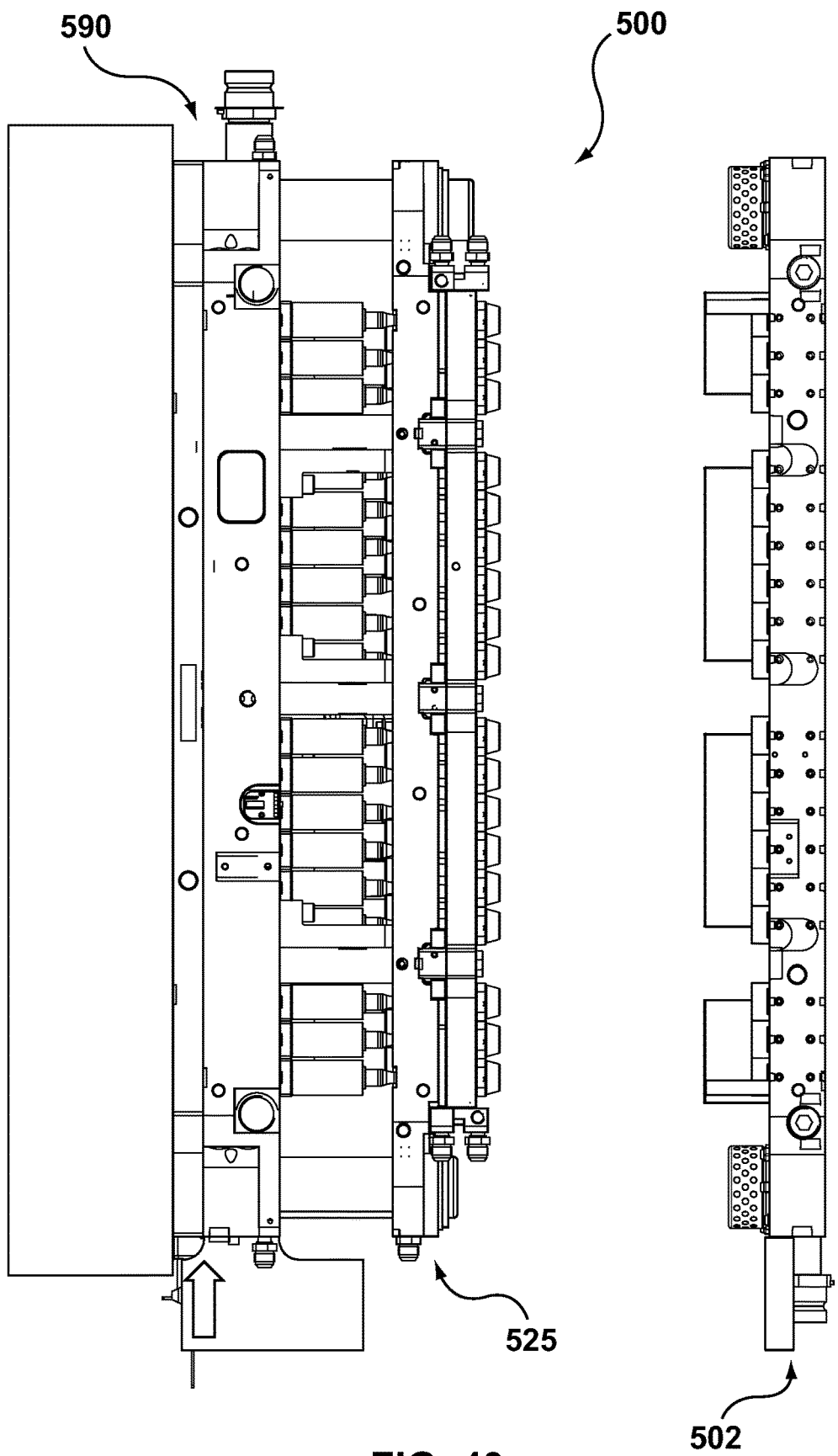
FIG. 40 illustrates the mold of FIG. 24 effecting a third operation for increasing a shut height of the mold.
Figure 42:
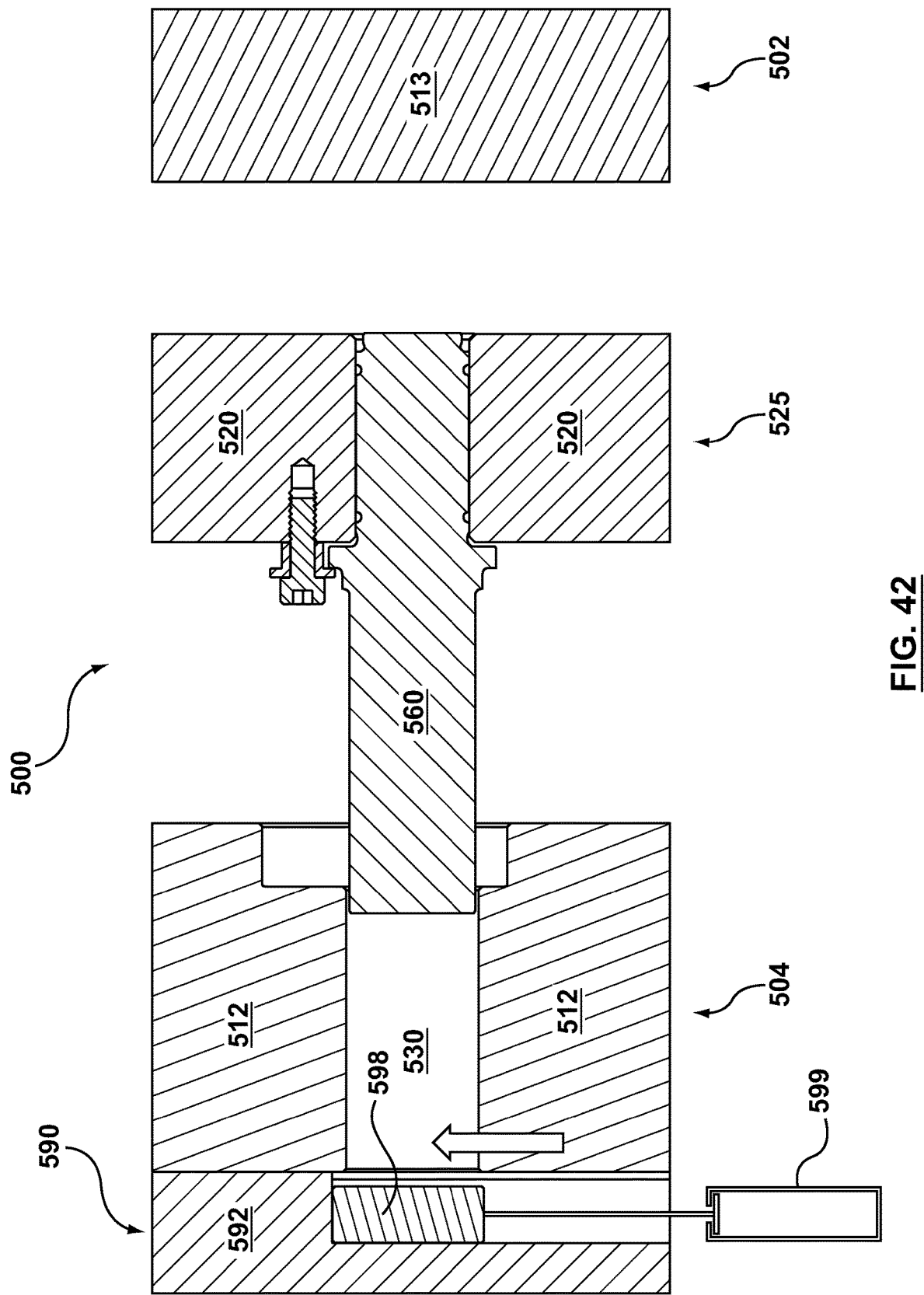
FIG. 42 is a schematic cross sectional view of a portion of a shut height adjustment mechanism of the mold of FIG. 40 effecting the third operation for increasing a shut height of the mold.

In operation 4606 (FIG. 46), the actuator 599 of the spacer assembly 590 is actuated to cause the spacer frame 594 to be translated within the recess 596 of spacer backing plate 592 from the outboard position to the inboard position (FIG. 40, FIG. 41). The spacer 598 is accordingly moved from the outboard position, out of alignment with the stop member 560, to the inboard position, in alignment with the stop member 560 (FIG. 42).

Figure 43:
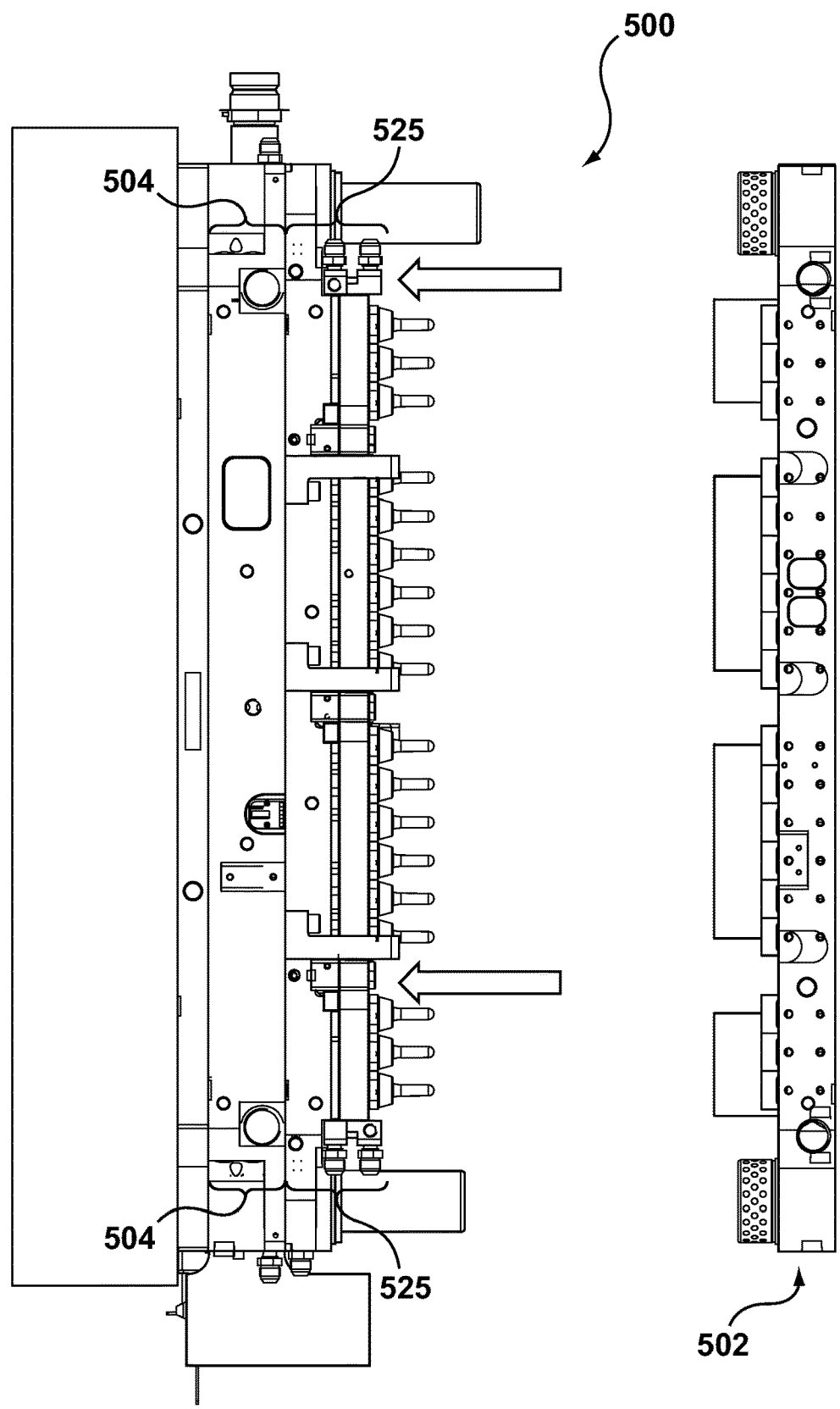
FIG. 43 illustrates the mold of FIG. 24 effecting a fourth operation for increasing a shut height of the mold.
Figure 44:
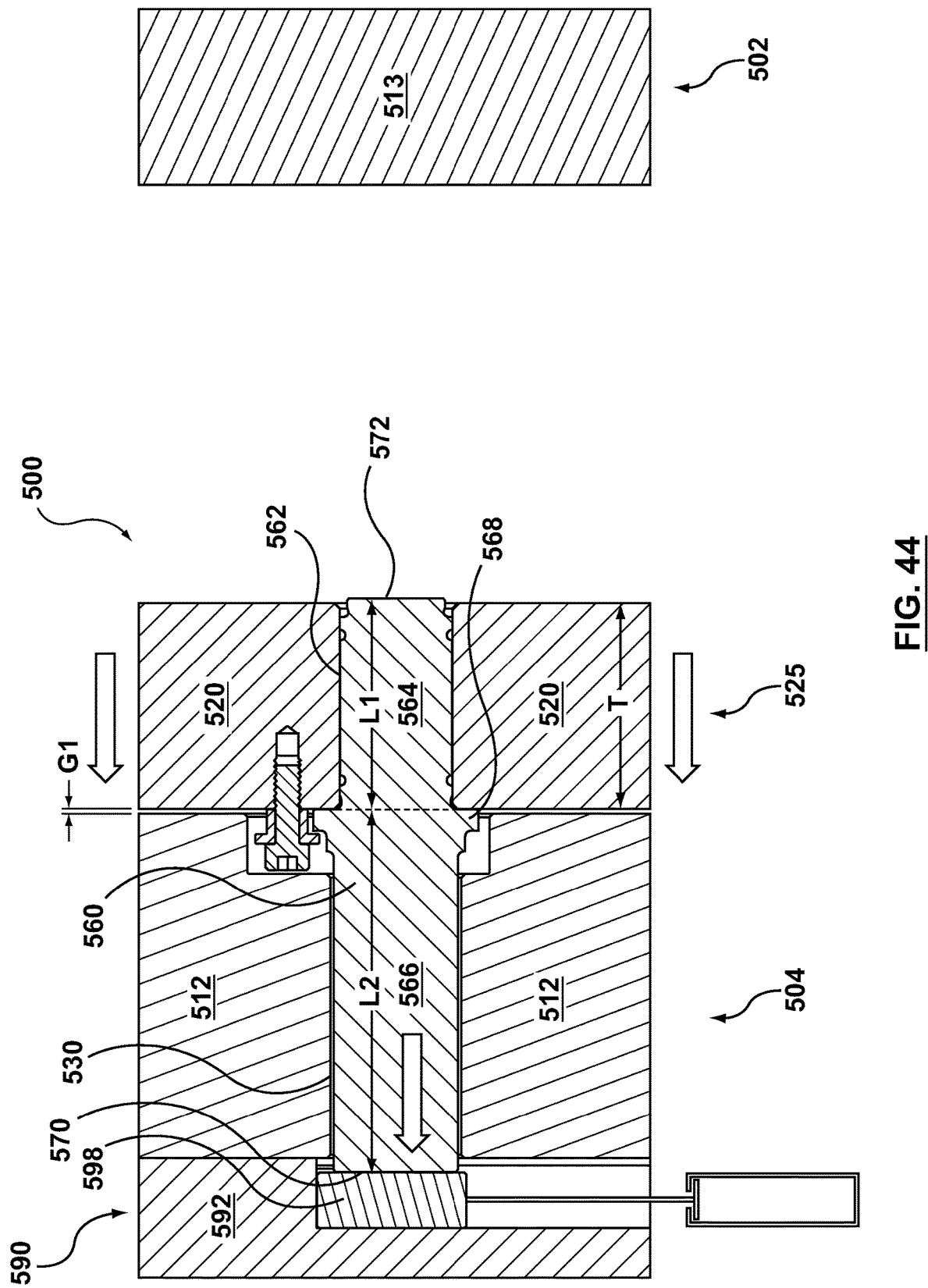
FIG. 44 is a schematic cross sectional view of a portion of a shut height adjustment mechanism of the mold of FIG. 43 effecting the fourth operation for increasing a shut height of the mold.
Figure 45:
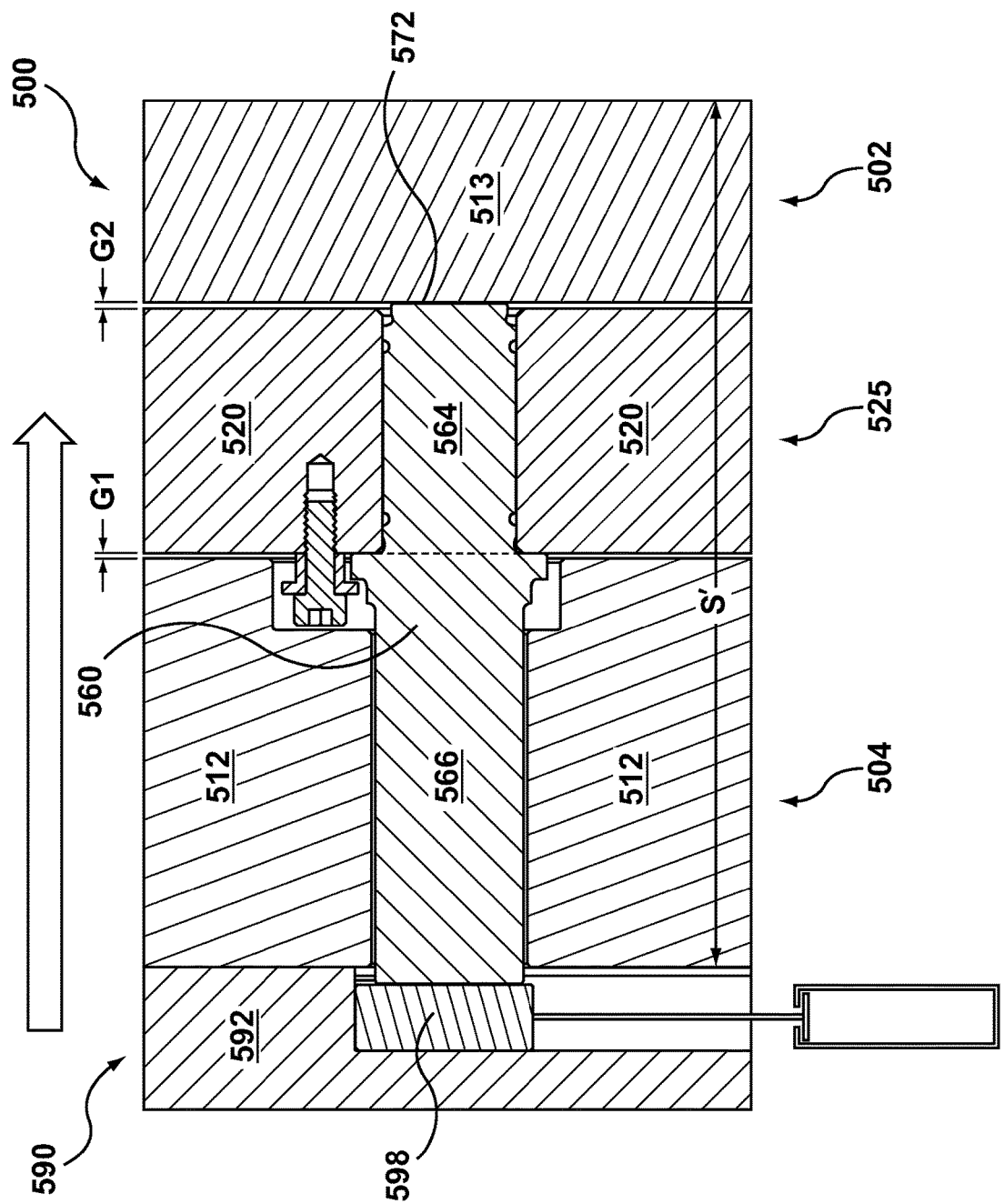
FIG. 45 is a schematic cross sectional view of a portion of a shut height adjustment mechanism of the mold of FIG. 35 effecting the fifth operation for increasing a shut height of the mold.

In operation 4608 (FIG. 46), relative movement is provided between the stop member 560 and the spacer 598 along the operational axis of the mold until the spacer 598 blocks the stop member and thereby deploys it into a deployed position. In the present embodiment, this is achieved by moving the stripper plate assembly 525 forwardly towards the core plate assembly 504 (FIG. 43). This is done until the head end 570 of the stop member 560 contacts, engages or abuts the spacer 598 (FIG. 44). The blocking by spacer 598 arrests frontward movement of the stop member 560.

The length L2 of the forward section 566 of the stop member 560 is such that, when the spacer 598 blocks the stop member 560, a portion of forward section 566 (here, a portion of radial flange 568) sits proud of the back surface of the core plate 512.

In operation 4610 (FIG. 46), relative movement is provided between the stripper plate 520 and the deployed stop member 560 until the first stop of the deployed stop member engages the stripper plate 520. In the present embodiment, this is achieved by continuing to move the stripper plate 520 forwardly a short distance further, with hole 562 sliding about the rear section 564 of the arrested stop member 560, until the first stop (the radial flange 568) engages the stripper plate 520. It will be appreciated that this engagement will arrest the frontward movement of the stripper plate 520.

When the first stop has engaged the stripper plate 520, it will provide a first gap G1 on a front side of the stripper plate 520. In the present embodiment, this is by virtue of the fact that the radial flange 568 sits proud of the back surface of the core plate 512, such that the gap G1 will be defined between the core plate 512 and the stripper plate 520.

Moreover, the second stop of the deployed stop member 5600 is now positioned to provide a second gap G2 on a back side of the stripper plate 520. In particular, because the length L1 of the rear section 564 of the stop member 560 slightly exceeds the thickness T1 of the stripper plate 520 in the present embodiment, the tail end 572 of the stop member 560 sits proud of the back surface of the stripper plate 520.

Finally, in operation 4612 (FIG. 46), the mold 500 is closed, i.e. the platen 506, the core plate assembly 504, and the stripper plate assembly 525 are all collectively moved rearwardly along the operational axis of the mold 500, towards the cavity plate assembly 502. This rearward movement will be arrested when the tail end 572 of the stop member 560 comes into contact with the tonnage block 513. Because the tail end 572 sits proud of the back surface of the stripper plate 520 as noted above, the gap G2 will be created on the back side of the stripper plate 520, between the tonnage block 513 and the stripper plate 520. In the result, the shut height of the mold is now increased to S', which is equal to the original shut height S plus the sum of the two gaps G1 and G2.

When the mold 500 is in this configuration, any mold clamping force applied to the mold 500 will be transmitted through the stop member 560, spacer 598, spacer plate 592 and into the platen 506, and will bypass the stripper plate 520 and core plate 512. If desired, a mold stack in the mold 500 can be placed into a cleaning configuration, similar to what is discussed above in conjunction with FIGS. 10 and 20, when the mold 500 is in the configuration shown in FIG. 46.

As will be appreciated, the shut height adjustment mechanism described above uses a stop member (or multiple instances thereof) for defining a gap on both sides of a mold component, which in this case is a stripper plate. Such a mechanism may eliminate a need for two separate mechanisms for defining each of the two gaps. This may reduce a complexity and/or cost of the mold. Moreover, the shut height adjustment mechanism is readily reconfigurable to define different sizes of gap G1, G2, or both, simply by replacing each stop member with a new stop member having a longer or shorter rear section, longer or shorter forward section, or both.

To reduce the shut height of the mold from S' to S, the operations of method 4600 (FIG. 46) are essentially repeated, with three exceptions.

Firstly, in operation 4606, the spacer 598 is moved from the inboard position to the outboard position rather than the opposite.

Secondly, in operations 4608 and 4610, relative movement is provided between the stop member 560 and the spacer 598 along the operational axis of the mold until the head end 570 of the stop member 560 enters the recess 596 in the spacer plate 590. In particular, when the stripper plate assembly 525 is moved forwardly to cause the stripper plate 520 to engage the first stop 568 of the stop member 560, rearward movement of the stripper plate assembly 525 will not necessarily be arrested. This is in view of the free space within the recess 596 in front of the stop member 560, given the outboard position of the spacer 598. Rather, the stripper plate 520 will push the first stop (radial flange 568) of the stop member 560 flush with the back surface of the core plate 512 and will abut the core plate 512. Thus, the first stop of the stop member 560 will not engage the stripper plate 520.

Thirdly, upon closing of the mold in operation 4612, when the tonnage block 513 engages the tail end 572 of the stop member 560, rearward movement of the cavity plate 508 will not necessarily be arrested. Rather, in view of the free space within the recess 596 in front of stop member 560, the cavity plate 508 will push the stop member 560 relative to the stripper plate 520 and core plate 512 until the front face of the cavity plate 508 abuts the back face of the stripper plate 520. In other words, the second stop of the stop member 560 (tail end 572) does not act to provide the second gap G2 because the stop member 560 is not in a deployed position (i.e. is not blocked from movement by the spacer 598 and its immediately adjacent backing plate 590). As a result, the stop member 560 will once again attain its stowed position as originally shown in FIG. 35, and the shut height will be reverted to the original shut height S.

Various alternative embodiments are possible.

In the split mold insert 114 described above, the vent 145 defined between the split mold insert halves 116, 118 comprises recesses (e.g. grooves) formed in the mating face 192 of the first split mold insert half 116. Similarly, the vent 345 defined between the split mold insert halves 316, 318 of mold stack 303 comprises recesses formed in mating face 392 only. It will be appreciated that, in alternative embodiments, such recesses and/or grooves could alternatively or additionally appear within the opposing mating face 190 or 390 of the other split mold insert half 118 or 318, respectively.

In the shut height adjustment mechanism described above, a tail end 572 of the stop member 560 engages a tonnage block 513 attached to a cavity plate 508 when the mold 500 is in an increased shut height configuration. It will be appreciated that, in alternative embodiments, a tail end of the stop member could directly engage the cavity plate 508, e.g. if the mold lacks tonnage blocks 513.

The shut height adjustment mechanism described above may be used without the residue cleaning feature described above, and vice versa. That is to say, any of the shut height adjustment mechanisms disclosed herein may be used independently of any mold stack having a residue cleaning feature as disclosed herein. Conversely, any mold stack having a cleaning feature as disclosed herein may be used independently of the shut height adjustment mechanisms disclosed herein.

In some embodiments, the tapered female seat may be formed in a unitary component rather than being collectively defined by a cavity insert 106 and a cavity flange 109.

It is not required for stop member 560 to be a cylindrical pin with a radial flange. In other embodiments, the stop member may instead take another form, such as rectangular bar for example. It will be appreciated that the first stop need not be a radial flange but could for example be an alternative form of protrusion, such as a bulge, shoulder, step, lip or projection. Similarly, the second stop need not necessarily be the tail end of the stop member, but could instead be another feature such as a shoulder, step, lip or protuberance of the stop member for example.

It is not necessary to use a retaining pin to retain a stop member with its associated mold component (here, a stripper plate).

It will be appreciated that the stop member need not necessarily be retained with the stripper plate mold component in all embodiments. In some embodiments, the stop member may instead be retained with an adjacent mold component, e.g. the core plate. In such embodiments, the stop member may be rearwardly biased with respect to the core plate to a rearward limit at which the head end of the stop member clears the spacer. This may done to ensure that, when the mold is opened and the stripper assembly is separated from the core plate assembly (i.e. when the first stop (radial flange) ceases to engage the stripper plate), the stop member will, by virtue of the rearward bias, achieve a position in which its head end does not interfere with a movement of the spacer from the outboard to the inboard position.

The length L1 of the rear section of the stop member will typically be greater than a thickness of the stripper plate. Nevertheless, it is possible that, in some embodiments, the length L1 could be such that a tail end of the stop member could be flush with or beneath a front face of the stripper plate when deployed, with a corresponding nub on the back face of the cavity plate to provide the necessary gap G2.

In the above-described embodiment of the shut height adjustment mechanism 501, the engagement between the first stop 568 of the stop member 560 and the mold component (stripper plate) 520, when the increased shut height S' of the mold has been effect, is direct engagement between a back face 565 of the stop 568 and the front face 567 of the stripper plate 520. It will be appreciated that, in some embodiments, this engagement could be indirect, e.g. could occur through one or more intermediate components rather than directly between the first stop and the mold component. Other modifications may be made within the scope of the following claims.

What is claimed is:

1. A mold stack comprising:
    two adjacent mold stack components for collectively defining at least a portion of a molding cavity; the two adjacent mold stack components being a split mold insert and a cavity insert;
    a vent, at least partially defined by one of the mold stack components, that is adjustable between:
    a molding configuration wherein the vent is configured to vent gas from the molding cavity while preventing passage of any substantial amount of melt therethrough; and
    a cleaning configuration wherein the vent is configured to receive melt from the molding cavity for cleaning the vent; and
    a junction defined between two respective mating faces of the two mold stack components, the junction comprising a tongue and groove interface and being adjustable between:
    a molding configuration wherein the mating faces contact one another to define a parting line of the molding cavity; and
    a cleaning configuration wherein the mating faces are separated to create a space between the mating faces, the space acting as an extension of the molding cavity, and wherein the junction further defines an auxiliary melt barrier for preventing uncontrolled flashing from the extension.

2. The mold stack of claim 1 wherein the auxiliary melt barrier comprises an auxiliary vent configured to vent gas from the extension of the molding cavity while preventing passage of melt from the extension of the molding cavity.

3. The mold stack of claim 2 wherein the auxiliary vent is between a tongue and a groove of the tongue and groove interface.

4. The mold stack of claim 2 wherein the auxiliary vent is substantially parallel to an operational axis of the mold stack.

5. The mold stack of claim 3 wherein the groove is an annular groove in an end of the cavity insert.

6. The mold stack of claim 5 wherein the split mold insert has a tapered male portion and wherein the tongue is an annular tongue at a distal end of the tapered male portion.

7. A method of cleaning a vent in a mold stack, the method comprising:
    adjusting two mold stack components, the two adjacent mold stack components being a split mold insert and a cavity insert, of a mold stack:
    from a molding configuration, wherein the mold stack components collectively define at least a portion of a molding cavity, wherein a vent at least partially defined by one of the mold stack components is configured to vent gas from the molding cavity while preventing passage of any substantial amount of melt therethrough, and wherein two respective mating faces of the two mold stack components contact one another at a junction of the two mold stack components to define a parting line of the molding cavity which junction comprises a tongue and groove interface, to a cleaning configuration, wherein the vent is dimensioned to receive melt, and wherein the mating faces are separated to create a space between the mating faces, the space acting as a molding cavity extension, and wherein the junction defines an auxiliary melt barrier; and
    injecting melt into the molding cavity, the injected melt entering into the vent and into the molding cavity extension but being prevented from flashing beyond the molding cavity extension by the auxiliary melt barrier.

8. The method of claim 7 wherein the split mold insert has a tapered male portion and the cavity insert at least partially defines a tapered female seat and wherein the adjusting comprises partially withdrawing the tapered male portion from the tapered female seat.

* * * * *